United States Patent
Quazi et al.

(10) Patent No.: US 7,176,658 B2
(45) Date of Patent: Feb. 13, 2007

(54) CONTROLLER FOR PERMANENT MAGNET ALTERNATOR

(75) Inventors: Fazle Quazi, Boulder, CO (US); Harold C. Scott, Lafayette, CO (US); Stewart C. Koch, Loveland, CO (US)

(73) Assignee: Magnetic Applications Inc., Lafayette, CO (US)

( * ) Notice: Subject to any disclaimer, the term of this patent is extended or adjusted under 35 U.S.C. 154(b) by 0 days.

(21) Appl. No.: 10/860,393

(22) Filed: Jun. 2, 2004

(65) Prior Publication Data

US 2005/0146308 A1 Jul. 7, 2005

Related U.S. Application Data

(60) Provisional application No. 60/532,664, filed on Dec. 24, 2003, provisional application No. 60/475,273, filed on Jun. 2, 2003.

(51) Int. Cl.
*H02H 7/06* (2006.01)
*H02P 11/00* (2006.01)
*H02P 9/00* (2006.01)

(52) U.S. Cl. ............... 322/24; 322/7; 322/22; 322/28

(58) Field of Classification Search ........... 322/7, 322/16, 90, 22, 26, 24, 28; 363/66
See application file for complete search history.

(56) References Cited

U.S. PATENT DOCUMENTS

| 4,164,785 A | * | 8/1979 | Young et al. ............... 363/50 |
|---|---|---|---|
| 4,827,393 A | * | 5/1989 | Clark ........................... 363/79 |
| 5,039,932 A | * | 8/1991 | Belanger et al. ............... 322/32 |
| 5,061,889 A | * | 10/1991 | Iwatani et al. ................. 322/28 |
| 5,233,286 A | * | 8/1993 | Rozman et al. ................ 322/90 |
| 5,594,322 A | * | 1/1997 | Rozman et al. ................ 322/10 |
| 5,606,244 A | * | 2/1997 | Migdal .......................... 332/7 |
| 6,188,588 B1 | * | 2/2001 | Hemena et al. ........... 363/21.18 |
| 6,768,656 B2 | * | 7/2004 | Figueroa .................. 363/21.03 |
| 6,989,655 B2 | * | 1/2006 | Eguchi et al. ................. 322/23 |
| 2002/0044463 A1 | * | 4/2002 | Bontempo et al. ........ 363/21.07 |
| 2002/0176266 A1 | | 11/2002 | Perreault et al. |

FOREIGN PATENT DOCUMENTS

| FR | 2 533 375 | 3/1984 |
|---|---|---|
| WO | WO 01/20770 A1 | 3/2001 |

* cited by examiner

*Primary Examiner*—J. Gonzalez
(74) *Attorney, Agent, or Firm*—Michael A. Lechter; David E. Rogers; Squire, Sanders & Dempsey, L.L.P.

(57) ABSTRACT

The invention is a control system that, among other things, controls a permanent magnet alternator and provides relatively accurate voltage regulation. The control system may include one or more of the following: (1) a rectification system to rectify and regulate the output voltage of an alternator, (2) a rectifier/limiter used as an electrical power source to a boost type regulator, (3) a multimode rectifier/limiter, (4) a DC to AC inverter bridge, and (5) power switches employed in the system to minimize the switching energy that would otherwise be dissipated in the power switches as heat.

30 Claims, 57 Drawing Sheets

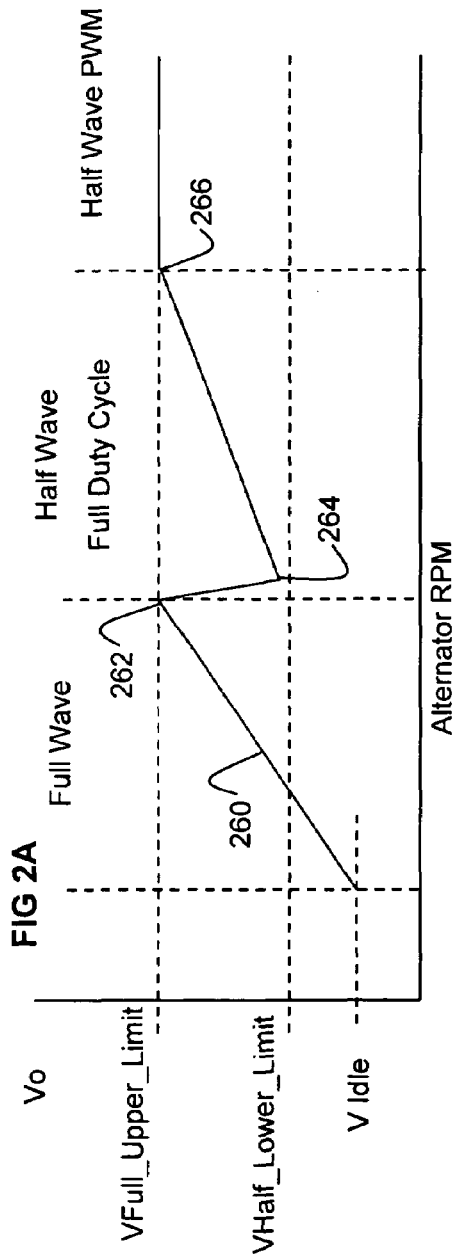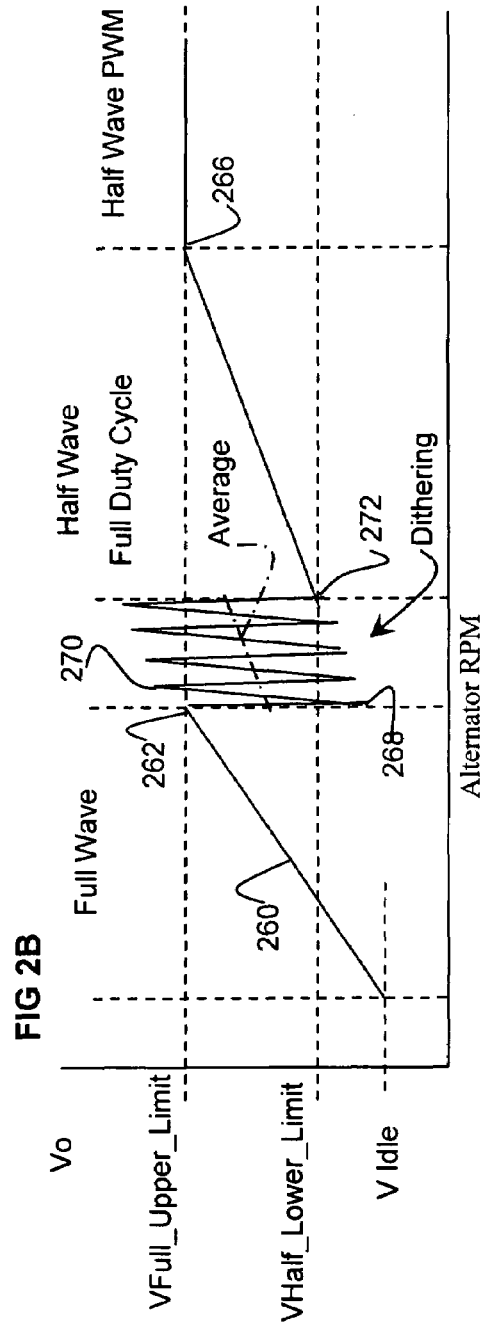

LOW VOLTAGE POWER SUPPLIES

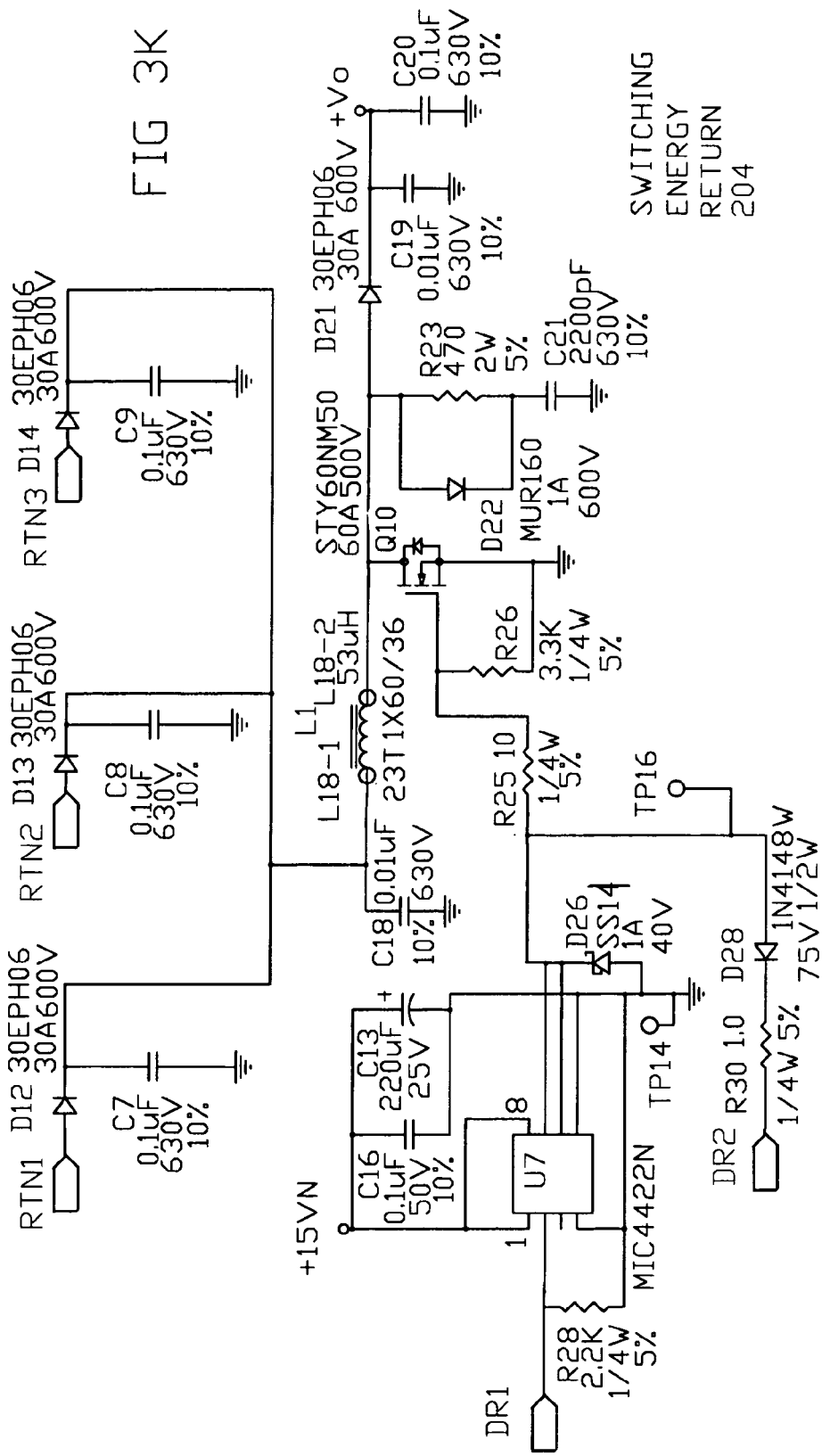

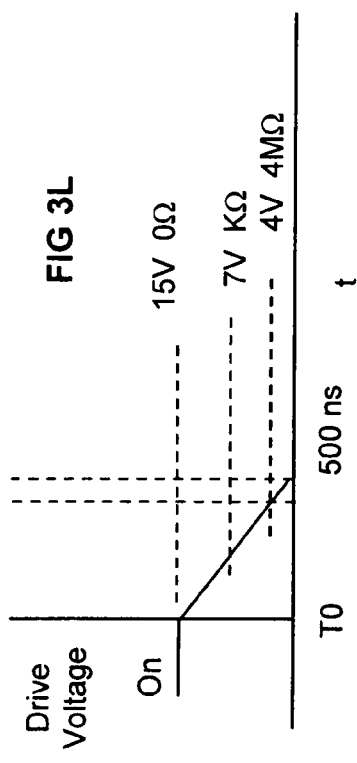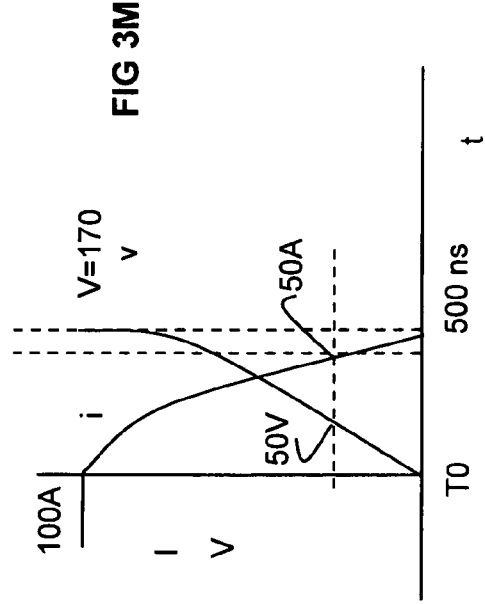

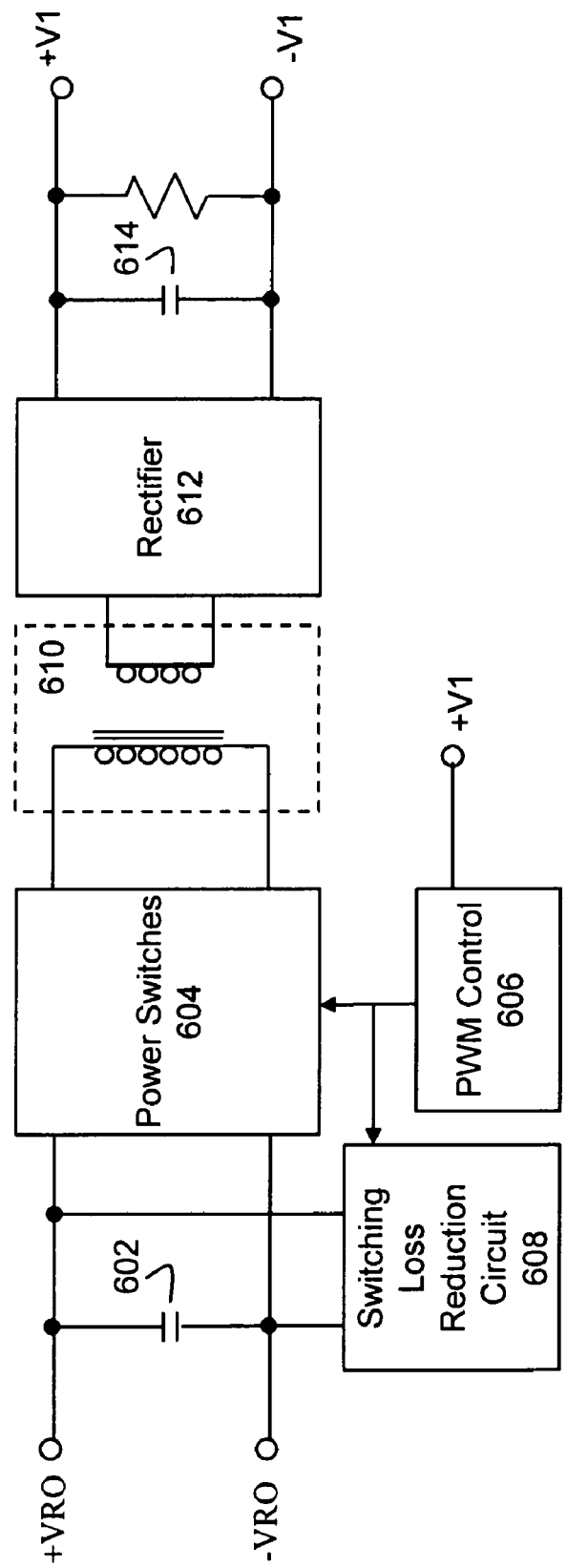

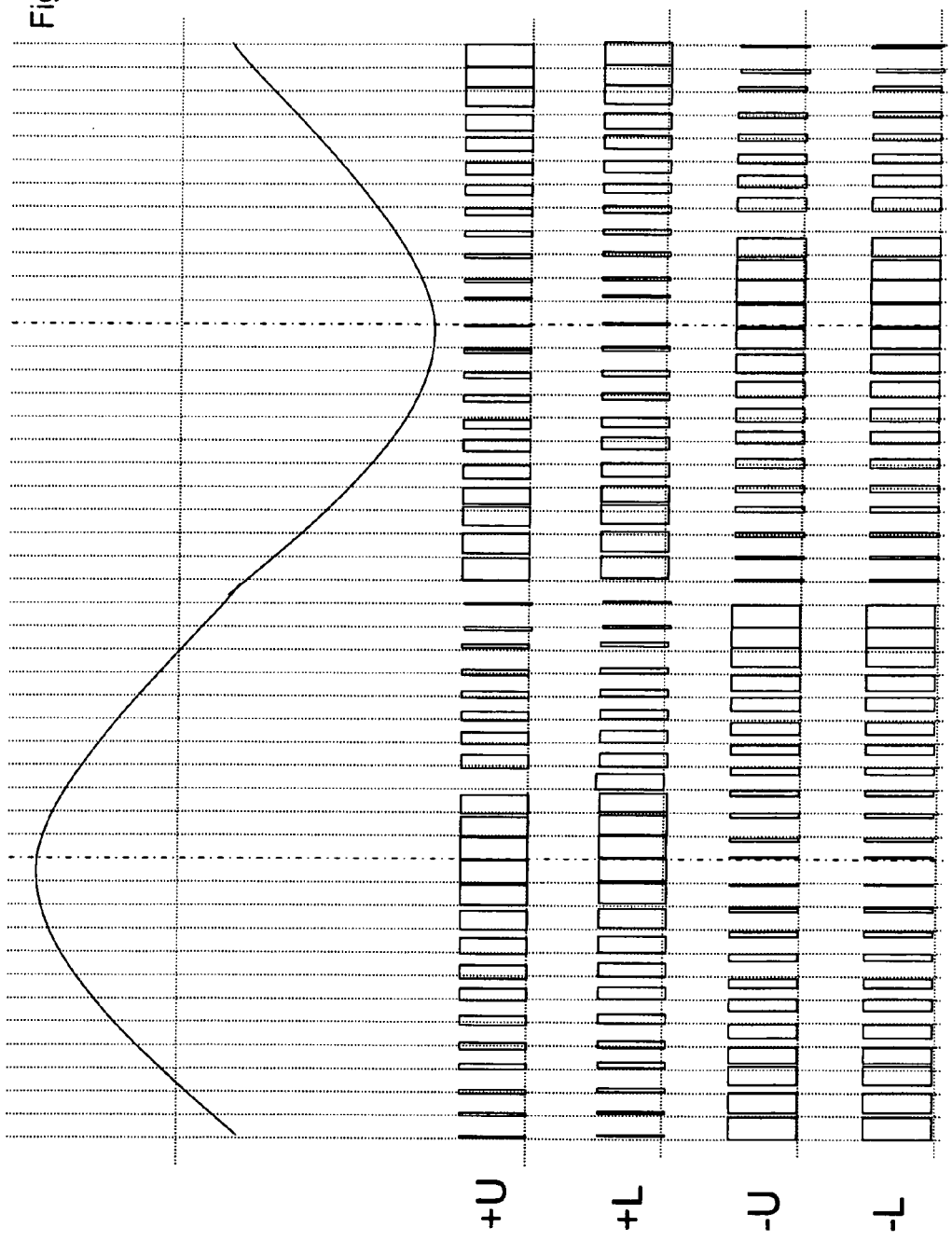

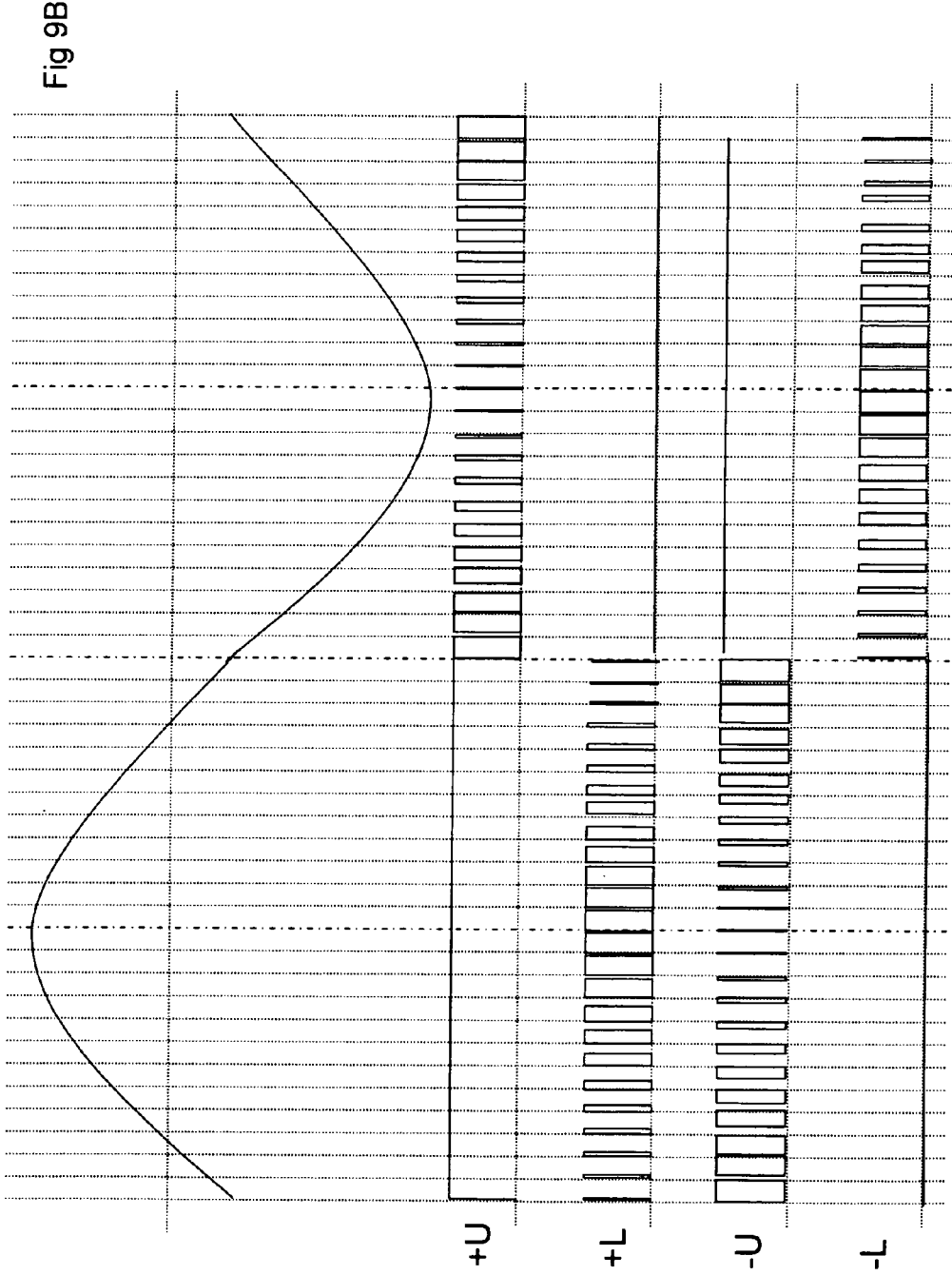

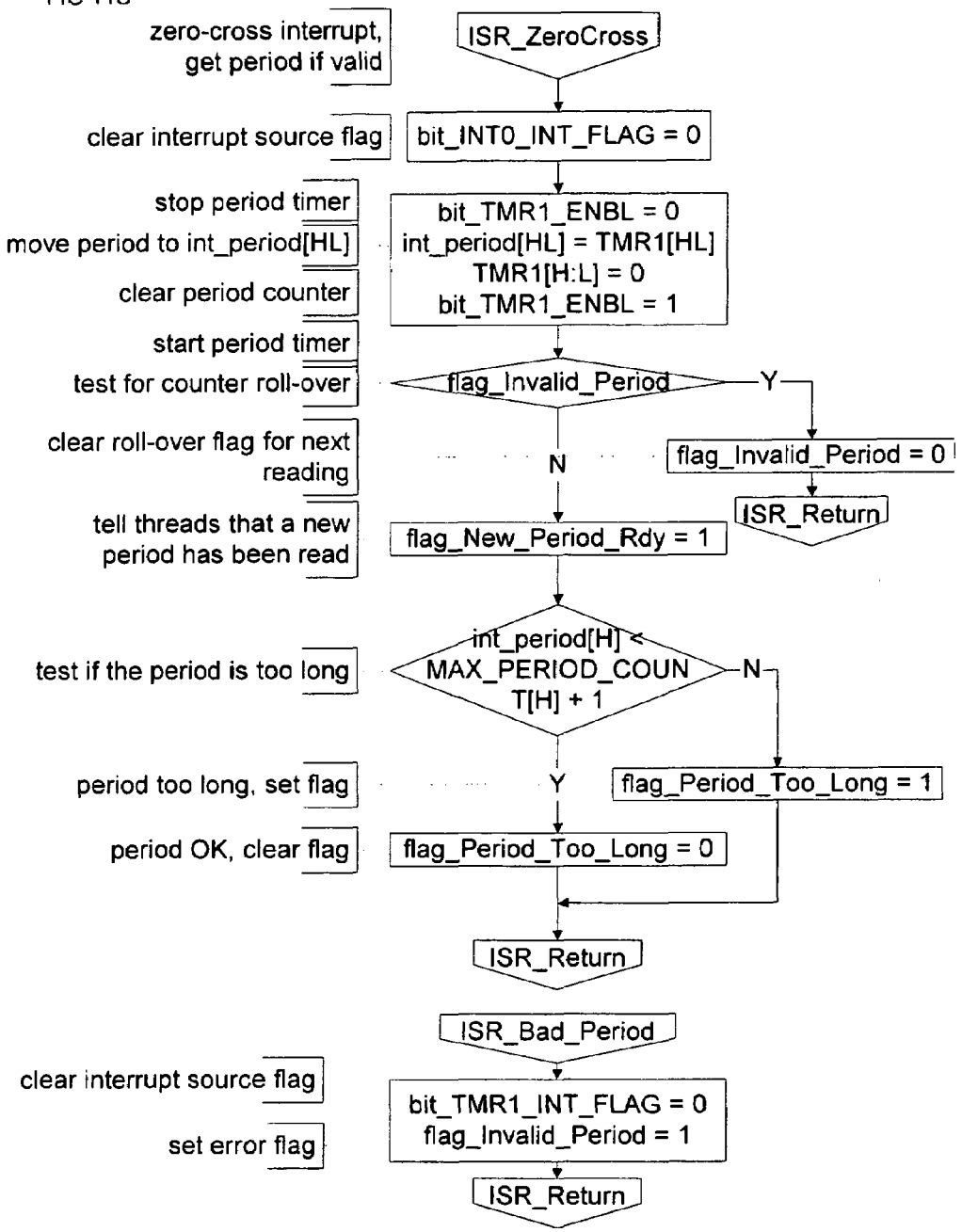

for for the next time to sample the all of the A/D channels restart the acquisition delay, clear current channel set next state to check if all channels have been read set pointer to start of history for all channels offset to start of this channel's history plus the current history index clear sum, set counter to number of values for this channel point at start of this channel's buffer accumulate sum of the buffer decrement count left to do divide by length of buffer Store the sum in the average array

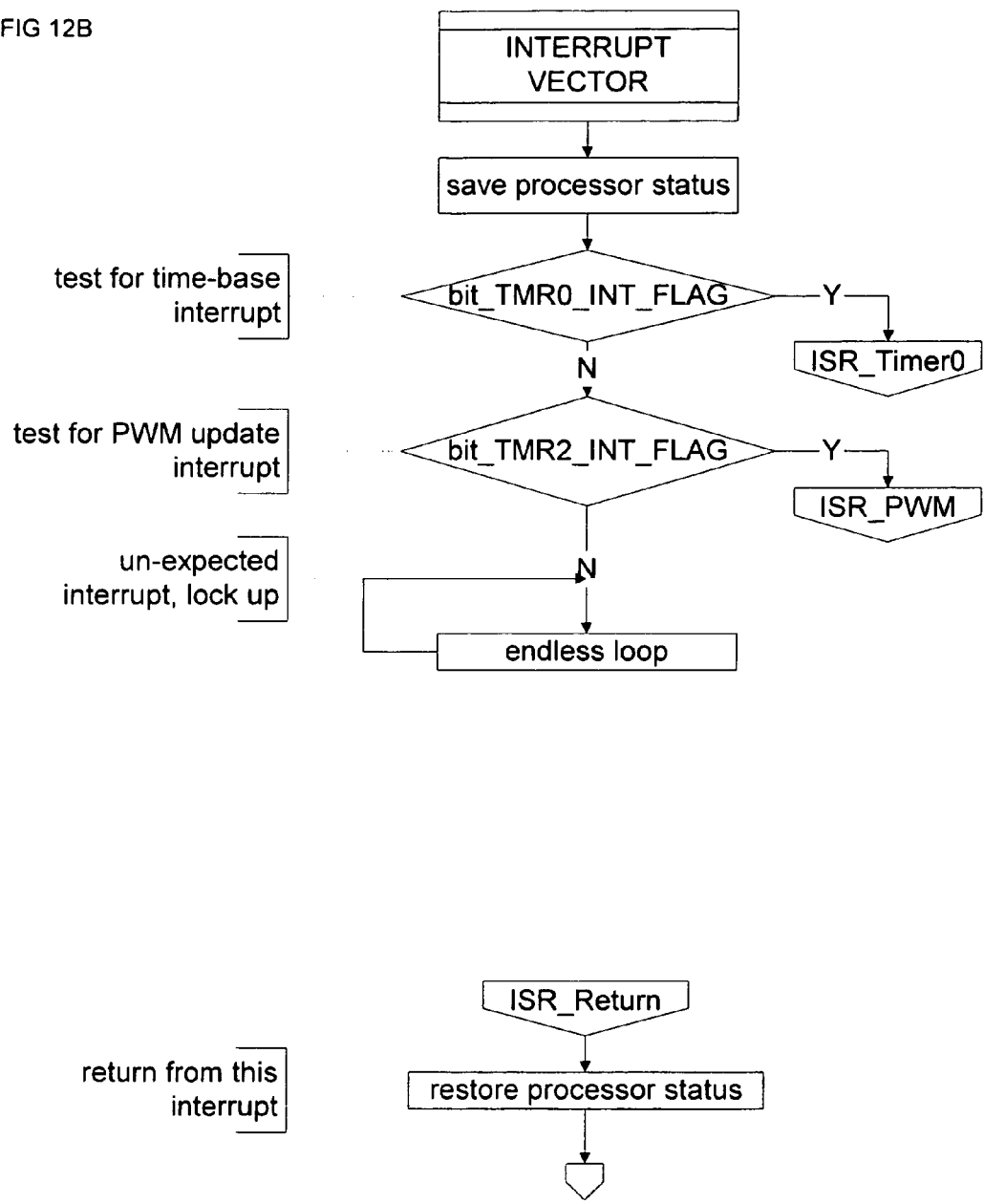

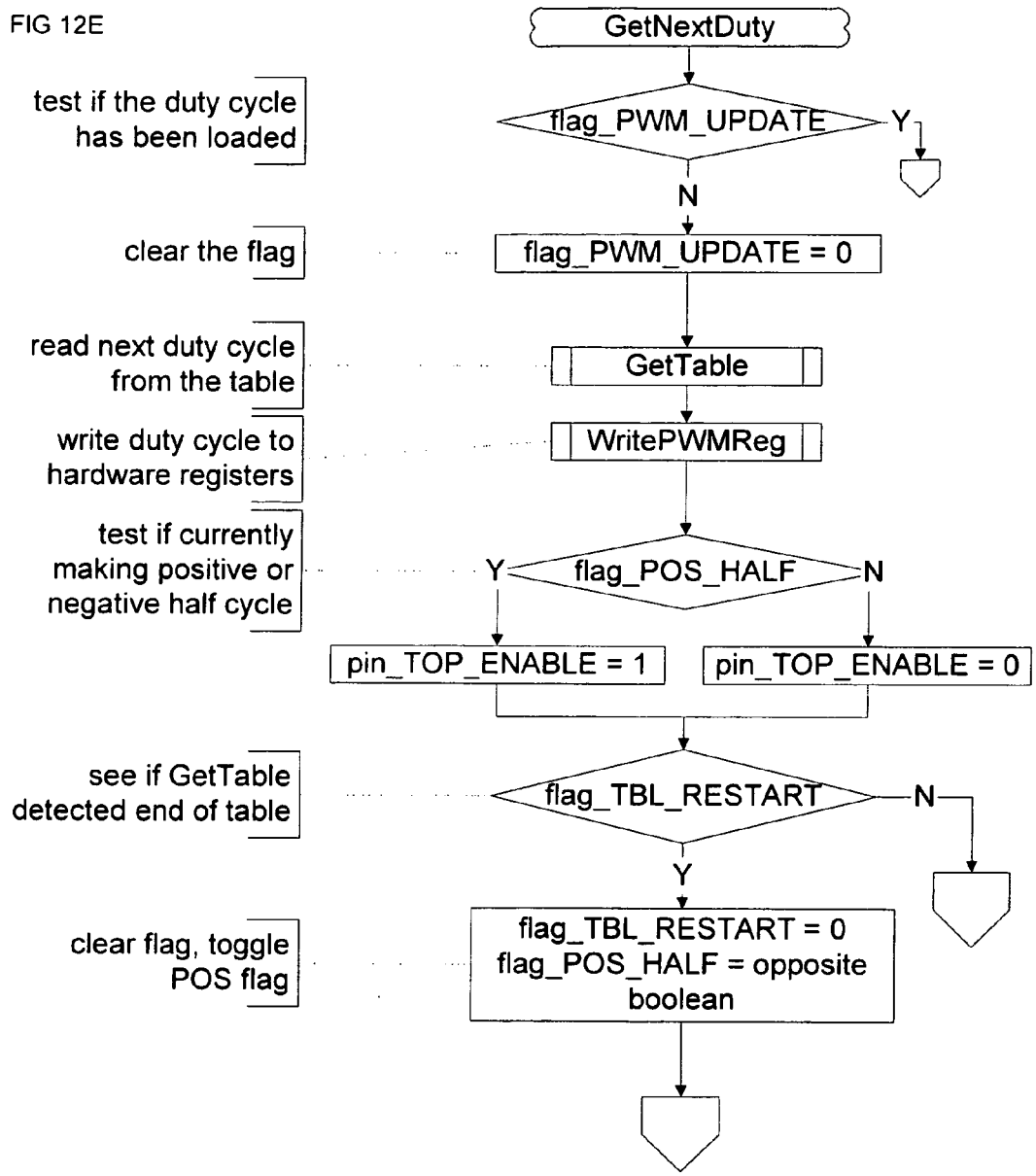

CONTROLLER FOR PERMANENT MAGNET ALTERNATOR

RELATED APPLICATIONS

This application claims priority to U.S. Provisional Application Ser. No. 60/475,273, filed Jun. 2, 2003, the disclosure of which is incorporated herein by reference, and U.S. Provisional Application Ser. No. 60/532,664, filed Dec. 24, 2003.

TECHNICAL FIELD OF THE INVENTION

The present invention relates to machines for converting between mechanical and electrical energy, and in particular to a compact permanent magnet high power alternator suitable for automotive use, and to voltage and current control systems for such generators.

BACKGROUND OF THE INVENTION

An alternator typically comprises a rotor mounted on a rotating shaft and disposed concentrically relative to a stationary stator. The rotor is typically disposed within the stator. However, the stator may be alternatively positioned concentrically within the rotor. An external energy source, such as a motor or turbine, commonly drives the rotating element, directly or through an intermediate system such as a pulley belt. Both the stator and the rotor have a series of poles. Either the rotor or the stator generates a magnetic field, which interacts with windings on the poles of the other structure. As the magnetic field intercepts the windings, an electric field is generated, which is provided to a suitable load. The induced electric field (which is commonly known as a voltage source) is typically applied to a rectifier, sometimes regulated, and provided as a DC output power source. The induced current is typically applied to a rectifier, sometimes regulated, and provided as a DC output power source. In some instances, a regulated DC output signal is applied to a DC to AC inverter to provide an AC output.

Conventionally, alternators employed in automotive applications typically comprise: a housing, mounted on the exterior of an engine; a stator having 3-phase windings housed in the housing, a belt-driven claw-pole type (e.g., Lundell) rotor rotatably supported in the housing within the stator. However, to increase power output the size of the conventional alternator must be significantly increased. Accordingly, space constraints in vehicles tend to make such alternators difficult to use in high output, e.g., 5 KW, applications, such as for powering air conditioning, refrigeration, or communications apparatus.

In addition, the claw-pole type rotors, carrying windings, are relatively heavy (often comprising as much as three quarters of the total weight of the alternator) and create substantial inertia. Such inertia, in effect, presents a load on the engine each time the engine is accelerated. This tends to decrease the efficiency of the engine, causing additional fuel consumption. In addition, such inertia can be problematical in applications such as electrical or hybrid vehicles. Hybrid vehicles utilize a gasoline engine to propel the vehicle at speeds above a predetermined threshold, e.g. 30 Kph (typically corresponding to a range of RPM where the gasoline engine is most efficient). Similarly, in a so-called "mild hybrid," a starter-generator is employed to provide an initial burst of propulsion when the driver depresses the accelerator pedal, facilitating shutting off the vehicle engine when the vehicle is stopped in traffic to save fuel and cut down on emissions. Such mild hybrid systems typically contemplate use of a high-voltage (e.g. 42 volts) electrical system. The alternator in such systems must be capable of recharging the battery to sufficient levels to drive the starter-generator to provide the initial burst of propulsion between successive stops, particularly in stop and go traffic. Thus, a relatively high power, low inertia alternator is needed.

In general, there is in need for additional electrical power for powering control and drive systems, air conditioning and appliances in vehicles. This is particularly true of vehicles for recreational, industrial transport applications such as refrigeration, construction applications, and military applications.

For example, there is a trend in the automotive industry to employ intelligent electrical, rather than mechanical or hydraulic control and drive systems to decrease the power load on the vehicle engine and increased fuel economy. Such systems may be employed, for example, in connection with steering servos (which typically are active only a steering correction is required), shock absorbers (using feedback to adjust the stiffness of the shock absorbers to road and speed conditions), and air conditioning (operating the compressor at the minimum speed required to maintain constant temperature). The use of such electrical control and drive systems tends to increase the demand on the electrical power system of the vehicle.

Similarly, it is desirable that mobile refrigeration systems be electrically driven. For example, driving the refrigeration system at variable speeds (independently of the vehicle engine rpm) can increase efficiency. In addition, with electrically driven systems the hoses connecting the various components, e.g. the compressor (on the engine), condenser (disposed to be exposed to air), and evaporation unit (located in the cold compartment), can be replaced by an electrically driven hermetically sealed system analogous to a home refrigerator or air-conditioner. Accordingly, it is desirable that a vehicle electrical power system in such application be capable of providing the requisite power levels for an electrically driven unit.

There is also a particular need for a "remove and replace" high power alternator to retrofit existing vehicles. Typically only a limited amount of space is provided within the engine compartment of the vehicle to accommodate the alternator. Unless a replacement alternator fits within that available space, installation is, if possible, significantly complicated, typically requiring removal of major components such as radiators, bumpers, etc. and installation of extra brackets, belts and hardware. Accordingly, it is desirable that a replacement alternator fits within the original space provided, and interface with the original hardware.

In general, permanent magnet alternators are well known. Such alternators use permanent magnets to generate the requisite magnetic field. Permanent magnet generators tend to be much lighter and smaller than traditional wound field generators. Examples of permanent magnet alternators are described in U.S. Pat. No. 5,625,276 issued to Scott et al on Apr. 29, 1997; U.S. Pat. No. 5,705,917 issued to Scott et al on Jan. 6, 1998; U.S. Pat. No. 5,886,504 issued to Scott et al on Mar. 23, 1999; U.S. Pat. No. 5,92,611 issued to Scott et al on Jul. 27, 1999; U.S. Pat. No. 6,034,511 issued to Scott et al on Mar. 7, 2000; and U.S. Pat. No. 6,441,522 issued to Scott on Aug. 27, 2002.

Particularly light and compact permanent magnet alternators can be implemented by employing an "external" permanent magnet rotor and an "internal" stator. The rotor comprises a hollow cylindrical casing with high-energy permanent magnets disposed on the interior surface of the cylinder. The stator is disposed concentrically within the rotor casing. Rotation of the rotor about the stator causes magnetic flux from the rotor magnets to interact with and induce current in the stator windings. An example of such an alternator is described in, for example, the aforementioned U.S. Pat. No. 5,705,917 issued to Scott et al on Jan. 6, 1998 and U.S. Pat. No. 5,92,611 issued to Scott et al on Jul. 27, 1999.

The power supplied by a permanent magnet generator varies significantly according to the speed of the rotor. In many applications, changes in the rotor speed are common due to, for example, engine speed variations in an automobile, or changes in load characteristics. Accordingly, an electronic control system is typically employed. An example of a permanent magnet alternator and control system therefor is described in the aforementioned U.S. Pat. No. 5,625,276 issued to Scott et al on Apr. 29, 1997. Examples of other control systems are described in U.S. Pat. No. 6,018,200 issued to Anderson, et al. on Jan. 25, 2000.

The need to accommodate a wide range of rotor speeds is particularly acute in automotive applications. For example, large diesel truck engines typically operate from 600 RPM at idle, to 2600 RPM at highway speeds, with occasional bursts to 3000 RPM, when the engine is used to retard the speed of the truck. Thus the alternator system is subject to a 5:1 variation in RPM. Light duty diesels operate over a somewhat wider range, e.g. from 600 to 4,000 RPM. Alternators used with gasoline vehicle engines typically must accommodate a still wider range of RPM, e.g. from 600 to 6500 RPM. In addition, the alternator must accommodate variations in load, i.e., no load to full load. Thus the output voltage of a permanent magnet alternator used with gasoline vehicle engines can be subject to a 12:1 variation. Accordingly, if a conventional permanent magnet alternator is required to provide operating voltage (e.g. 12 volts) while at idle with a given load, it will provide multiples of the operating voltage, e.g., ten (10) times that voltage, at full engine RPM with that load, e.g., 120 volts. Where the voltage at idle is 120 V, e.g. for electric drive air conditioning, or communications apparatus, the voltage at full engine RPM would be, e.g., 1200 volts. Such voltage levels are difficult and, indeed, dangerous to handle. In addition, such extreme variations in the voltage and current may require more expensive components; components rated for the high voltages and currents produced at high engine RPM (e.g., highway speeds) are considerably more expensive, than components rated for more moderate voltages.

Various attempts to accommodate the wide range of output voltages from permanent magnet alternators have been made. For example, the aforementioned Scott et al U.S. Pat. No. 5,625,276, describes a controller that selectively activates individual windings to achieve a desired output. The windings may be connected in a fully parallel configuration to provide high current at relatively low voltage levels, or in series to provide high voltage capacity. As drive RPM increases, individual windings are, in effect, disconnected from the operative circuit to control output voltage and/or current. However, particularly in compact high power, high speed ratio applications such as motor vehicles, the switching transitions between windings have deleterious effects, especially at the high end of the RPM range.

Other attempts have involved controlling the RPM of the alternator, and thus its voltage, independently of the engine RPM. An example of such an attempt is described in U.S. Pat. No. 4,695,776, issued Sep. 22, 1987 to Dishner. These solutions tend to involve mechanical components that are large, require maintenance and are subject to wear.

Other attempts have involved diverting a portion of the magnetic flux generated in the alternator to modulate output voltage. An example of a system is described in U.S. Pat. No. 4,885,493 issued to Gokhale on Dec. 5, 1989. Flux diversion, however, typically requires additional mechanical components and can be slow to react.

Motor vehicle electrical systems including a flexible topology DC-to-DC converter for coupling an engine-driven alternator to vehicle electrical loads at a mode-dependent transfer ratio are also known. An example of such a system is described in U.S. Pat. No. 6,469,476, issued to Barrett on the Oct. 22, 2002. In such system the output voltage of the alternator is regulated based the load voltage, and the converter is operable in one of a number of different modes based on engine speed, including a forward boost mode, a forward unity mode, and a forward buck mode. In the forward boost mode, the converter output voltage is boosted above that of the alternator to enable battery charging at low engine speeds; in the forward unity mode, the alternator output voltage is transferred to the battery and electrical loads at a unity transfer ratio; and in the forward buck mode, the converter output voltage is reduced below that of the alternator to enhance the alternator power output at medium-to-high engine speeds.

Rectification and regulation can be effected as a single process using a SCR bridge with phase angle control of duty cycle. However, the voltage output and ripple contents can vary significantly when the SCR phase angle method is used to control a AC power source that varies in magnitude and changes alternating frequency very rapidly. In addition, the use of such a SCR bridge to derive a regulated output signal at voltages typically employed in automotive systems from the output of the alternator is likely to involve relatively higher peak currents, and higher switching (IR) losses manifested by the generation of significant amounts of heat and electromagnetic interferences.

Thus, there is a need for a relatively inexpensive and efficient control system that can accommodate the wide variations in the output of a permanent magnet alternator. Such a system capable of regulating voltage within close tolerances, e.g. only one or two percent variation in output, and with high power conversion efficiency, and, accordingly, relatively little heat to be dissipated is desirable. Further, there is a need to minimize heat generated by power switching devices in the control system, and electromagnetic radio frequency interference caused by abrupt transitions in current and voltage (spikes) during switching.

SUMMARY OF THE INVENTION

In accordance with various aspects of the present invention, a relatively inexpensive, control system that can accommodate the wide variations in the output of a permanent magnet alternator, and provides relatively accurate voltage regulation, is provided by one or more of the following:

A rectification and regulation system to rectify and regulate the output voltage of the alternator at a relatively high voltage (and relatively low current), and then using one or more separate DC to DC converters and/or DC to AC converters to convert the initial relatively high voltage to the desired output voltage.

A rectifier/limiter used as an electrical power source to a boost type regulator.

A multimode rectifier/limiter which selectively operates in full wave rectification, full duty cycle half wave rectification, and pulse width modulated half wave rectification modes depending upon alternator output and/or the output of the rectifier/limiter.

Increasing conversion efficiency and reducing radio frequency interference by limiting the rate of change of the voltage across and current through power switches employed in the system to minimize the switching energy that would otherwise be dissipated in the power switches as heat and, preferably, recapturing that switching energy directing it to the load.

A DC to AC inverter bridge wherein the high side switch of the active pair is maintained on for the entire half cycle and the lower, the ground side switch is modulated as opposed to modulating both switches of the pair, and/or the filter capacitor is discharged at loads below a predetermined point, (sufficient to discharge the inductor) by turning on the high side of the opposite leg (operating it in a mutually exclusive fashion with low side of the active leg) for wave shaping to make sure that the inverter filter inductor and the capacitor are reset.

BRIEF DESCRIPTION OF THE DRAWING

The present invention will hereinafter be described in conjunction with the figures of the appended drawing, wherein like designations denote like elements (unless otherwise specified).

FIGS. 2A and 2B are graphical representations of the operational modes of the rectifier/limiter of FIG. 2.

FIGS. 3A–3K (collectively referred to as FIG. 3) are schematic diagrams of the respective components of the rectifier/limiter of FIG. 2.

FIG. 3L is a graphic illustration of the voltage of a drive signal to an FET power switch and the resistance of the FET during the operation of turning off the FET.

FIG. 3M is a graphic illustration of the voltage and current that cause switching loss during the operation of turning off an FET power switch.

FIG. 6 is a schematic block diagram of a DC-DC converter.

FIGS. 9A and 9B (collectively referred to as FIG. 9) are graphic illustrations of the operation of the switches of a PWM sine wave inverter: FIG. 9A illustrating conventional operation wherein the switches of each pair are actuated simultaneously; FIG. 9B illustrating operation under low load conditions in accordance with various aspects of the present invention.

FIGS. 11A–11L (collectively referred to as FIG. 11) are a schematic flowchart of a microcontroller program for effecting operation of the rectifier/limiter of FIG. 3.

FIGS. 12A–12H and 12K–12Q (collectively referred to as FIG. 12) are a schematic flowchart of a microcontroller program for effecting operation of the inverter of FIG. 8.

DETAILED DESCRIPTION OF THE PREFERRED EMBODIMENT

Figure 1:
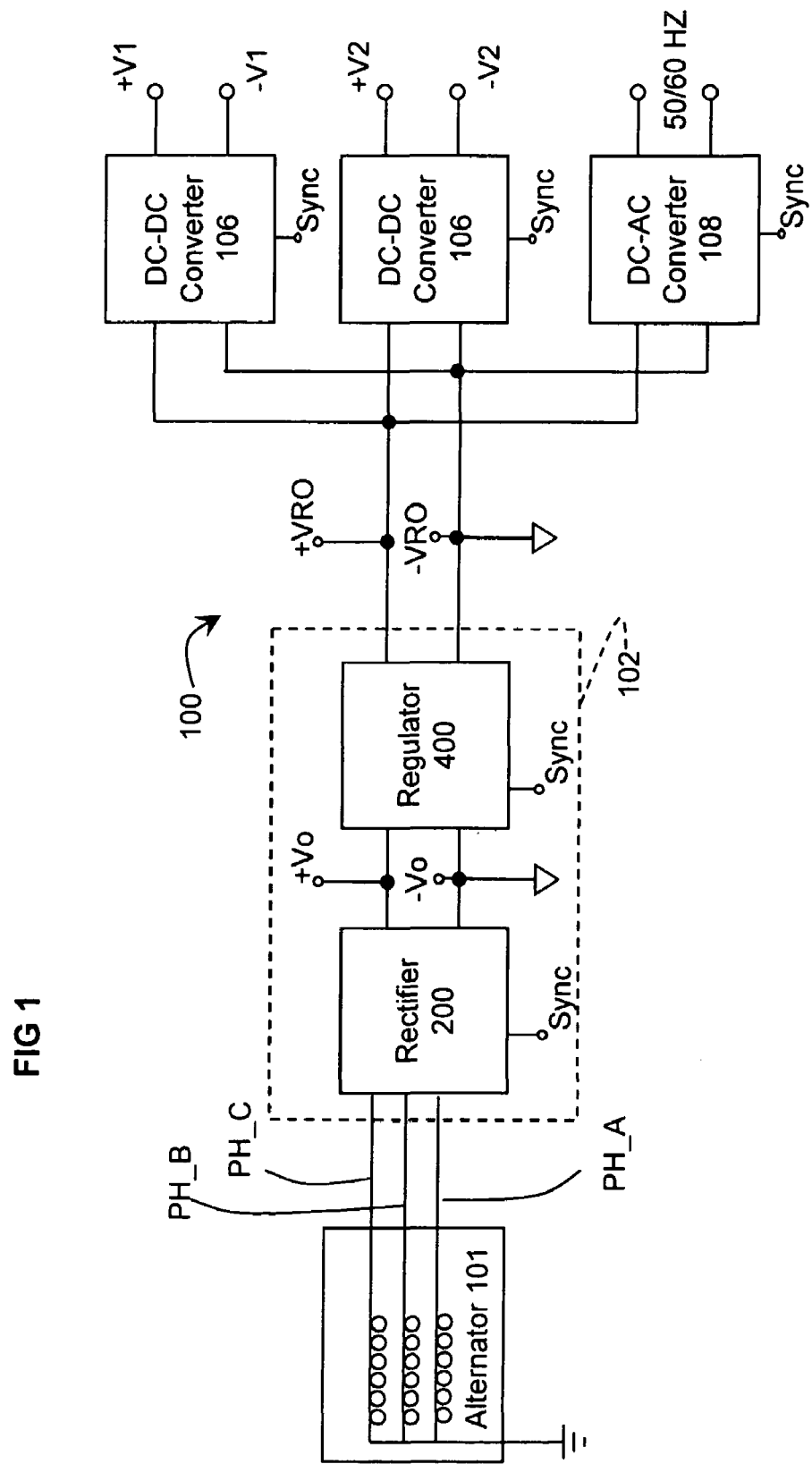
FIG. 1 is a block schematic of a system for converting between mechanical and electrical energy in accordance with various aspects of the present invention.

Referring now to FIG. 1, a system 100 for converting between mechanical and electrical energy in accordance with various aspects of the present invention comprises: an alternator 101, a rectification and regulation system 102 (suitably comprising a rectifier 200 and regulator 400), one or more DC-DC converters 106, and, suitably, a DC-AC inverter 108.

In general, alternator 101 provides multi-phase (e.g. three-phase) unregulated AC output signals, phase A (PH_A), phase B (PH_B), and phase C (PH_C) that vary significantly in accordance with drive RPM. Rectification and regulation system 102 rectifies the AC output signal from alternator 101, i.e. converts it into a DC signal (VRO), and regulates the voltage of that signal at a predetermined level, e.g. 180V, i.e., maintains the voltage level with a tolerance of ±2%. The regulated DC signal (VRO) is then applied to DC-DC converters 106 for conversion to a desired output voltage level(s) (V1, V2), e.g., 12, 24 and/or 42 volts DC and, if desired, to DC-AC inverter 108 which generates an AC signal of desired waveform, frequency, and voltage, e.g. 50/60 Hz, 120 V RMS sine wave. The predetermined voltage level VRO, e.g. 180V, output by rectification and regulation system 102 is chosen to support the desired outputs. In the preferred embodiment, the output VRO of rectification and regulation system 102 is chosen to be approximately 180V, which, when applied to DC to AC inverter 108 produces a 170 V peak, that is, 120V RMS sine wave. The same regulated 180V DC signal VRO is fed to DC-to-DC step down converter(s) 106 for producing 12, 24 and/or 42V DC outputs. Since VRO is relatively high, relatively low levels of current flows into the input section of DC-to-DC converters 106, yielding higher power conversion efficiency.

Use of rectification and regulation system 102 to rectify and regulate the output voltage of the alternator at a relatively high voltage, and then using one or more separate DC to DC converters and/or DC to AC inverter to convert the initial relatively high voltage to the desired output voltage is particularly advantageous in a number of respects. Rectification and regulation at relatively high voltages equates to use of relatively low current levels, as compared to the magnitude of current encountered if rectification and regulation were performed at lower voltages. The use of lower magnitude current reduces both conduction and switching losses in connection with the rectification and regulation functions. Thus, less heat is generated. Further, performing all rectification and regulation separately from the conversion function permits use of less expensive, more rugged and simpler voltage output stages, and facilitates generation of multiple voltage outputs, e.g., 12, 24 or 42 V DC, and 120 volts RMS 50/60 Hz AC.

Alternator 101 is suitably a permanent magnet alternator, and preferably an alternator of the type described in commonly owned co-pending U.S. Provisional Patent Application No. 60/486,831 by Charles Y. LaFontaine and Harold C. Scott, entitled "Compact High Power Alternator" and filed on Jul. 10, 2003. The aforementioned LaFontaine et al application Ser. No. 60/486,831 is hereby incorporated by reference as if set forth verbatim herein.

Briefly, alternator 101 comprises a rotor mounted on a rotating shaft and disposed concentrically relative to a stationary stator. The stator includes respective phase windings, A, B and C connected together at one end (neutral), in a star configuration. The winding neutral defines a second floating ground (designated by respective vertically spaced horizontal lines of varying lengths forming a triangle and not to be confused with a first ground symbolized by a closed triangle). An external energy source, such as a motor or turbine, commonly drives the rotating element, directly or through an intermediate system such as a pulley belt. In automotive applications, alternator 101 is typically mounted under hood, and belt driven from the vehicle engine. Relative motion between rotor and stator causes voltage to be induced in the windings. Alternator 101 is preferably designed such that it generates a predetermined minimum voltage at idle or a minimum RPM under full load conditions. As noted above, in automotive applications, drive RPM can vary widely, e.g. from 600 RPM at idle, to 3000 RPM for large diesel trucks, (5:1 variation), 600 to 4,000 RPM for light duty diesels, and from 600 to 6500 RPM gasoline vehicle engines. In addition, the alternator must accommodate variations in load, i.e., no load to full load. Thus the output voltage of a permanent magnet alternator 101 when used with a gasoline vehicle engine can be subject to a 12:1 variation. Accordingly, if a conventional permanent magnet alternator is required to provide operating voltage (e.g. 18 volts) while at idle speeds with a given load, it will provide multiples of the operating voltage, e.g., ten (10) times that voltage, at full engine RPM with that load, e.g., 180 volts.

Rectification and regulation circuit 102 rectifies the AC output signal from alternator 101, i.e., converts it into a DC signal, and regulates the voltage of that signal, i.e., maintains the voltage level of the signal within a predetermined range of values, e.g. 180V±2%. Rectification and regulation system 102 can comprise any system capable of providing a suitably regulated DC signal (VO) over the range of three-phase AC signals provided by alternator 101. For example, system 102 can comprise a SCR bridge with phase angle control of duty cycle (and suitably employing switching loss control as will be described). However, system 102 preferably comprises a rectifier/limiter 200, cooperating with a regulator 400, preferably a boost type regulator. Rectifier/limiter 200 can comprise any circuit capable of rectifying the widely varying output of alternator 101, and limiting its output to a predetermined value, reducing the range of variation in the input signal VO to regulator 400 (as compared to the alternator output). For example, rectifier/limiter 200 can be implemented by an SCR bridge such as described above. However, the preferred embodiment employs a multimode rectifier/limiter 200 which selectively operates in full wave rectification, full duty cycle half wave rectification, or pulse width modulated half wave rectification modes depending upon alternator output and/or the output of the rectifier/limiter, and limits its output to a predetermined value slightly below the predetermined output value of system 102, e.g. 170 V. In some instances it may be desirable to include what is, in effect, an transitional mode of operation between full wave rectification and half wave rectification wherein the system dithers between full wave and half wave rectification modes. More specifically, within certain ranges of RPM, under certain load conditions, full wave rectification may generate output levels in excess of that desired. However, half wave rectification in such circumstances may not provide sufficient power output. To accommodate those cases, when certain RPM and load conditions are encountered, dithering between half wave rectification and full wave rectification is effected, such that the out voltage (and output power) of circuit 200 is effectively the time average of the parameter in the two modes. The relative time periods of half wave rectification and full wave rectification determines the desired output. A preferred embodiment of rectifier/limiter 200 is shown in FIG. 2. Preferred embodiments of the respective components of such a rectifier/limiter 200 are shown in FIG. 3.

Figure 4:
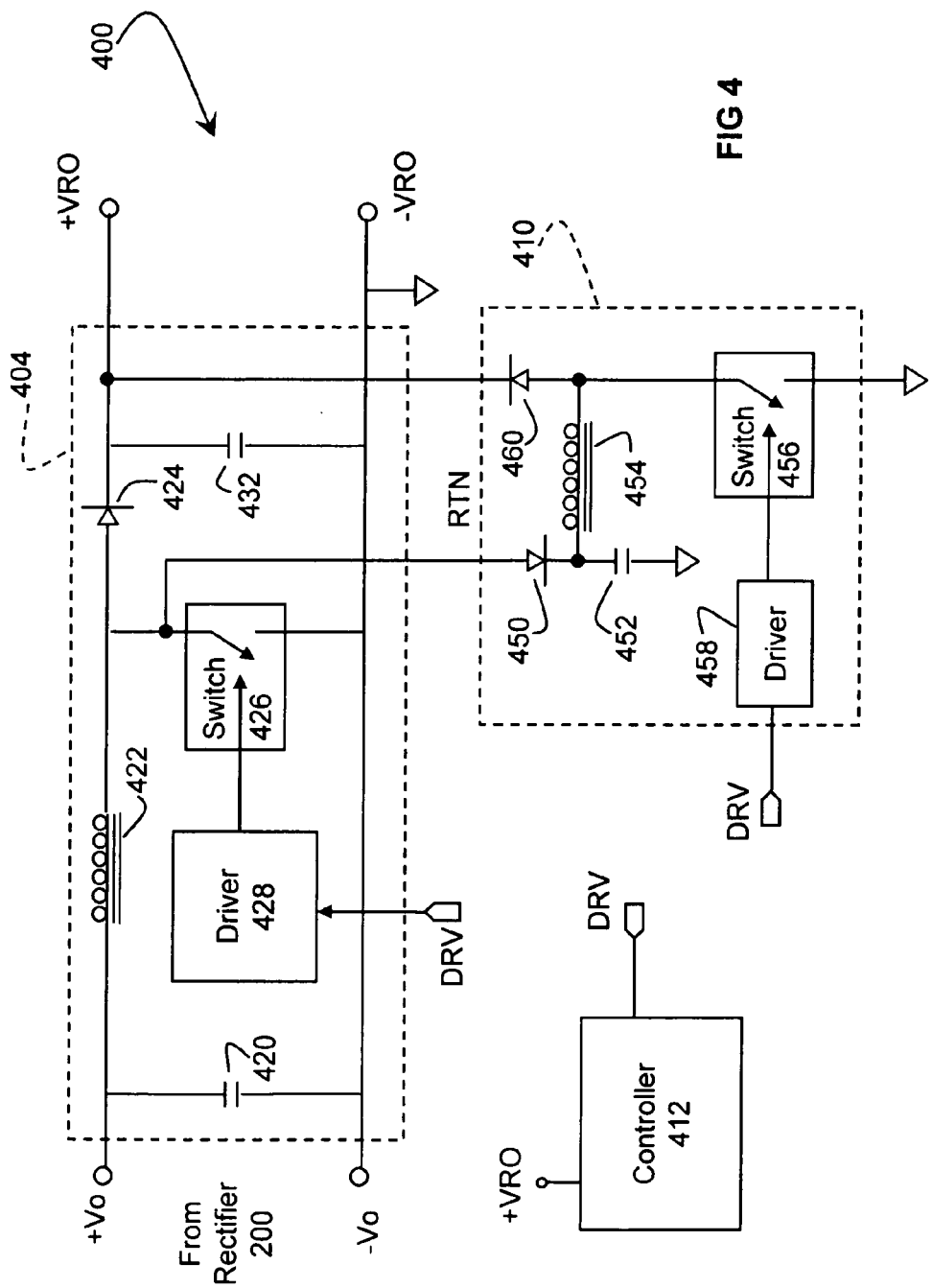
FIG. 4 is a schematic block diagram of a boost regulator in accordance with various aspects of the present invention.

Regulator 400, receptive of the output of rectifier/limiter 200, provides constant voltage output VRO at a predetermined level, e.g. 180V±2%. Regulator 400 is preferably a boost type regulator. Use of a boost type regulator is advantageous in a number of respects. It is particularly simple (avoiding the necessity of a transformer), efficient, and scalable. When the input to regulator 400 approaches the predetermined maximum (e.g. at RPM corresponding to highway speeds), the boost is essentially inactive, consuming little energy, and generating little heat. Further, a boost type topology inherently limits the current in the event of a short circuit. A preferred embodiment of a boost type regulator 400 is shown in FIG. 4. Preferred embodiments of the respective components of such a boost type regulator 400 are shown in FIG. 5.

DC-DC converters 106 derive the desired level output voltage(s), e.g. 12, 24, or 42 volts or other desirable DC voltage, from the relatively high voltage output of rectification and regulation system 102 (e.g. regulator 400). DC-DC converters 106 can be implemented using any suitable topology, such as, for example, half bridge, full bridge in the switch mode, push pull, fly back, forward converter, or back boost converter. DC-DC converter 106 is implemented utilizing a conventional full bridge, pulse width modulated, stepped down, topology. A preferred embodiment of a DC-DC converter 106 is shown in FIG. 6. Preferred embodiments of the respective components of such a boost type regulator 400 are shown in FIG. 7.

DC-AC inverter 108 produces an AC output signal of the desired voltage and waveform, e.g., 120 volts RMS 50/60 Hz AC, from the output of rectification and regulation system 102 (e.g. regulator 400). In general a suitable inverter bridge comprises respective pairs of "high side" and "lower side" switching devices. One pair is associated with the positive half of the AC cycle, and the other associated with a negative half of the AC cycle. The switching devices of each pair are connected in series with a suitable output filter, between a regulated DC rail, i.e., the output of rectifier and regulator system 102, and common ground, the high side switch is connected between positive rail and output filter, and the low side switch connected between output filter and common ground. For ease of reference, the pair of switches associated with the instantaneous half cycle will hereinafter sometimes the referred to as the "primary" switches, and the pair of switches associated with the other half cycle sometimes hereinafter referred to as the "complementary" switches. In general, an AC signal is generated by cyclically rendering conductive, on a mutually exclusive basis, a first pair of switching devices (e.g. the switches associated with the positive half cycle), then the second pair of switching devices (e.g. switches associated with the negative half cycle), for periods corresponding to one half cycle (180°) of the desired frequency. This generates an essentially square wave shape, which is smoothed by the output filter. Conventionally, wave shaping to better approximate a sine wave is effected by pulse width modulating the current through the primary switches. In some instances, wave shaping can be further facilitated by providing a discharge path for the output filter through at least one of the complementary switches during at least a portion of the "dead time" between pulses through the primary switches.

Figure 8:
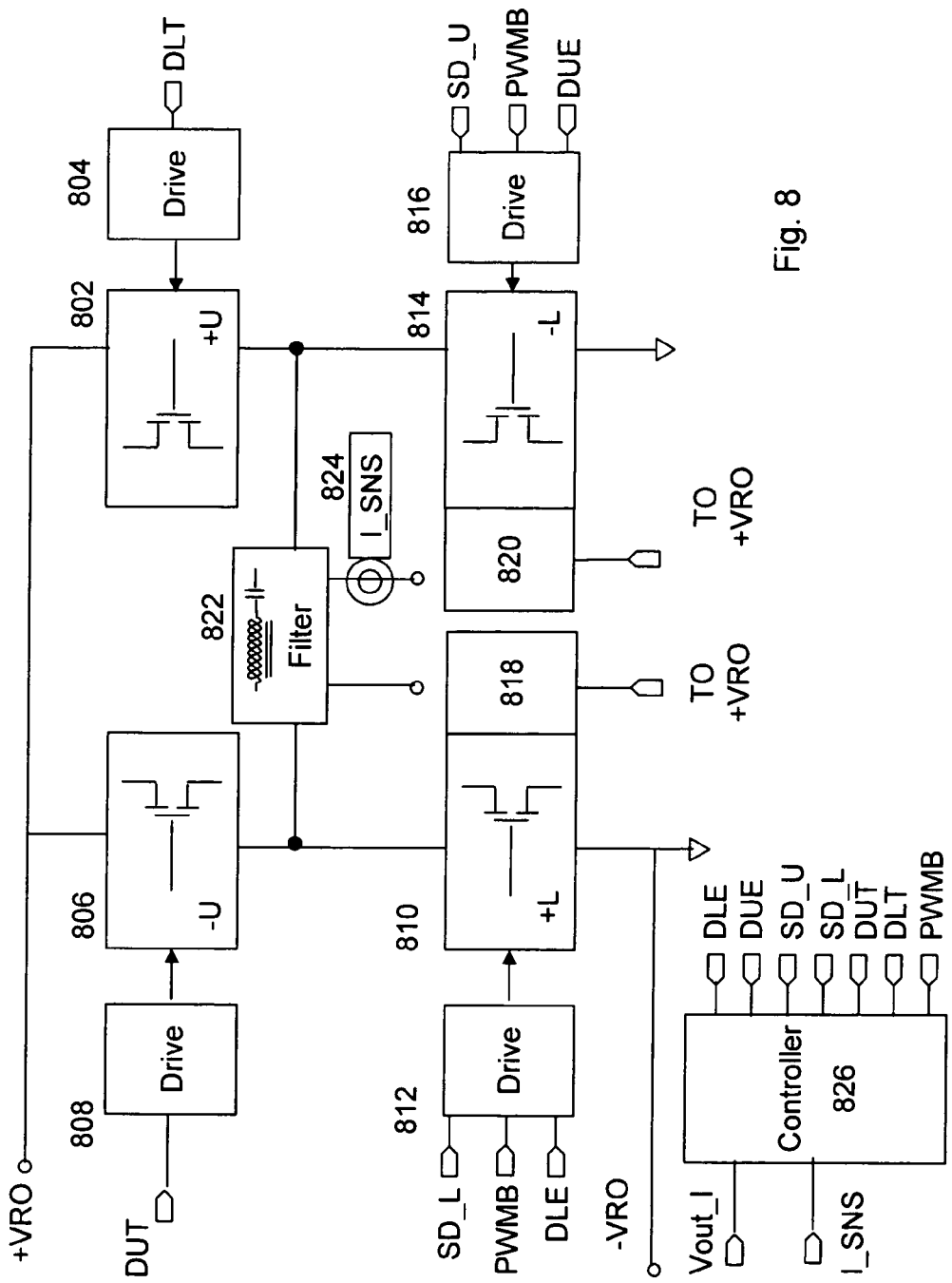
FIG. 8 is a simplified schematic block diagram of a sine wave inverter.

In the preferred embodiment, inverter 108 produces an output signal having a predetermined frequency and wave shape, e.g. 60 hertz sine wave, by maintaining the high side switch of the pair associated with the instantaneous half of the AC cycle "on" or the entire half cycle and modulating the lower (ground side) switch, (as opposed to modulating both switches of the pair), and, when the load (current draw) is below a predetermined level (but not when the load reaches or exceeds that level), turning on the high side of the complementary pair (associated with the other half cycle) in a mutually exclusive fashion with low side of the primary switches) to make sure that the inverter filter inductor and the capacitor are reset. Such a preferred inverter 108 is shown in FIG. 8, and with waveforms in FIG. 9. Preferred embodiments of the respective components of such an inverter 108 are shown in FIG. 10.

As will be further discussed, provisions are preferably made within rectifier/limiter 200, regulator 400, DC-DC converter 106 and inverter 108 to limit the rate of change of the voltage across, and current through, power switches employed in the system to minimize the switching energy that would otherwise be dissipated as heat, and, preferably, recapture that switching energy and direct it to the load.

Rectifier/Limiter 200

As previously noted, rectifier/limiter 200 can comprise any circuit capable of rectifying the widely varying output of alternator 101, and limiting its output to a predetermined value. Preferably, however, rectifier/limiter 200 comprises a multi-mode circuit which selectively operates in full wave rectification, full duty cycle half wave rectification, transitional dithering between full wave and full duty cycle half wave rectification, or pulse width modulated half wave rectification modes depending upon alternator output and/or the output of rectifier/limiter 200. In general, full wave rectification is most efficient, and, accordingly, it is desirable to operate in that mode, except when full wave rectification would generate a voltage in excess of the predetermined maximum output level, e.g. 170 volts. As will be explained, the points at which the operational mode is switched between full wave rectification and half wave rectification can be determined based upon an indicia signal (V_SNS) representative of the output that would be produced by full wave rectification under instantaneous RPM and load conditions irrespective of the actual rectification mode. Indicia signal V_SNS, as will be explained, is suitably directly proportional to the output voltage level that would be generated by full wave rectification of the alternator output under instantaneous RPM and load conditions (irrespective of the actual rectification mode) except that increased IR drop experienced in alternator 101 during half wave rectification mode operation is reflected as a decreased voltage in the indicia signal. The point at which pulse width modulation of the half wave rectifier signal is initiated is determined by monitoring the rectifier/limiter output.

Rectifier/limiter 200, upon startup, initially operates in the full wave rectification mode. When rectifier/limiter 200 is in the full wave rectification mode a switch to half wave rectification is made when indicia signal V_SNS exceeds a predetermined level (FULL_UPPER_LIMIT) corresponding to the maximum desired output of rectifier/limiter 200 to maintain the output of rectifier/limiter 200 below the maximum level. When rectifier/limiter 200 is in the half wave rectification mode a switch to full wave rectification is made when indicia signal V_SNS drops below a predetermined lower threshold level (HALF_LOWER_LIMIT) corresponding to a voltage equal to or, preferably, slightly less than the maximum desired output of rectifier/limiter 200, and indicating that full wave rectification will once again produce an output within the desired limits. On the other hand, if rectifier/limiter 200 is in the half wave rectification mode, and the output of rectifier/limiter 200 reaches the maximum desired output level, pulse width modulation is initiated to prevent the maximum level from being exceeded. Dithering occurs when a transition is made between full wave rectification and half wave rectification modes, and either half wave rectification results in a value of indicia signal V_SNS less than HALF_LOWER_LIMIT, or full wave rectification results in a value of indicia signal V_SNS greater than FULL_UPPER_LIMIT. During a dithering operation, the output of rectifier/limiter 200 is, effectively, the time average of the instantaneous output of successive cycles of full wave rectification and half wave rectification, thus providing an output signal within the desired limits. The band of conditions in which dithering occurs is determined by the difference between the upper and lower threshold values.

Alternatively, the points at which the operational mode is switched between full wave rectification and half wave rectification (as well as initiation of pulse width modulation) can be determined by monitoring the output VO of rectifier/limiter 200 Referring briefly to FIG. 2A, rectifier/limiter 200 initially operates in the full wave rectification mode. As RPM increases (assuming constant load), the output voltage of rectifier/limiter 200 (e.g., generally indicated as 260 in FIG. 2A) increases proportionately. Rectifier/limiter 200 is maintained in full wave rectification mode until, in effect, the output VO reaches a predetermined limit corresponding to the desired maximum output value of rectifier/limiter 200, e.g., 170 V. The maximum value is reached, for example, when the speed increases to approximately a predetermined multiple of idle RPM, e.g., 2.5 times idle speed. When (e.g., point 262 in FIG. 2A) output VO exceeds the desired maximum level (corresponding to indicia signal V_SNS exceeding upper threshold FULL_UPPER_LIMIT), rectifier/limiter 200 is switched to half wave rectification mode (initially with full duty cycle). Switching to half wave rectification (full duty cycle) effectively decreases output voltage VO by a factor of between approximately 50% and 60% (e.g., point 264 in FIG. 2A), depending upon load (current draw) conditions (the greater the load, the greater the drop). Assuming no dithering condition, (e.g. the half wave rectification output voltage VO, when first switched, is greater than a lower threshold level corresponding to HALF_LOWER_LIMIT), as RPM continues to increase rectifier/limiter 200 will continue to operate in the full duty cycle half wave rectification mode until the output voltage of rectifier/limiter 200 reaches a predetermined level, preferably the desired maximum output value (point 266 in FIG. 2A), at which point pulse width modulation of the half wave rectified output of rectifier/limiter 200 is effected to limit the output to the predetermined level. On the other hand, if, when rectifier/limiter 200 is operating in the half wave rectification mode, the RPM decreases (or the load increases) to the point that the output VO drops below the lower threshold level (corresponding to HALF_LOWER_LIMIT), full wave rectification of operation is resumed.

Referring briefly to FIG. 2B, if, when a transition is made between full wave rectification and half wave rectification modes, either half wave rectification results in output VO dropping below the lower threshold level (corresponding to HALF_LOWER_LIMIT) (point 268 in FIG. 2B), or full wave rectification results in an output VO higher than the desired maximum level (corresponding to FULL_UPPER_LIMIT) (e.g., point 270 in FIG. 2B), rectifier/limiter 200 suitably operates in the dithering mode, switching between full wave and half wave rectification such that the time averaged output of rectifier/limiter 200 is within the desired limits. Rectifier/limiter 200 typically continues to operate in the dithering mode until the RPM increases (or load decreases) to a point where the half wave rectification mode operation generates a voltage in excess of the lower threshold level (corresponding to HALF_LOWER_LIMIT) (e.g., point 272 in FIG. 2B) or the RPM decreases (or load increases) to a point where the full wave rectification mode operation generates a voltage less than or equal to the desired maximum level (corresponding to FULL_UPPER_LIMIT).

Figure 2C:
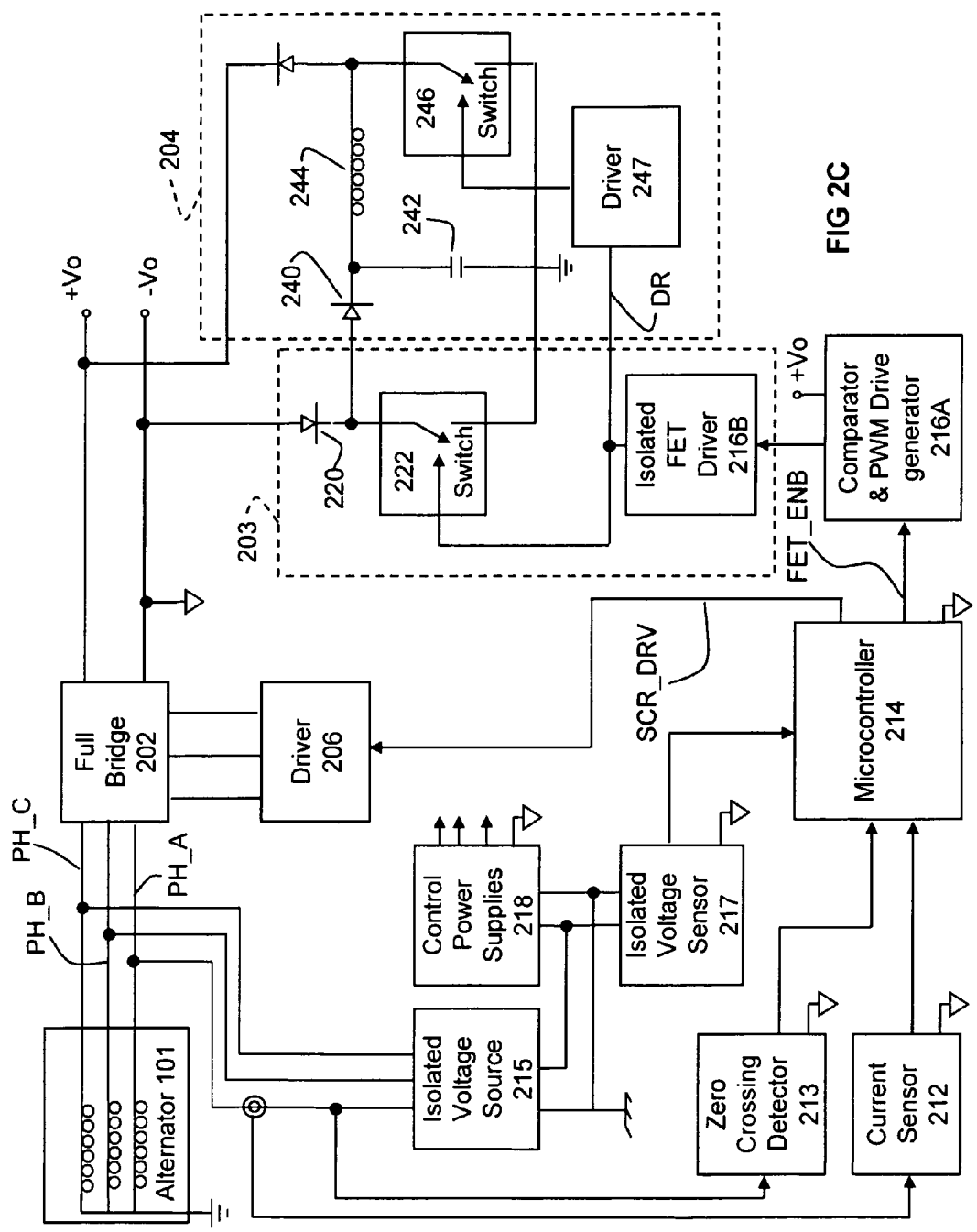
FIG. 2C is a schematic block diagram of a preferred embodiment of a rectifier/limiter in accordance with various aspects of the present invention.

Referring to FIG. 2C, rectifier/limiter 200 preferably comprises: a rectifier bridge circuit 202 cooperating with suitable buffer and driver circuit 206; a half bridge conversion circuit 203 cooperating with a suitable comparator and PWM drive generator 216A and an isolation boundary (buffer) circuit 216B; a zero crossing detector circuit 213; a microprocessor control 214; a isolated power voltage source 215; a voltage sense isolation circuit 217; and a low voltage power supply 218. Rectifier/limiter 200 preferably also includes a switching loss reduction circuit 204, and, if desired, may also include a current sensing circuit 212.

Figure 3A:
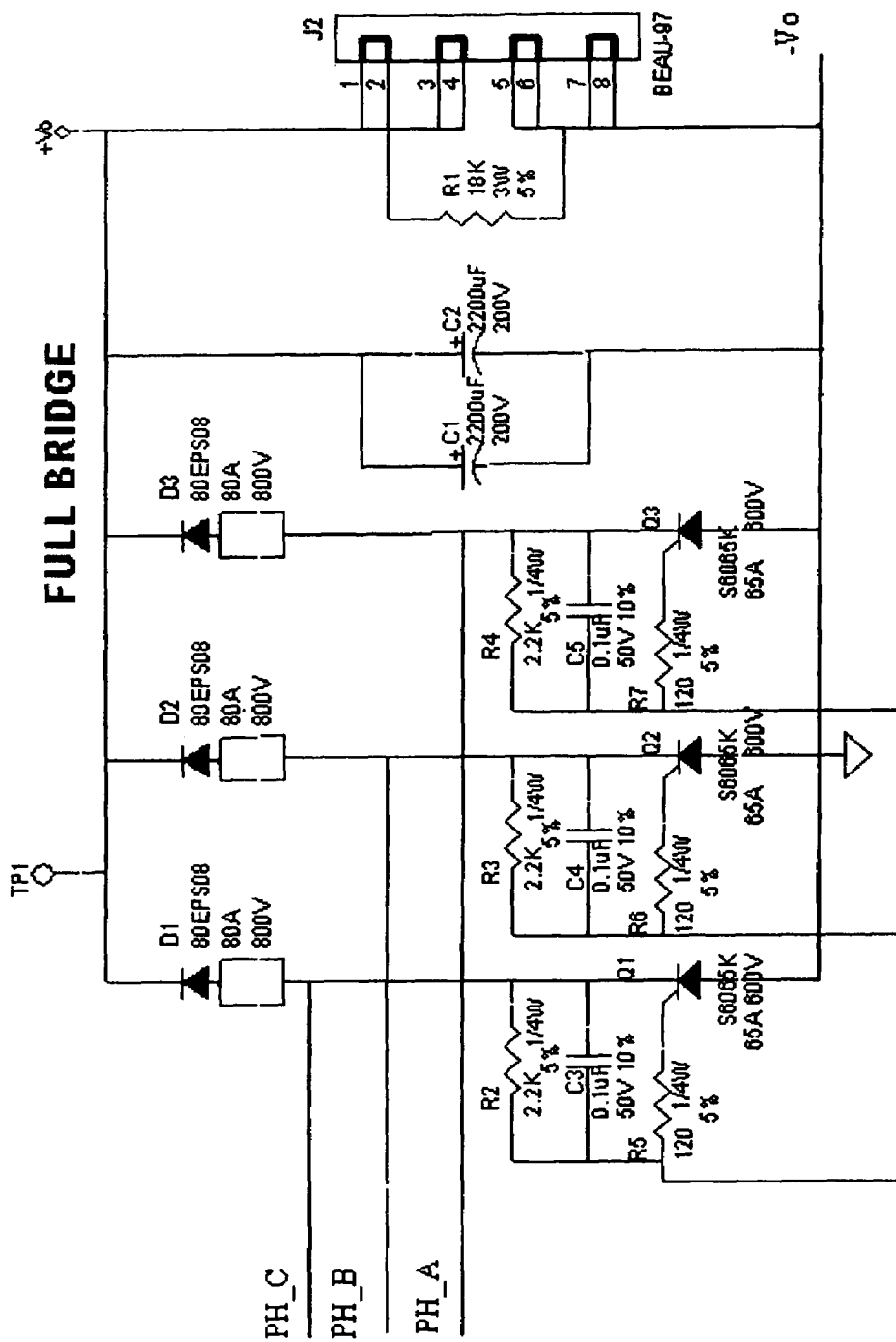

Rectifier bridge circuit 202, when actuated in response to a control signal SCR_DRV from microprocessor control 214 (as conditioned by buffer and driver circuit 206), provides full wave rectification of the three-phase AC signal from alternator 101, generating a DC signal VO between terminal +VO and common ground (−VO). Rectifier bridge circuit 202 suitably comprises a respective parallel leg associated with each AC phase, each leg comprising a serially connected "upper" diode and "lower" (ground side) power switch, e.g. SCR, with the associated alternator phase connected to the juncture of SCR and diode. As will be discussed, the SCRs are enabled during full wave rectification mode operation, and disabled during half wave rectification mode operation (both full duty cycle and PWM). A preferred embodiment of rectifier bridge circuit 202 is shown in FIG. 3A.

Figure 3B:
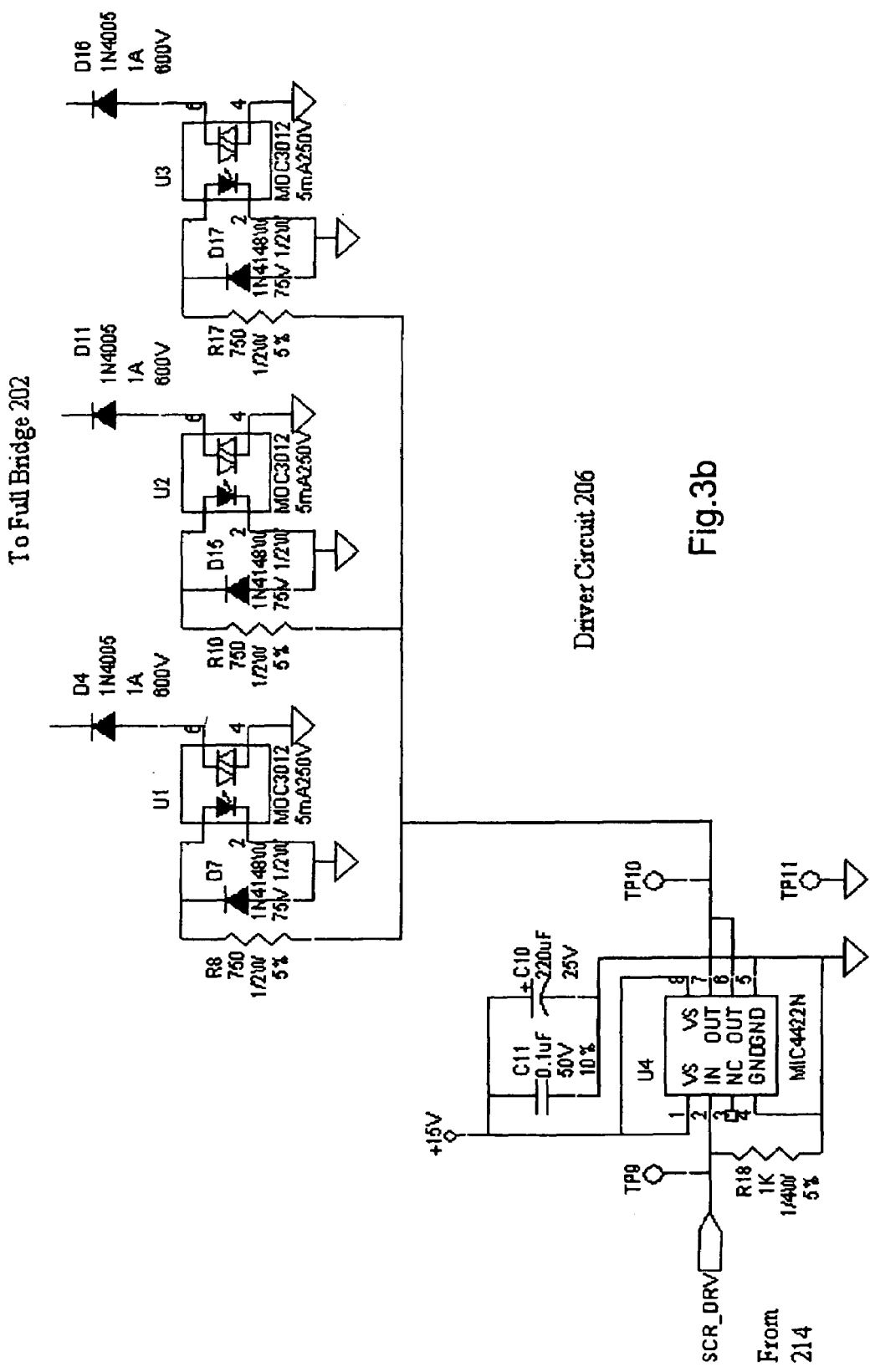

Buffer and driver circuit 206 receives the SCR_DRV control signal from microprocessor control 214, and responsively generates drive signals suitable for application to the components (e.g. SCRs) of rectifier bridge circuit 202. A preferred embodiment of buffer and driver circuit 206 is shown in FIG. 3B.

Figure 3C:
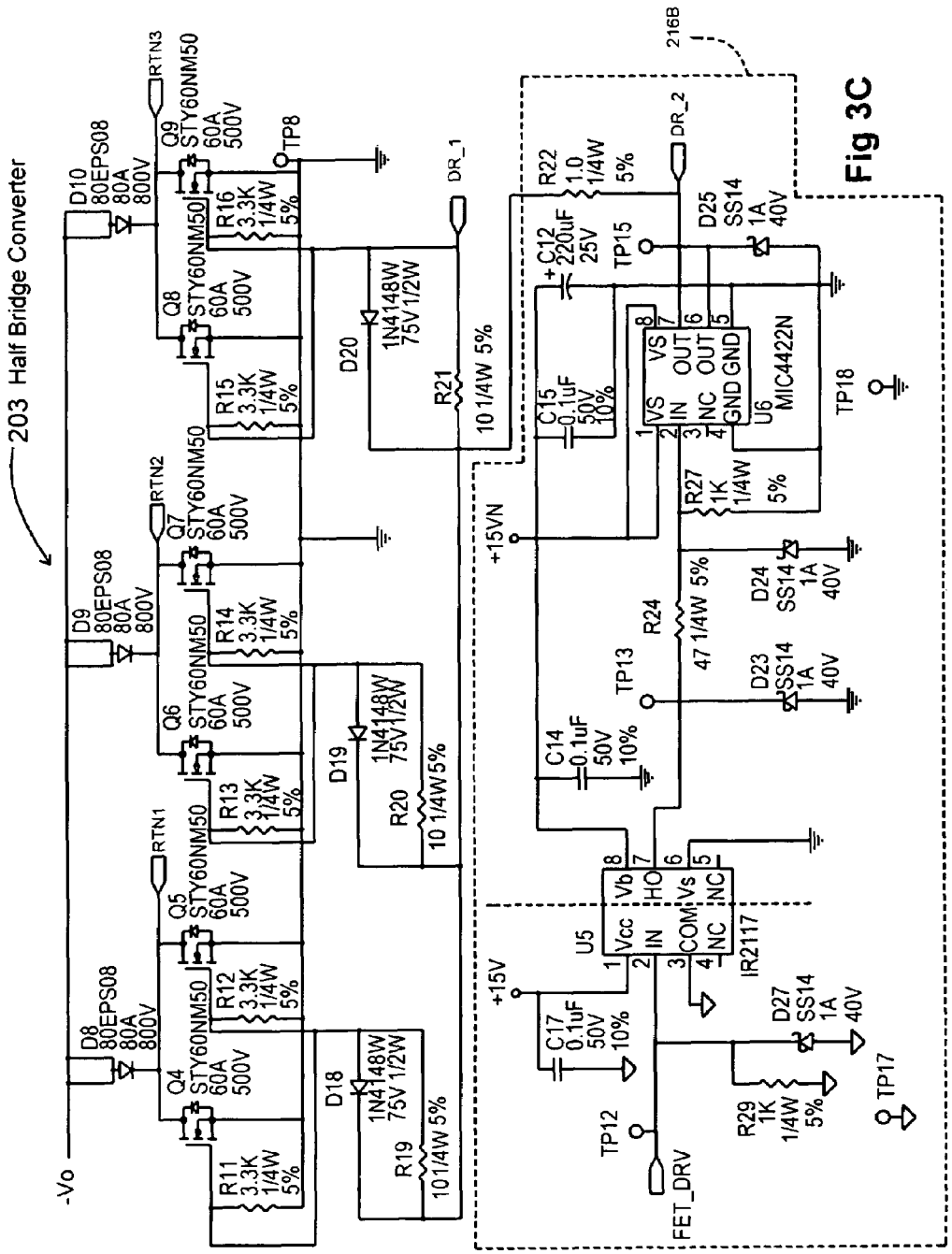

Half bridge conversion circuit 203, when actuated, effectively converts rectifier bridge circuit 212 into a half wave rectifier, by disabling the SCRs and selectively connecting the negative output terminal (−VO) of circuit 200, i.e., common ground, to the neutral of the alternator three-phase windings, i.e., the second floating ground. Half bridge conversion circuit 203 suitably comprises one or more diodes 220 and power switches 222, such as FETs, cooperating with comparator and PWM drive generator 216A, and isolated driver 216B. Diodes 220 and power switches 222 provide a selective connection between negative output terminal−VO of circuit 200 and the neutral of alternator 101 windings. When negative output −VO of circuit 200 (common ground) is connected to the neutral of alternator 101 windings (second floating ground), current flows only during the positive half of the alternator AC cycle. A preferred embodiment of half bridge conversion circuit 203 (and driver 216B) is shown in FIG. 3C.

Figure 3D:
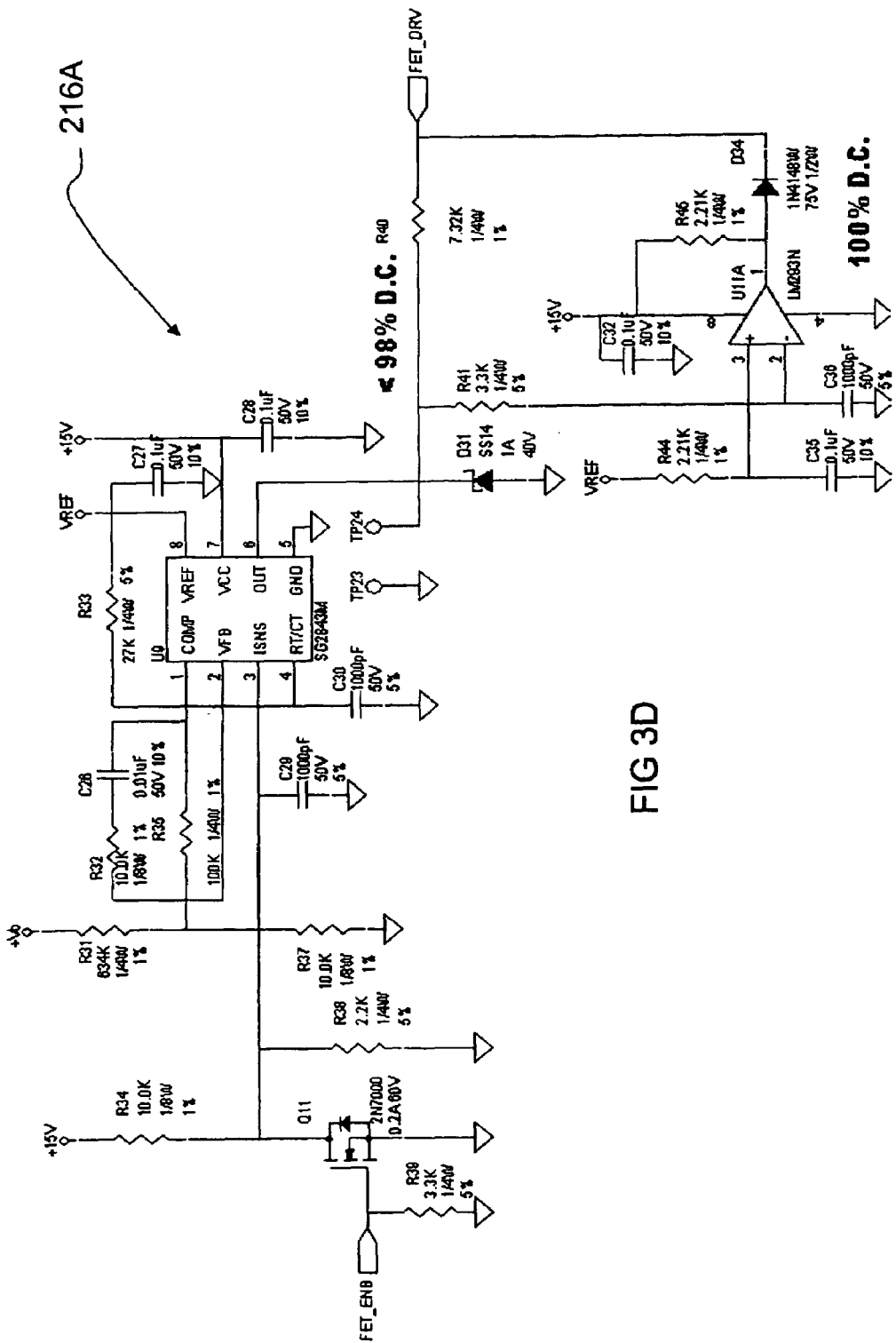

Comparator and PWM drive generator 216A, when enabled by control signal FET_ENB from microprocessor control 214 (mutually exclusive with SCR_DRV), cooperates with isolation boundary (buffer) circuit 216B to provide suitable drive signals to power switches 222, and selectively effects pulse width modulation of output voltage VO to limit the voltage to the predetermined maximum output level (e.g., 170 volts). More specifically, comparator and PWM drive generator 216A, when activated by a control signal FET_ENB from microprocessor controller 214, monitors the output voltage VO of rectifier/limiter 200 and generates a pulse width modulated control signal FET_DRV for effecting control of half bridge conversion circuit 203 in accordance with the output voltage VO of rectifier/limiter 200. The duty cycle of pulse width modulated control signal FET_DRV is controlled in accordance with, e.g., is inversely proportional to the output of rectifier/limiter 200; the duty cycle is initially 100% and remains at that value until the half wave rectification mode output of rectifier/limiter 200 exceeds the predetermined maximum value, e.g., 170 volts, whereupon the duty cycle is adjusted to limit the output to the predetermined value. A preferred embodiment of PWM drive generator 216A is shown in FIG. 3D.

Isolation boundary (buffer driver) circuit 216B, in response to the FET_DRV signal, generates a signal of appropriate voltage and isolation (reference ground) to drive the FETs in the half wave rectifier. Aa noted above a preferred embodiment of isolation boundary circuit 216B is shown in FIG. 3C.

Figure 3E:
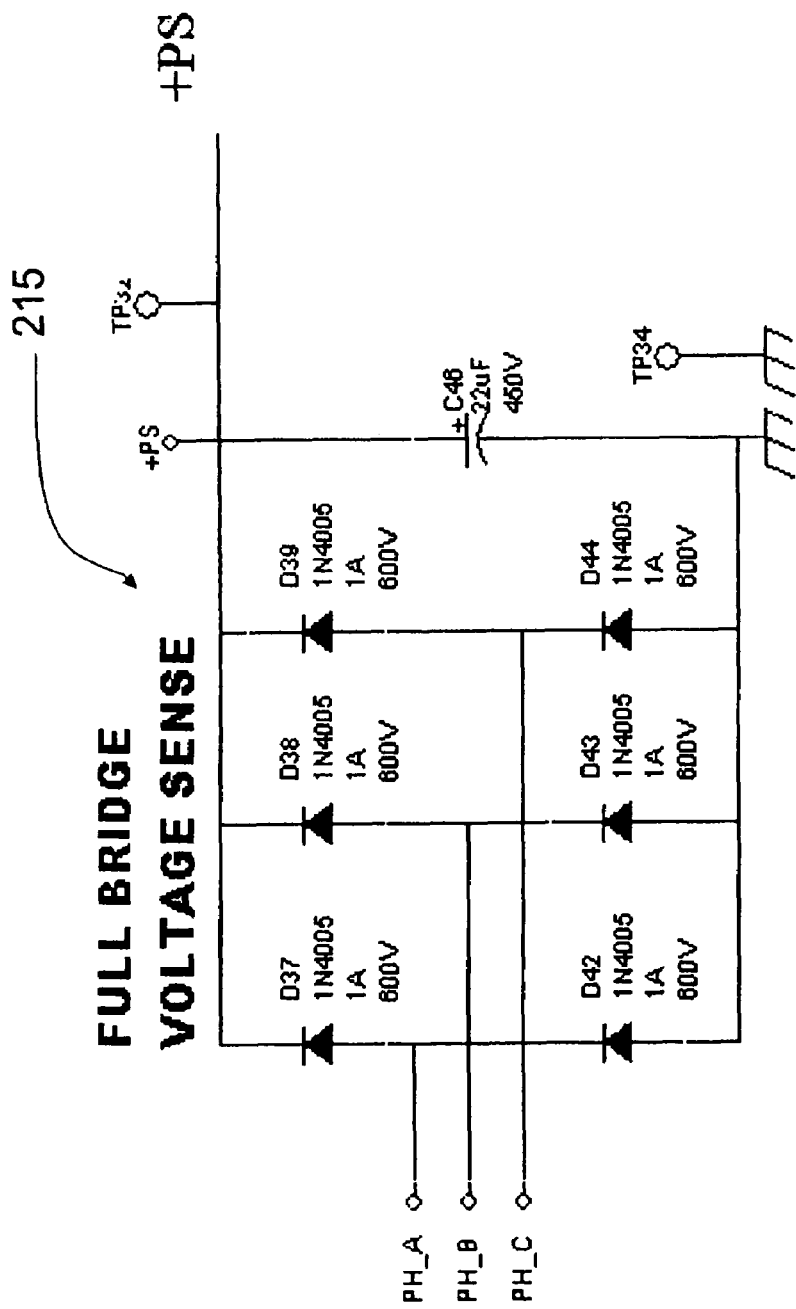

Isolated voltage source 215, receptive of the respective phases from alternator 101, provides an isolated, unregulated full wave rectified DC voltage PS at an output terminal +PS relative to a first floating ground (designated by a horizontal line with spaced angled lines extending downwardly therefrom) which is isolated from the second floating ground and the common ground. Isolated voltage source 215 suitably comprises a conventional diode rectifier full bridge. Voltage PS is directly proportional to the output voltage level that would be generated by full wave rectification of the alternator output under instantaneous RPM and load conditions (irrespective of the actual rectification mode), except that increased IR drop experienced in alternator 101 during half wave rectification mode operation is reflected as a decrease in voltage PS. A preferred embodiment of isolated voltage source 215 is shown in FIG. 3E. Isolated output voltage PS is applied to voltage sense isolation circuit 217 and to low voltage power supply circuit 218.

Figure 3F:
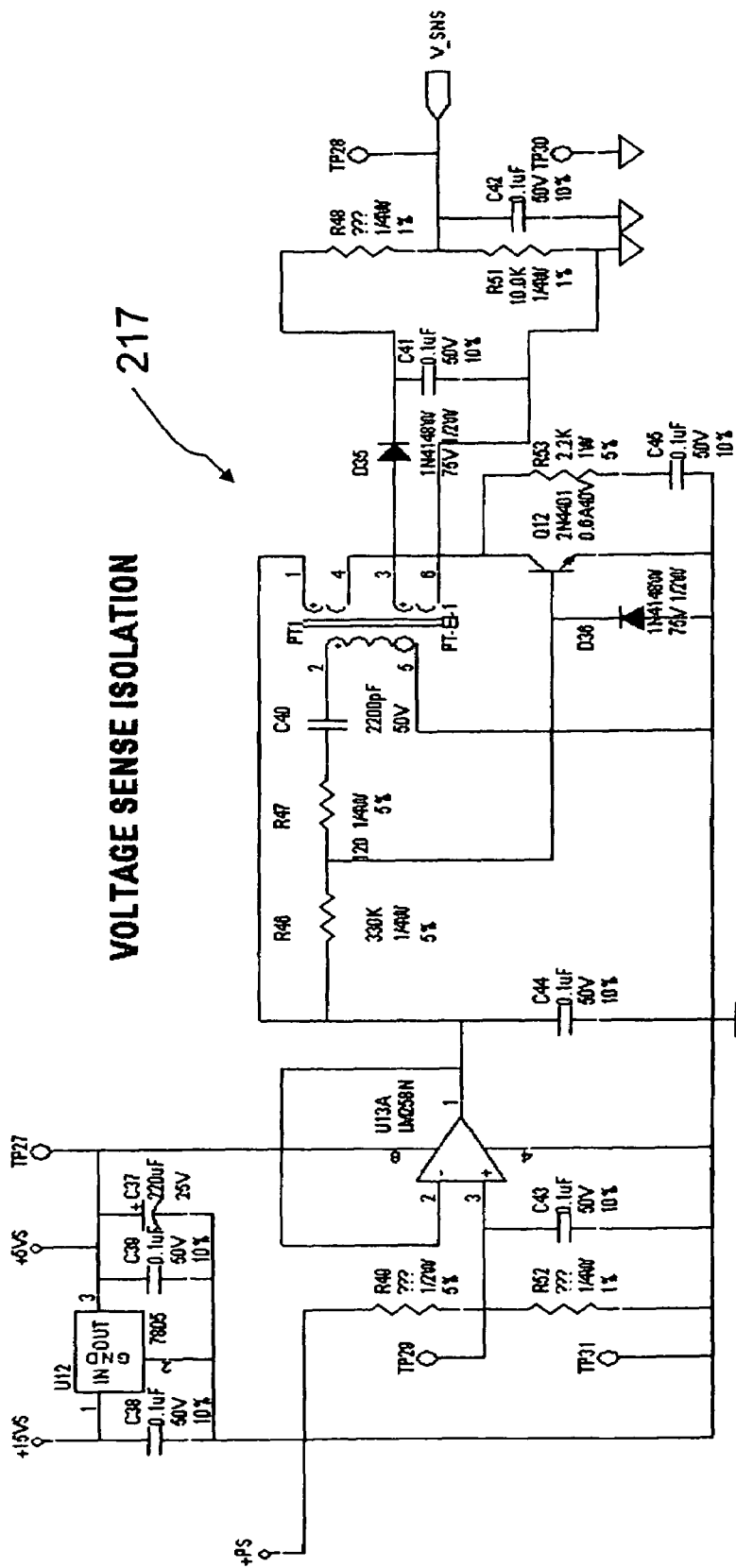

Voltage sense isolation circuit 217, cooperating with isolated voltage source 215, derives indicia signal V_SNS indicative of voltage PS (and hence output voltage level that would be generated by full wave rectification of the alternator output under instantaneous RPM and load conditions), but conditioned and level shifted to be suitable for application as an input signal to microprocessor 214. A preferred embodiment of voltage sense isolation circuit 217 is shown in FIG. 3F.

Figure 3G:
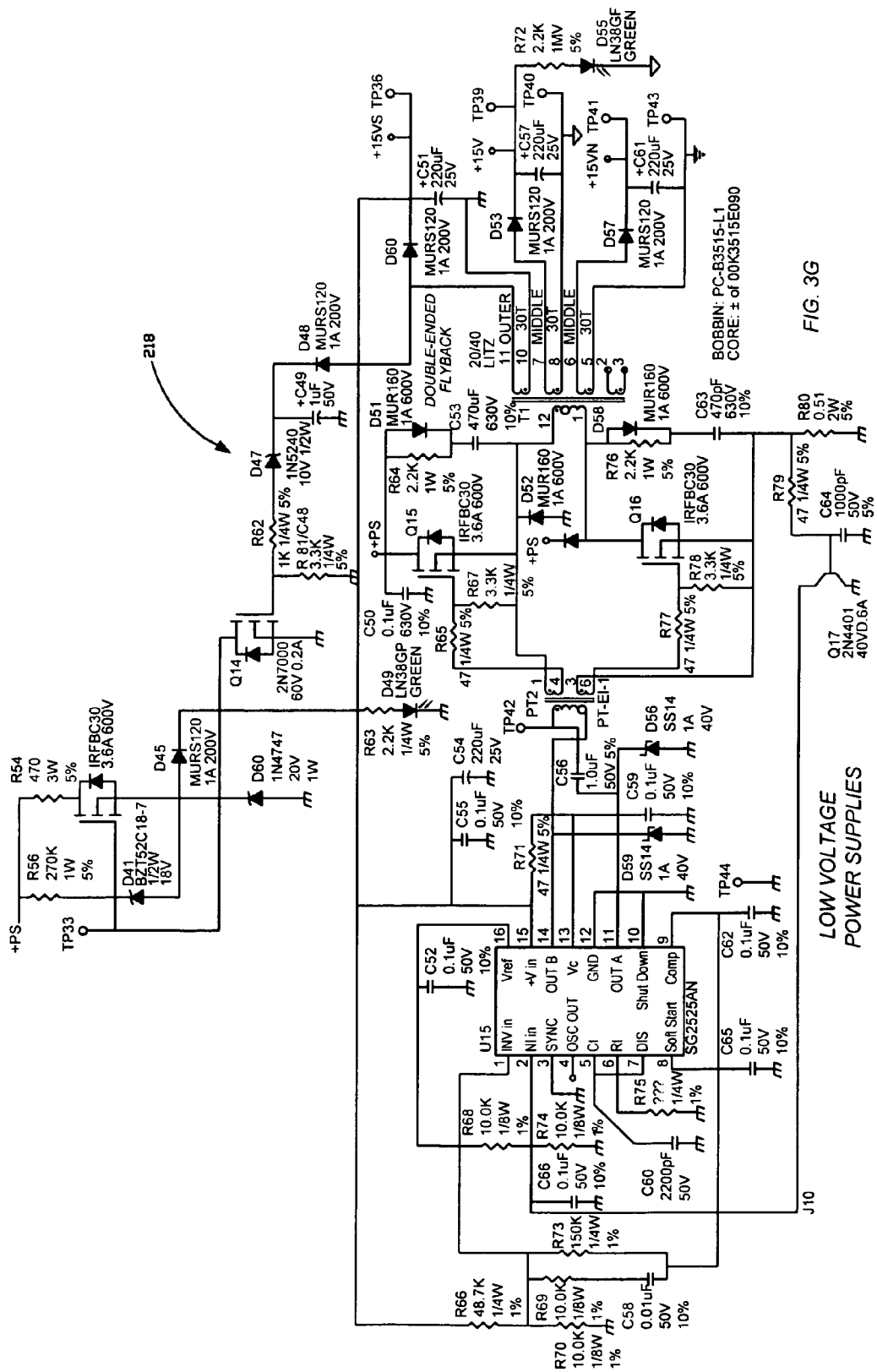

Low voltage power supply circuit 218 provides multiple isolated low voltage supplies for powering the various control components of system of 102, preferably, deriving such signals from unregulated voltage +PS. Circuit 218 preferably generates respective regulated signals at a predetermined voltage, e.g. 15 volts, relative to each of common, and first and second floating grounds. A preferred embodiment of low voltage power supply circuit 218 is shown in FIG. 3G.

Figure 3H:
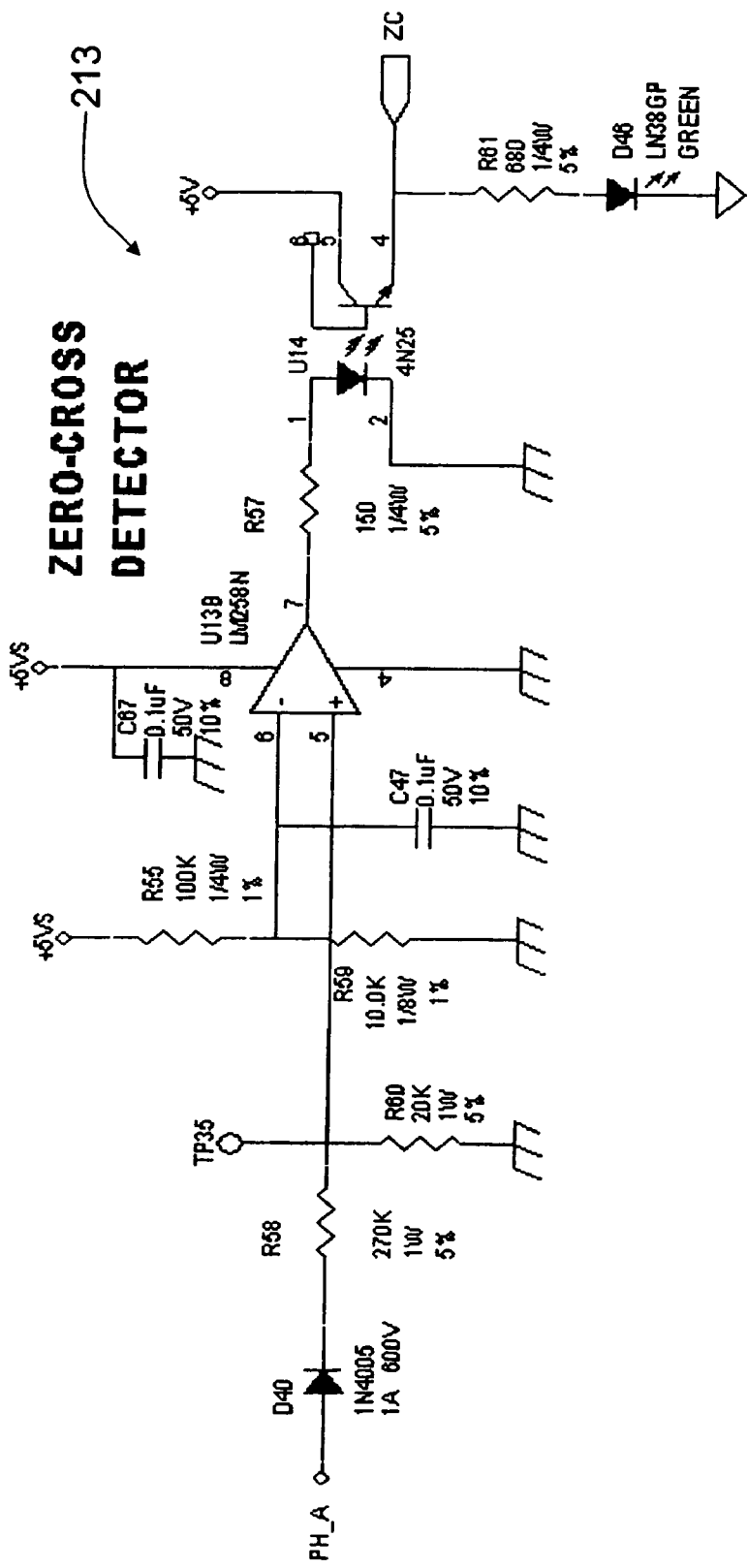
Figure 31:
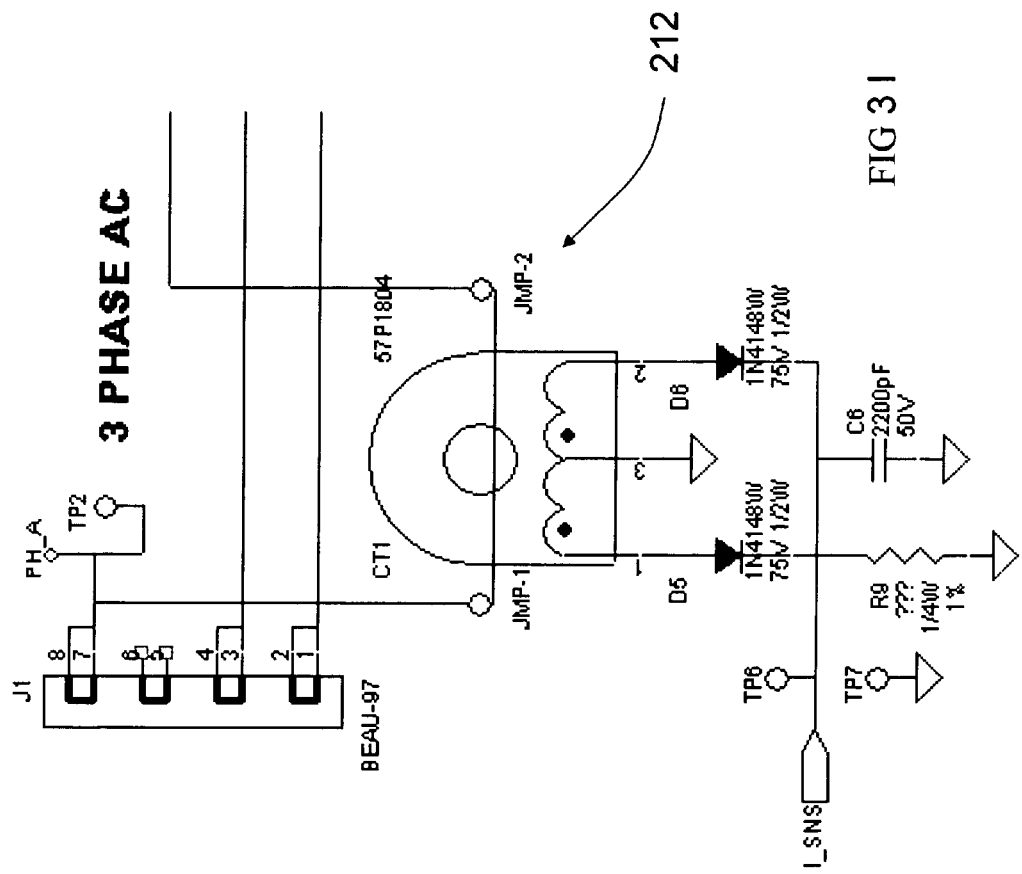

Zero crossing detector 213, receptive of one of the alternator phases e.g. phase A (PH_A), generates an output signal (ZC) indicative of zero crossings of the phase, and hence RPM. Zero crossing signal ZC is applied as an input to microprocessor controller 214. A preferred embodiment of zero crossing detector 213 is shown in FIG. 3H.

Current sensing circuit 212 generates a current sense signal, I_SNS, indicative of the magnitude of current being put out by alternator 101. Current sense signal I_SNS is applied as an analog input to microprocessor 214. A preferred embodiment of current sensing circuit 212 is shown in FIG. 3I.

Microprocessor controller 214, responsive to full wave output indicia signal V_SNS, zero crossing signal ZC and, if desired, current sense signal I_SNS, selectively generates control signals: SCR_DRV to effect full wave rectification mode operation; and FET_ENB to effect half wave rectification mode. Prior to entering the multimode operation of system 102, an initial determination that the engine driving alternator 101 is running on its own power, as opposed to, e.g., being cranked by a starter motor can be provided. In essence, RPM as reflected by the period between zero crossings in one of the alternator phases is monitored to ensure that the motor is operating at idle speed or above for a predetermined period before initiating the multimode operation.

Figure 3J:
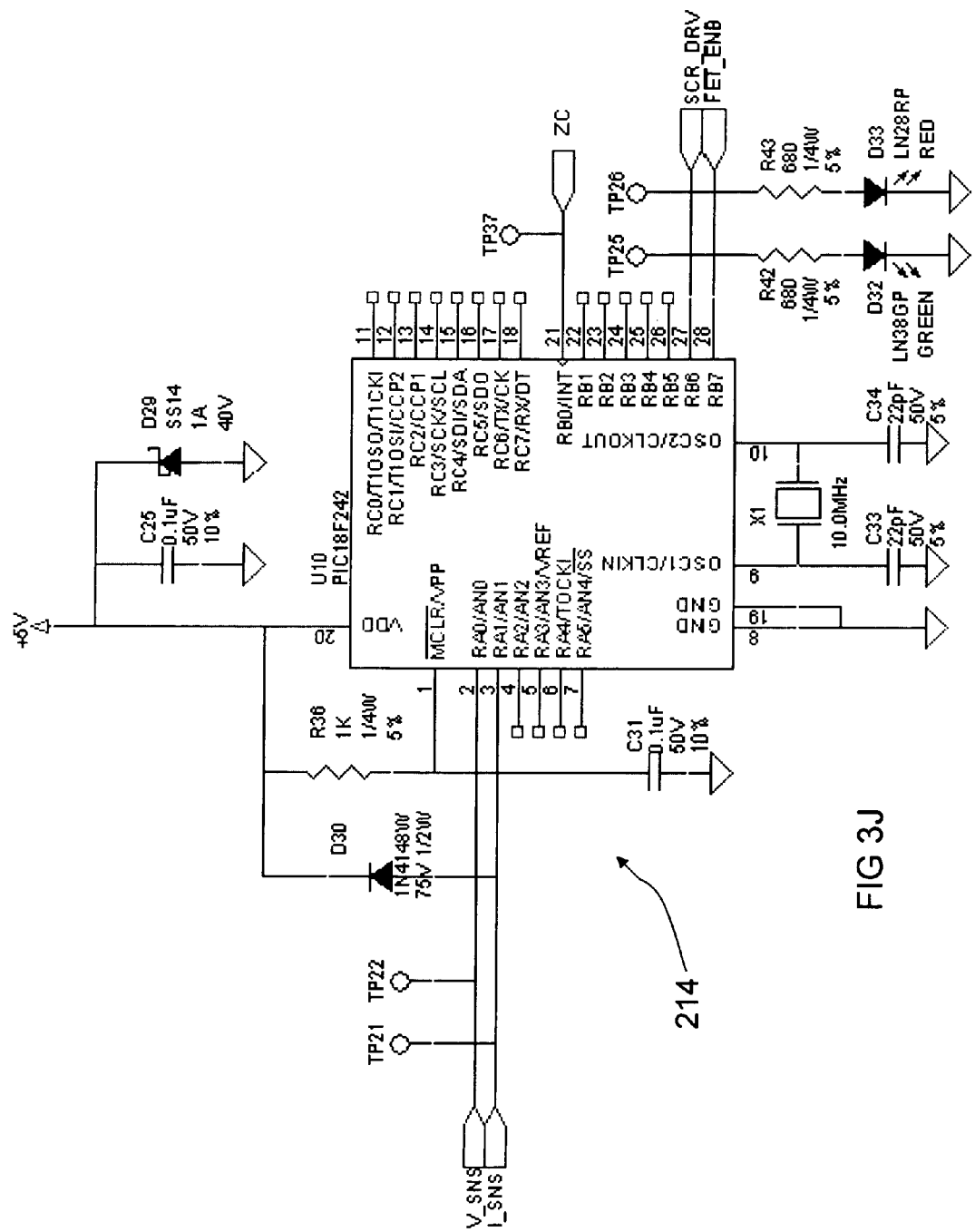

A preferred embodiment of microprocessor controller 214 is shown in FIG. 3J. Controller 214 suitably comprises Microchip PIC18242 microcontroller configured to include:

Timer 0 (TMR0) configured as an 8-bit counter driven by an internal clock. The timer value is reloaded on each rollover to create an interrupt event from timer 0 at a fixed time base, e.g., 100 us.

Timer 1 (TMR1) configured as a 16-bit counter driven by an internal clock. The timer value is used to measure the period of successive zero-crossings from the alternator. An interrupt from Timer 1 indicates a rollover, signifying that the time between successive zero-crossings are too long and RPM is too low.

External Interrupt 0 (INT0 is the event name) An interrupt is triggered when the INT0 pin (receptive of zero crossing signal ZC from zero crossing detector 213) goes high.

File (RAM) pointer: A 12 bit pointer for access of the file (RAM) space data. This hardware pointer is used to clear RAM and to store history in the analog thread.

Analog-to-Digital converter: This hardware module reads from the selected input channel (V_SNS, I_SNS) and stores an 8-bit or 10-bit result. The channel selected is controlled by a control register ADCON0 bits 5, 4 & 3.

3 Input/Output ports: Two 8-bit ports (PORTB and PORTC) for digital only and a 6-bit port (PORTA) that can be digital or analog or a mixture of both. Each bit within a port can be configured as a digital input or output. The 6-bit port (PORTA) can also be configured to receive an analog input. In this case, digital outputs SCR_DRV and FET_ENB are generated at port B bits RB6 and RB7.

A flowchart of the program executed by microprocessor 214 is provided in FIGS. 10A–K. In general, the program is composed of normal initialization, start-up and "main loop" sequences.

Prior to entering the multimode operation of system 102, an initial determination that the engine driving alternator 101 is running on its own power, as opposed to, e.g., being cranked by a starter motor can be provided.

The "start-up" sequence is employed to ensure that the engine driving alternator 101 is up to speed and running on its own power before the system begins to draw power. It is not desirable to draw power from an engine that is attempting to start. Accordingly, after a conventional initialization sequence, the "start-up" sequence, in effect, detects a predetermined period of normal speed operation (a predetermined number of consecutive measurements of zero crossing periods below a specified number) before advancing to the main sequence. If a period larger than the specified number is detected, the count is started over. Accordingly, an engine coming up to speed and then faltering will not trigger a draw of power. After it is determined that the engine is "up-to-speed." the SCR_DRV signal is generated (SCR_DRV=1 and FET_ENB=0) to enable full bridge 202 and effect initial full wave rectification.

The main loop sequence is then initiated. The main loop monitors the voltage indicia signal (V_SNS), and selectively generates control signals SCR_DRV and FET_ENB to switch between full wave and half wave rectification modes. When switching between modes, a "break before make" is employed to avoid shorting the alternator windings. This function is suitably implemented as a "thread". A thread is made up of respective small pieces of code (a state) that each perform a task and then return. Linked sequencing is provided through determining in each state which state will be the next to execute when the thread is called again. In general a thread must be called several times in order to complete the over-all function. The main loop comprises three primary calls:

GetAnalogInputs: acquires analog inputs (V_SNS, I_SNS), stores each result in a buffer and calculates the average of each buffer. The analog inputs are monitored every time base (100 us). Upon completion of the process, a flag is set.

BridgeControl: Checks for the flag indicating that the analog channels have been read, buffered and the averages calculated, then determines if a change in the bridge mode is required based upon the readings. If the current mode is full wave rectification, V_SNS is tested for greater than the upper limit (FULL_UPPER_LIMIT). If the current mode is half wave rectification, V_SNS is tested for less than the lower limit (HALF_LOWER_LIMIT). If a change is indicated, the sequence to change the bridge mode is initiated and control is returned to the thread loop. Subsequent calls to the thread continue to wait for delays or finish the mode change if the delay is complete.

UpdatePeriodBuffer: check flag for a new zero-crossing measurement. Test another flag to see if the period was "too low", if so, just return and do nothing with that reading. Place the new period in a circular buffer. Calculate the average of the buffer and store the result in 'avg_period'.

In addition, several "support" functions are employed:

InitCpuRam: Initializes control registers and clears all used RAM

InitSpecialVals: Sets up variables or registers specific to this program

WriteHistory: Used by the analog thread to store an analog result in the proper position within the analog history array.

CalcADHistAvg: Used by the analog thread to calculate the average of a section of the analog history array used for a single channel.

Switching Loss Reduction Circuit 204

In high power applications employing power switches such as half bridge conversion circuit 203, switching losses, i.e. IR loss occurring during switching operations, can be a serious problem. As a rule of thumb, in the absence of special provisions, approximately 10% of the input electrical energy may be lost in the form of heat. Therefore, for a 10 kW power conversion, 1 kW of energy may be lost in the form of heat. Such heat can have deleterious effects, e.g. reduced reliability, on not only the power switches, but also other electronic components of the system. In addition, during transitions, the rapid change in voltage across and/or current through switching devices tends to create radio frequency emissions, i.e. interference.

In general, a power switching device, such as an FET, requires a finite amount of time, e.g., 500 nanoseconds, (referred to herein as a "turn-off period") to change from a fully conductive "on" state (in which the resistance of the device is negligible) to a fully non-conductive "off" state (in which the resistance of the device is effectively infinite). During this turn-off period the resistance of the device changes gradually from negligible to effectively infinite. Until the resistance reaches a sufficient level, current continues to flow through the device, causing IR loss.

In general, the resistance exhibited by an FET power switch is a function of the voltage level of the drive signal applied to its gate. For example, referring to FIGS. 3L and 3M, such a device is rendered "on", i.e., fully conductive (e.g., R=~0) by drive signals at or above a predetermined voltage, e.g. 15 volts, and "off", i.e. fully nonconductive (resistance is effectively infinite, e.g. R=~4M Ω or more.) by drive signals at or below a second predetermined voltage, e.g. zero volts. When "on," the device conducts at a relatively high level, e.g. 100 A. However, the resistance of the device is negligible, so the voltage drop across the device is essentially zero. When the device is "off", a relatively high level of voltage appears across the device. However, since practically no current flows through the device there is essentially no IR loss.

On the other hand, significant IR loss can occur when drive signals of intermediate voltages are applied, the device is conductive but manifests an intermediate resistance. For example, the resistance of the switch is a first intermediate value on the order of ohms, and a second greater value, on the order of kilo-ohms, in response to drive signals of 7 volts, and 4 volts, respectively. This tends to result in significant IR loss. For example, under typical operating conditions, when the device resistance is in the kilo ohm range, e.g., the drive is in the vicinity of 4 volts, significant levels of current, e.g. on the order of 50 A, flow through the device. This equates to significant IR loss, e.g. 2.5 kW during that period. This becomes particularly significant when the switching device is turned on and off at relatively high frequencies, e.g., in pulse width modulation operation. From the perspective of minimizing IR loss, it is therefore desirable to minimize the turn-off period. The minimum turn-off period, however, tends to be established by the gate capacitance of the FET, and for high power rated, low on-resistance devices may be on the order of hundreds (e.g., 500) of nanoseconds.

In accordance with one aspect of the present invention, conversion efficiency is increased, and electromagnetic emissions (interference) reduced, by controlling the rate of change of voltage across and current through the power switching device during the switch turn-off period, minimizing energy generated during the course of turning off the power switch that would otherwise be dissipated in the power switches as heat. The energy is preferably captured and ultimately applied to the load by, e.g., feeding it forward to the load, or feeding back to a voltage source. This can be accomplished by disposing a capacitor across the power switch such that it is charged during the turn-off period, limiting the rate of change of voltage across the switch, then selectively discharging the capacitor non-dissipatively (preferably for ultimate application to the output) to a substantially fully discharged state by the beginning of the next successive turn-off period. The turn-off period is of finite duration, e.g., 500 ns. Thus, by limiting the rate of change of voltage, the voltage developed across the FET during the turnoff period is limited to a relatively low predetermined level. Substantially reducing switching loss has three primary benefits: higher power conversion efficiency; reduced heat dissipation in the power switch (and thus higher reliability); and reduced electro-magnetic interference.

More specifically, a capacitor opposes changes in voltage, and charges only gradually. The change in voltage ($\Delta V$) across the capacitor, over a period of time ($\Delta t$) is in accordance with the capacitance (C) and the average value of the current (i) during the time period, i.e., $\Delta V=[(i \times \Delta t)/C)]$. Thus, by disposing an appropriate value of capacitance across the drain and source of the FET, the voltage that develops between the drain and source of the FET during the FET turn-off period can be kept at low value. The higher the value of the capacitor, the lower the voltage that develops between the drain and the source during the turn-off period. (However, the capacitance is preferably not so large that it cannot be discharged between successive turn-off periods.) In general, the value of the capacitance is chosen such that the voltage developed during the turn-off period is less than a predetermined value, suitably less than 20 volts, and preferably 10 volts or less. In the preferred embodiment, the voltage developed during the turn-off period is limited to 10 volts. The value of capacitance ($C_s$) to limit the voltage between the drain and source of the FET to a predetermined value ($V_{ds}$) during the turn-off period is equal to the average current ($I_{ave}$) through the FET multiplied by the duration ($T_{off}$) of the turn-off period divided by the predetermined voltage ($V_{ds}$), i.e., $C_s=[(I_{ave} \times T_{off})/V_{ds}]$. In the preferred embodiment, typical values of such capacitor range between 0.1 microfarad to 0.2 microfarad. After the FET is completely turned off, or during the next successive period when the FET is turned on, the energy captured by the capacitor, i.e. the charge developed on the capacitor during the turn-off period, is discharged into an inductor which non-dissipatively discharges the capacitor) and ultimately applies the energy to the output (fed forward) or is fed back to the input power source to effectively recycle the energy with out direct dissipation. In the preferred embodiment, the power source voltage and FET switching times result in capacitor values that are discharged within the time allotted by inductance values of about 53 µH.

Referring again to FIG. 2C, in the preferred embodiment control of the rate of change of voltage across and current through power switching device 222 during the turn-off period is effected switching loss reduction circuit 204. Circuit 204 suitably comprises a diode 240, a capacitor 242, an inductor 244, and a switching device 246, e.g., a FET, cooperating with a suitable driver circuit 247, and a diode 248. Diode 240 and capacitor 242 are connected across switching device 222 (e.g., for a FET switch, the anode of diode 240 is connected to the drain of the FET and capacitor 242 is placed between the cathode of the diode and the FET source). Switching device 246 is connected in series with inductor 244 across capacitor 242. Diode 248 is disposed to provide a directional current path between inductor 244 and output terminal +VO. Switching device 246 suitably operates in synchronism with power switch 222. When switches 246 and 222 are on, capacitor 242 discharges into inductor 244. When switches 246 and 222 are off, two things happen, essentially simultaneously: capacitor 242 charges, controlling the voltage across switch 222 as previously described, and inductor 244 effectively reverses its polarity, thereby forward-biasing diode 248 and delivering current through diode 248 to terminal +VO. A preferred embodiment of switching loss reduction circuit 204, is shown in FIG. 3K.

Analogous switching loss reduction circuits are suitably employed with the power switches of regulator 400, DC-DC converter 106 and inverter 108.

Regulator 400

As previously noted, regulator 400 provides a constant voltage at a predetermined level, e.g. 180V±2%. Referring to FIG. 4, regulator 400 is preferably a boost type regulator comprising one or more boost stages 404, a control circuit 412, and, preferably, a switching energy loss reduction circuit 410 (analogous to circuit 204 in rectifier/limiter system 200). Boost stage 404 suitably includes an input capacitor 420, an inductance 422, a boost diode 424, a power switch 426 and associated driver circuitry 428 (responsive to control signals from control circuit 412), and an output storage capacitor 432. The output is provided across output terminals +VRO and –VRO (common ground).

The input DC voltage VO from rectifier/limiter 200 is limited to a value, e.g. 170 volts, lower than the desired voltage at the output VRO of regulator 400, e.g., 180 V. When power switch 426 is turned on (in response to control signal DRV from control 412), it completes a current path through inductor 422, causing inductor 422 to energize. Boost diode 424 is reverse-biased. When power switch 426 turns off, inductor 422 effectively reverses its polarity, thereby forward-biasing diode 424. Inductor 422 delivers current through diode 424 to charge storage capacitor 432. The voltage across inductor 422 adds to the input voltage VO to generate the output voltage VRO.

Control circuit 412 regulates output voltage VRO by sensing the output voltage, comparing it to a reference value, and varying the turn on and off time of power switch 426 accordingly, i.e., pulse width modulates the drive to switch 426. As input voltage (VO from rectifier/limiter 200) to the boost regulator 400 increases, control circuit 412 decreases the amount of time the power switch 426 is on. When the input voltage VO from rectifier/limiter 200 is at its maximum limit, e.g. 170 volts, the power switch remains off and essentially all of the power flows through the diode 424. This results in particularly high power throughput efficiency; the only heat generated is that dissipated by diode 424. In addition, boost regulator 400 inherently limits the current in the event of a short-circuit.

In addition, conversion efficiency can be increased, and electromagnetic emissions (interference) reduced, by inclusion of switching loss reduction circuit 410 (analogous to circuit 204 in rectifier/limiter 200) to control the rate of change voltage across and current through switching device 426 during turn-off periods, minimizing energy generated during the course of turning off power switches that would otherwise be dissipated as heat and preferably recapturing and directing it (ultimately) to the load by, e.g., feeding it forward to the load. Circuit 410 suitably comprises a diode 450, a capacitor 452, an inductor 454, a switching device 456 e.g. a FET, cooperating with a suitable driver circuit 458 and a diode 460. Diode 450 and capacitor 452 are connected across switching device 426 (e.g., for a FET switch, the anode of diode 450 is connected to the drain of the FET and capacitor 452 is placed between the cathode of the diode and the FET source). Switching device 456 is connected in series with inductor 454 across capacitor 452. Diode 460 is disposed to provide a directional current path between inductor 454 and output terminal +VRO. Switching device 456 suitably operates in synchronism with power switch 426. When switches 426 and 456 are on, capacitor 452 discharges into inductor 454. When switches 426 and 456 are off, capacitor 452 charges (controlling the voltage across switch 426 as previously described in conjunction with circuit 204), and inductor 454 effectively reverses its polarity, thereby forward-biasing diode 460 and delivers current through diode 460 to terminal +VRO.

Figure 5A:
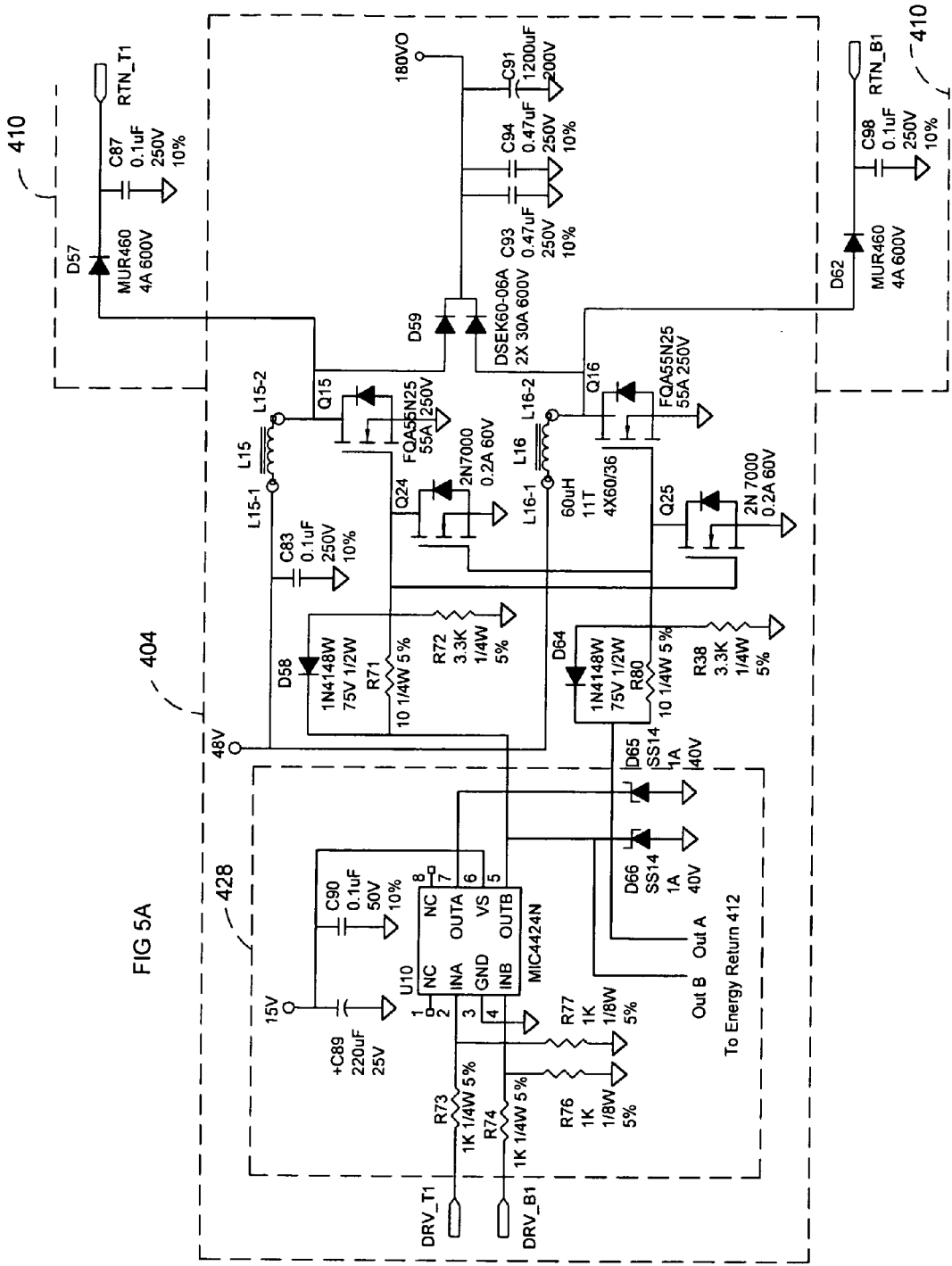
FIGS. 5A and 5B (collectively referred to as FIG. 5) are schematic diagrams of the respective components of the regulator of FIG. 4.
Figure 5B:
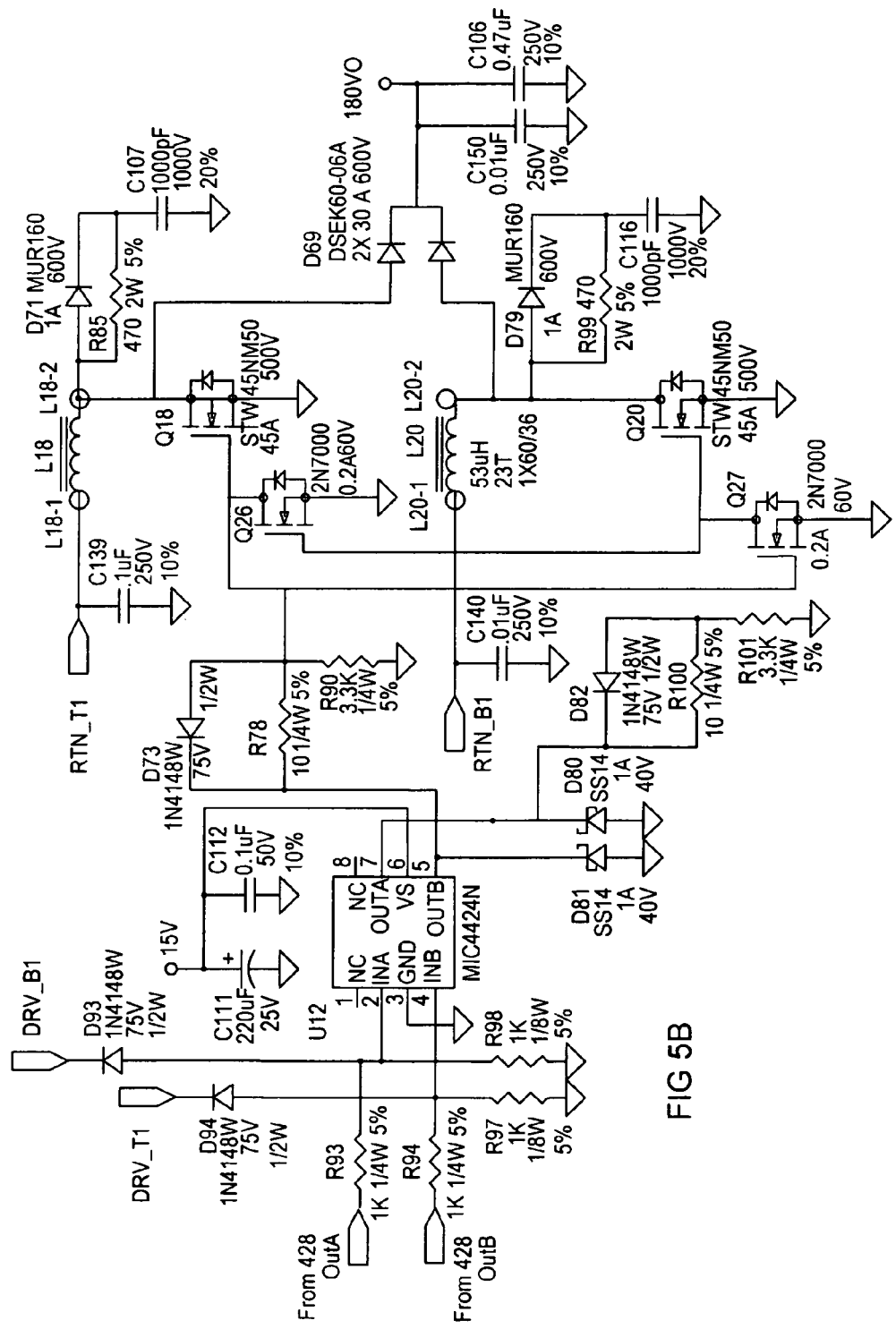
Figure 5C:
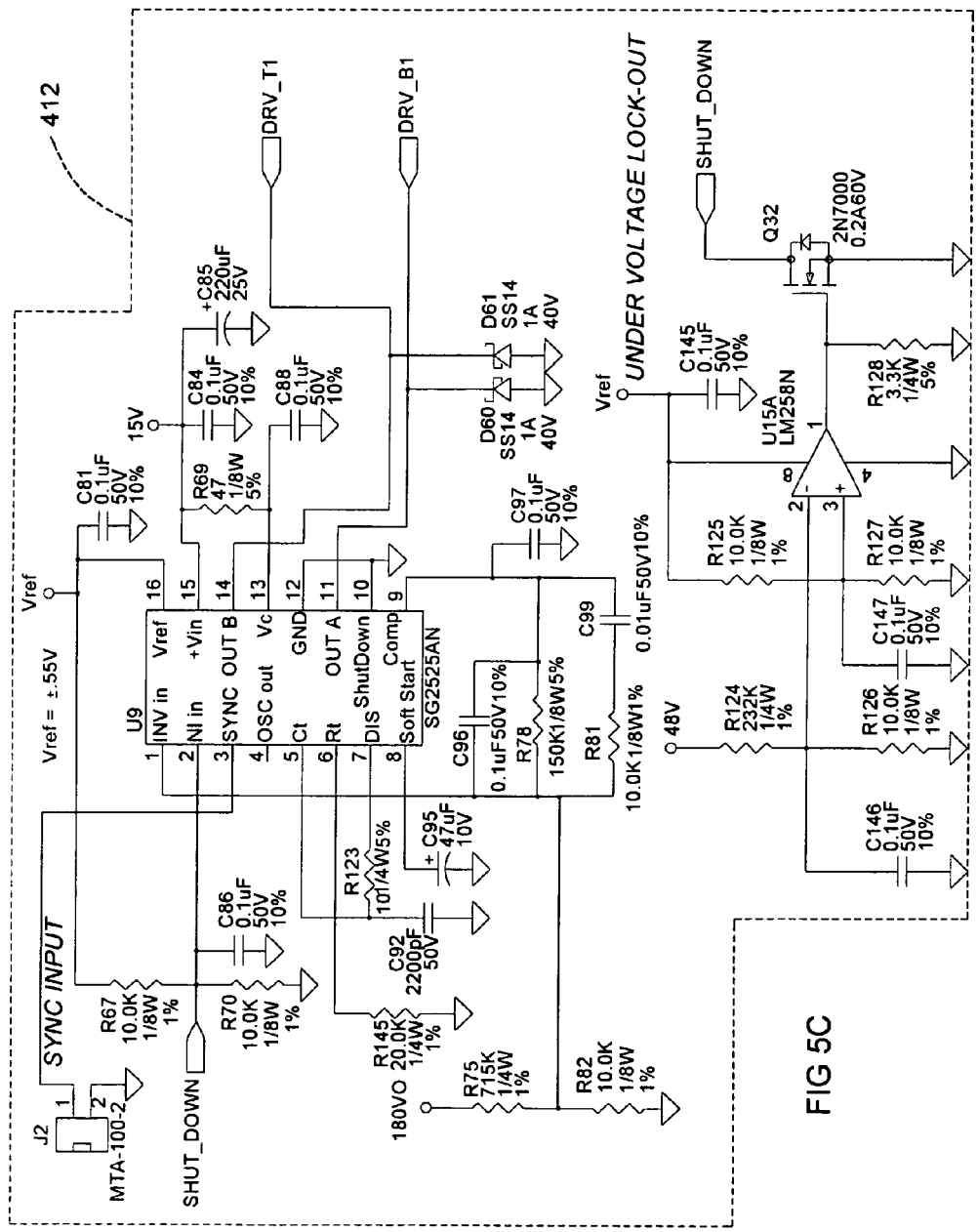

A preferred embodiment of regulator 400 suitably employs a plurality of boost stages 404, with each stage including respective pairs of inductors and switches, each pair operating periodically (e.g., 50% duty cycle) on a mutually exclusive basis. Each pair would have a respective diode 450 associated therewith, and preferably a portion of capacitor 452 (parallel components being utilized to form capacitor 452). Preferred embodiments of the components of regulator 400 are shown in FIG. 5: a boost stage 404 (and associated elements of switching loss reduction circuit 410) in FIG. 5A; switching loss reduction circuit 410 in FIG. 5B (elements common to all stages); and control circuit 412 in FIG. 5C.

Inverter 108

Inverter 108 may comprise any circuit capable of producing an AC output signal of the desired voltage and waveform, e.g., 120 volts RMS 50/60 Hz AC, from the output of rectification and regulation system 102 (e.g. regulator 400). Referring to FIG. 8, a suitable inverter bridge comprises: a first "high side" (upper) switching circuit 802 (e.g. comprising one or more FETs) (+U) and associated driver circuitry 804, associated with the positive half cycle of the inverter output; a second "high side" (upper) switching circuit 806 (–U) and associated driver circuitry 808, associated with the negative half cycle of the inverter output; a first "low side" (lower) switching circuit 810 (+L) and associated driver circuitry 812, associated with the positive half cycle of the inverter output; a second "low side" (lower) switching circuit 814 (–L) and associated driver circuitry 816, associated with the negative half cycle of the inverter output; suitable filter circuitry 822 typically including an inductor and a capacitor; current sensing circuitry 824; and a controller 826. In the preferred embodiment, inverter 108 further includes respective switching loss reduction circuits 818 and 820 (analogous to circuit 204 in rectifier/limiter 200), cooperating with low side switching circuits 810 and 814, respectively. The switching devices associated with a given half cycle (802, 810; 806, 814) are connected in series with filter 822, between a regulated DC rail, i.e., the output VRO of rectifier and regulator system 102, and common ground. The high side switch (802, 806) is connected between positive rail +VRO and filter 822, and the low side switch (810, 814) connected between output filter 822 and common ground. The AC output is output from filter 822. Current sensor 824 provides an output signal I_SNS indicative of the AC current. Controller 826 provides control signals to drivers 804, 808, 812 and 814.

Figure 10A:
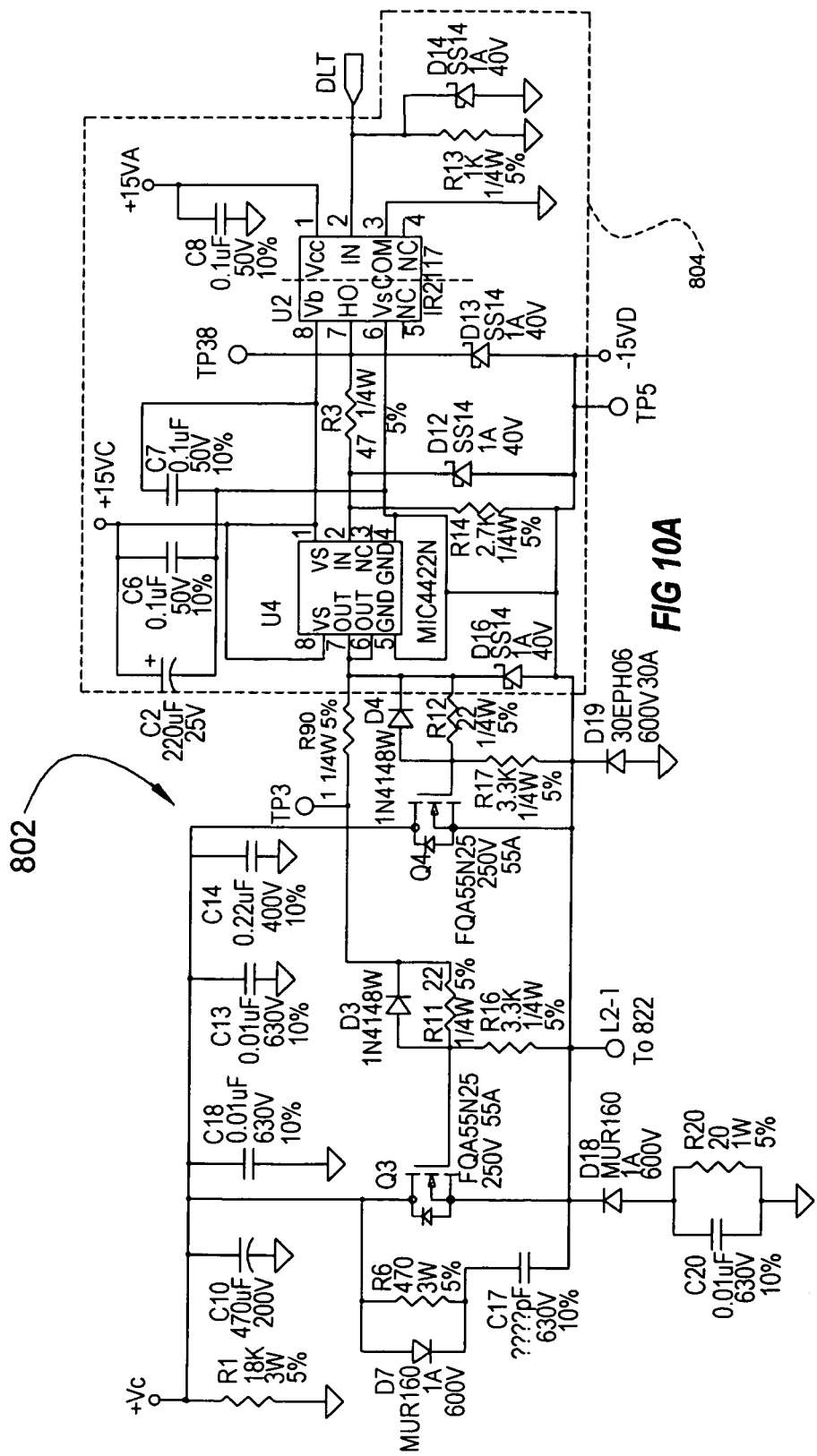
FIGS. 10A–10G (collectively referred to as FIG. 10) are schematic diagrams of preferred embodiments of the components of the sine wave inverter of FIG. 8.
Figure 10B:
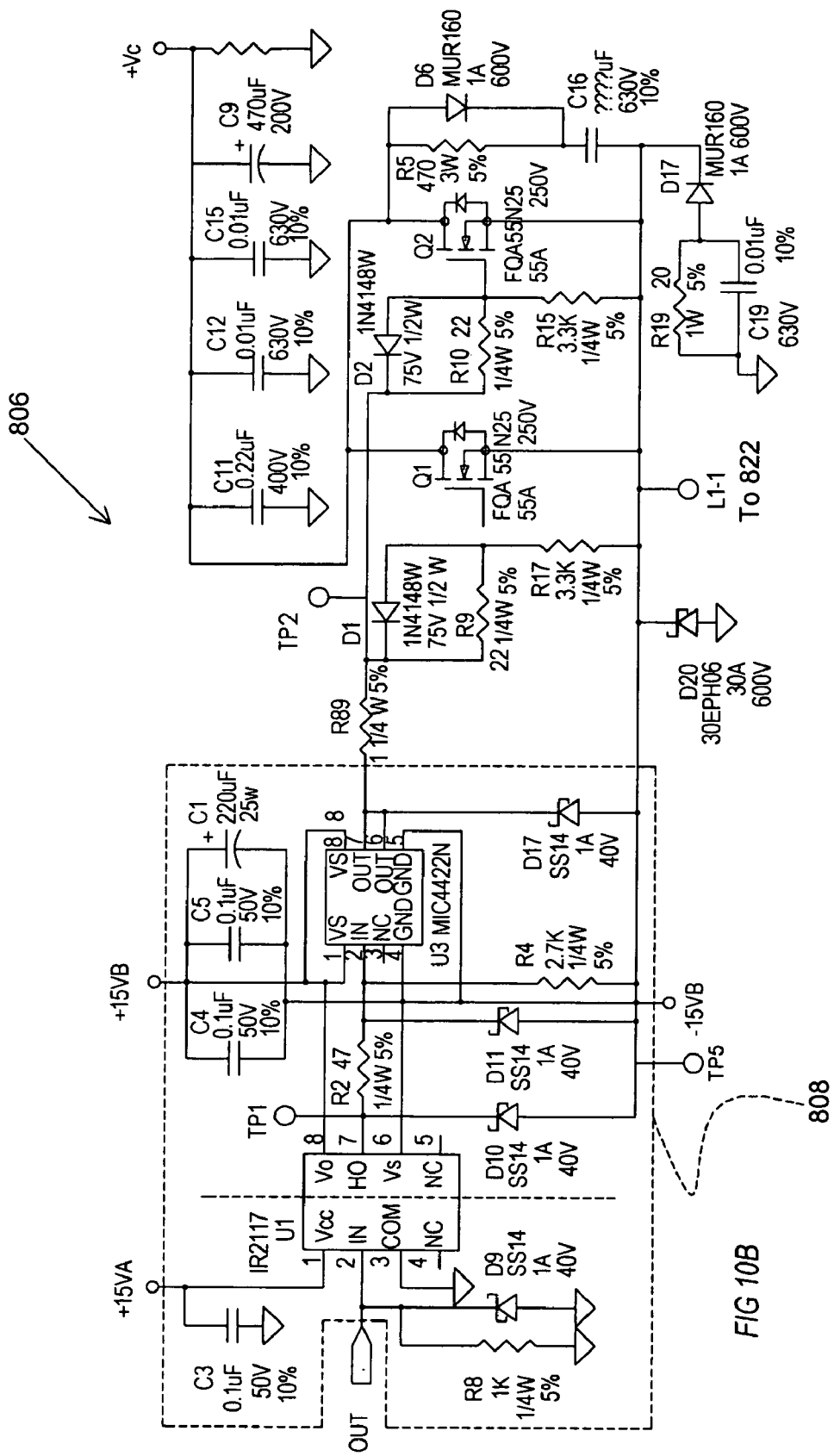
Figure 10C:
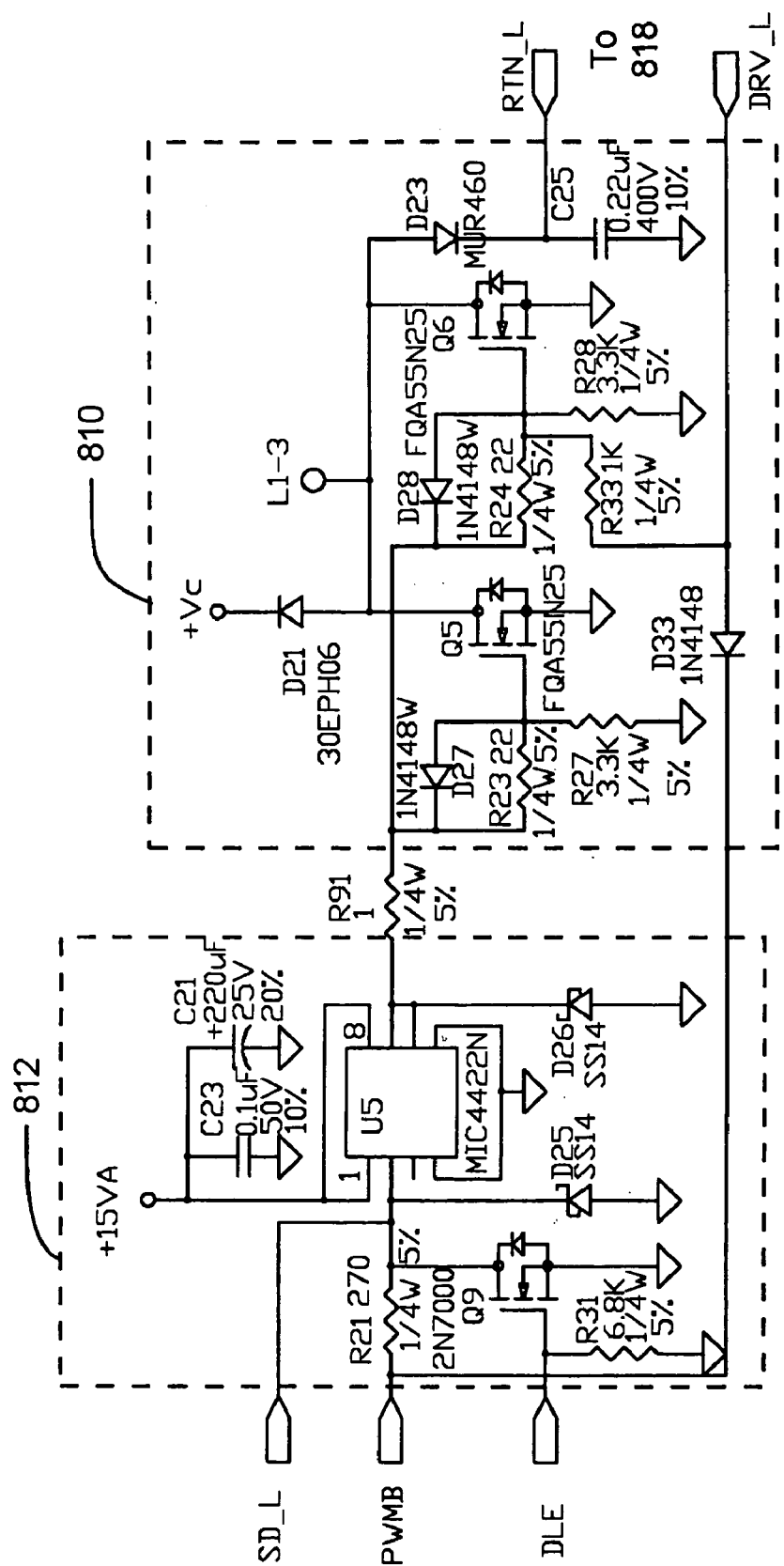
Figure 10D:
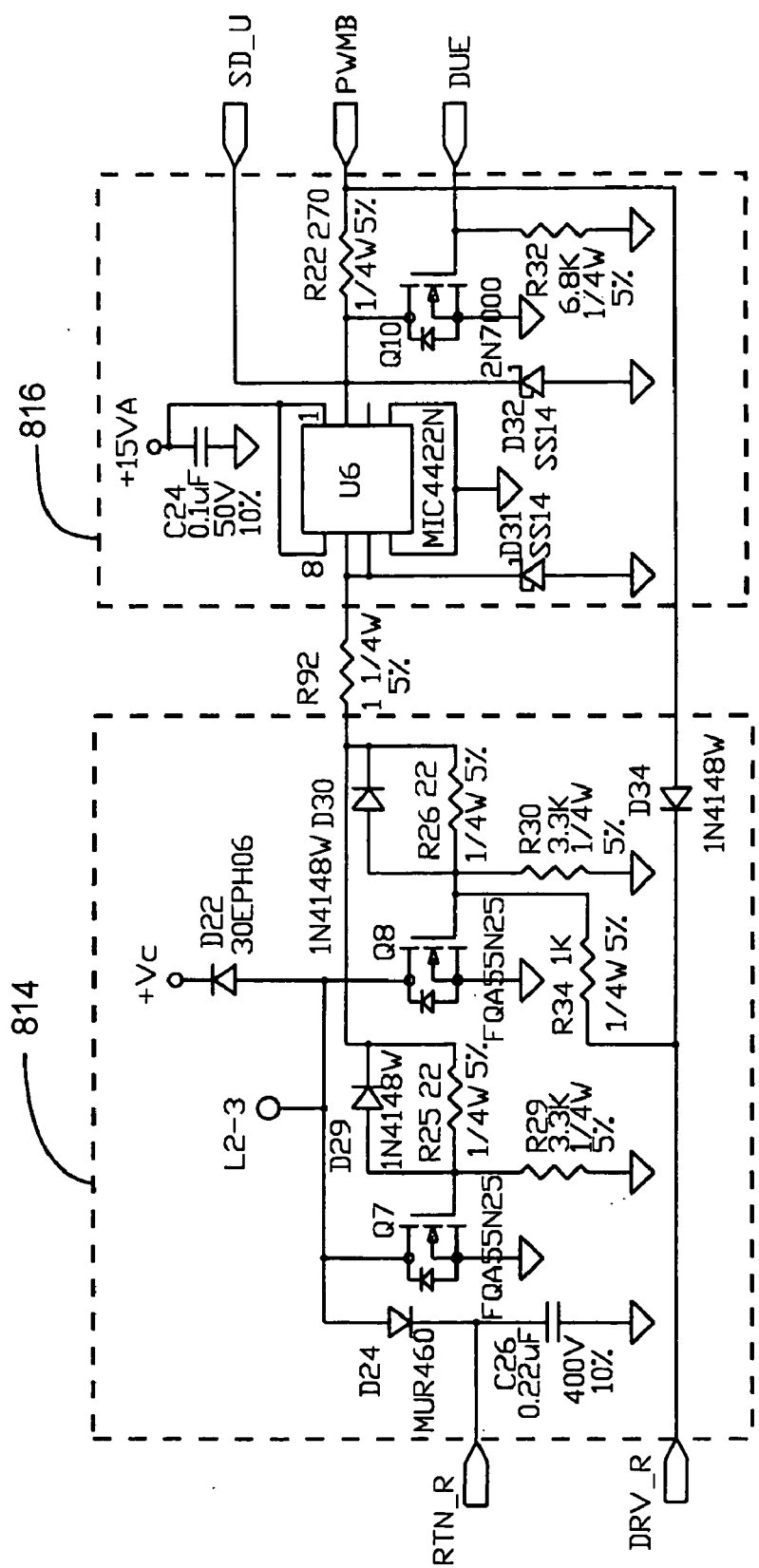
Figure 10E:
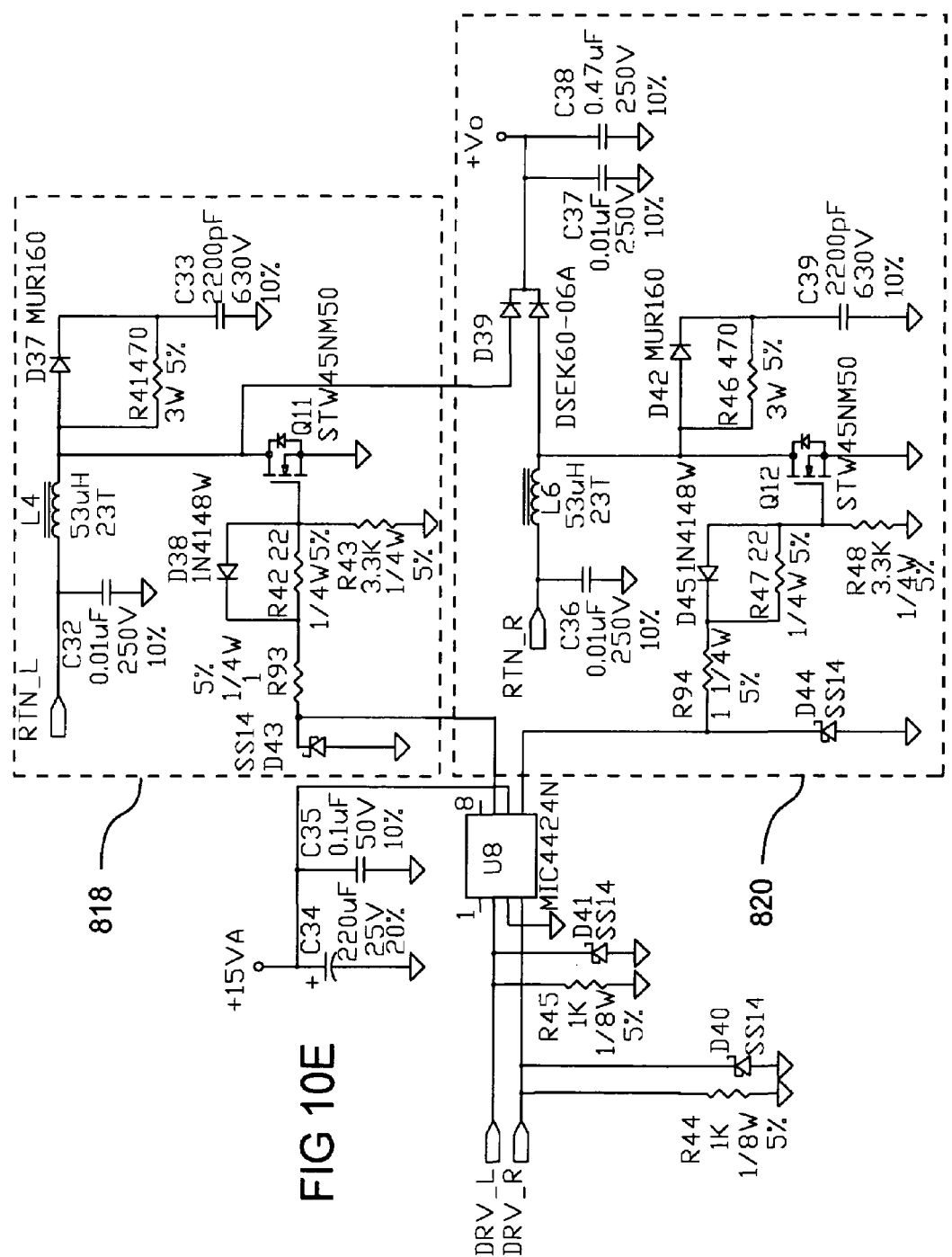
Figure 10F:
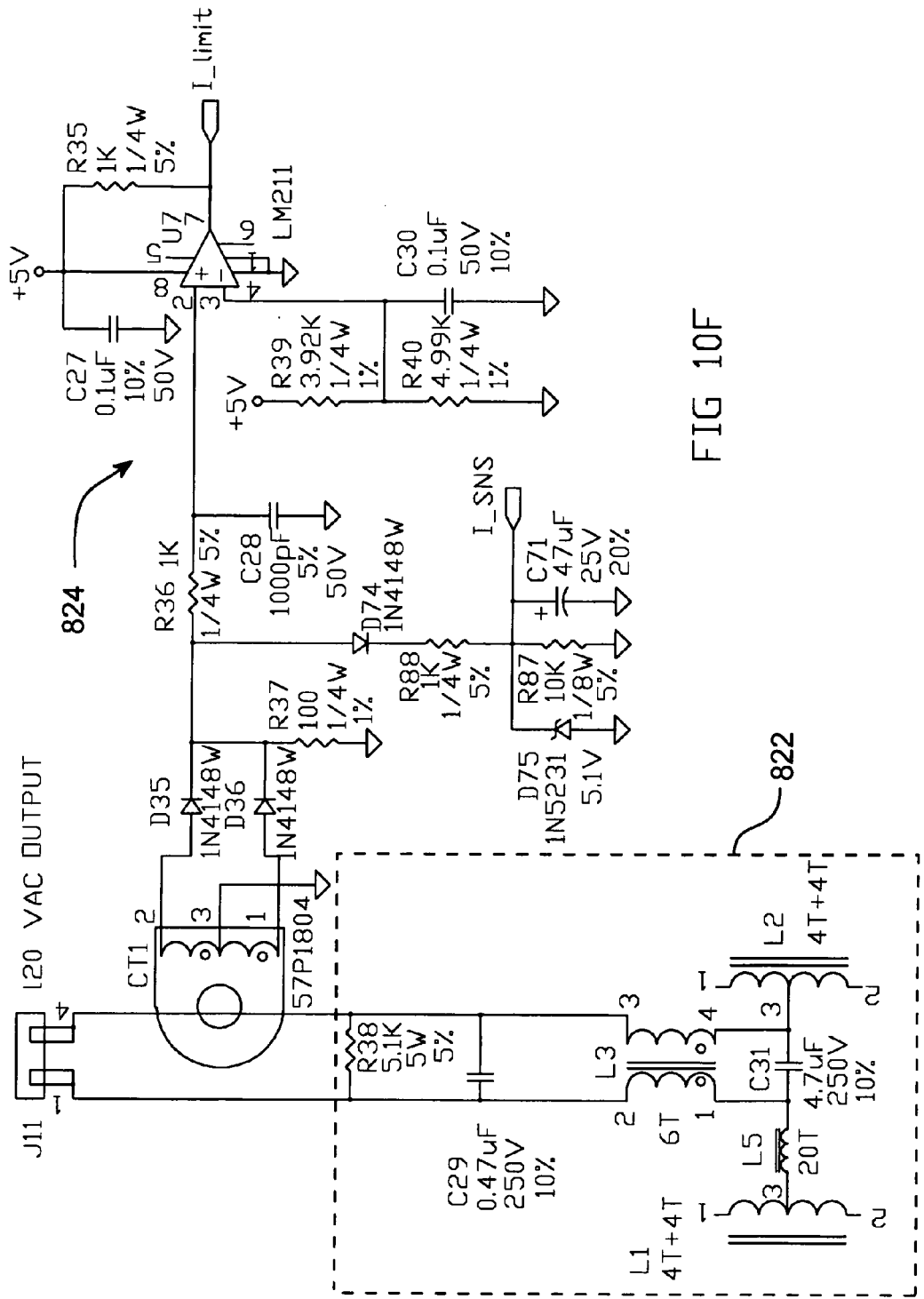
Figure 10G:
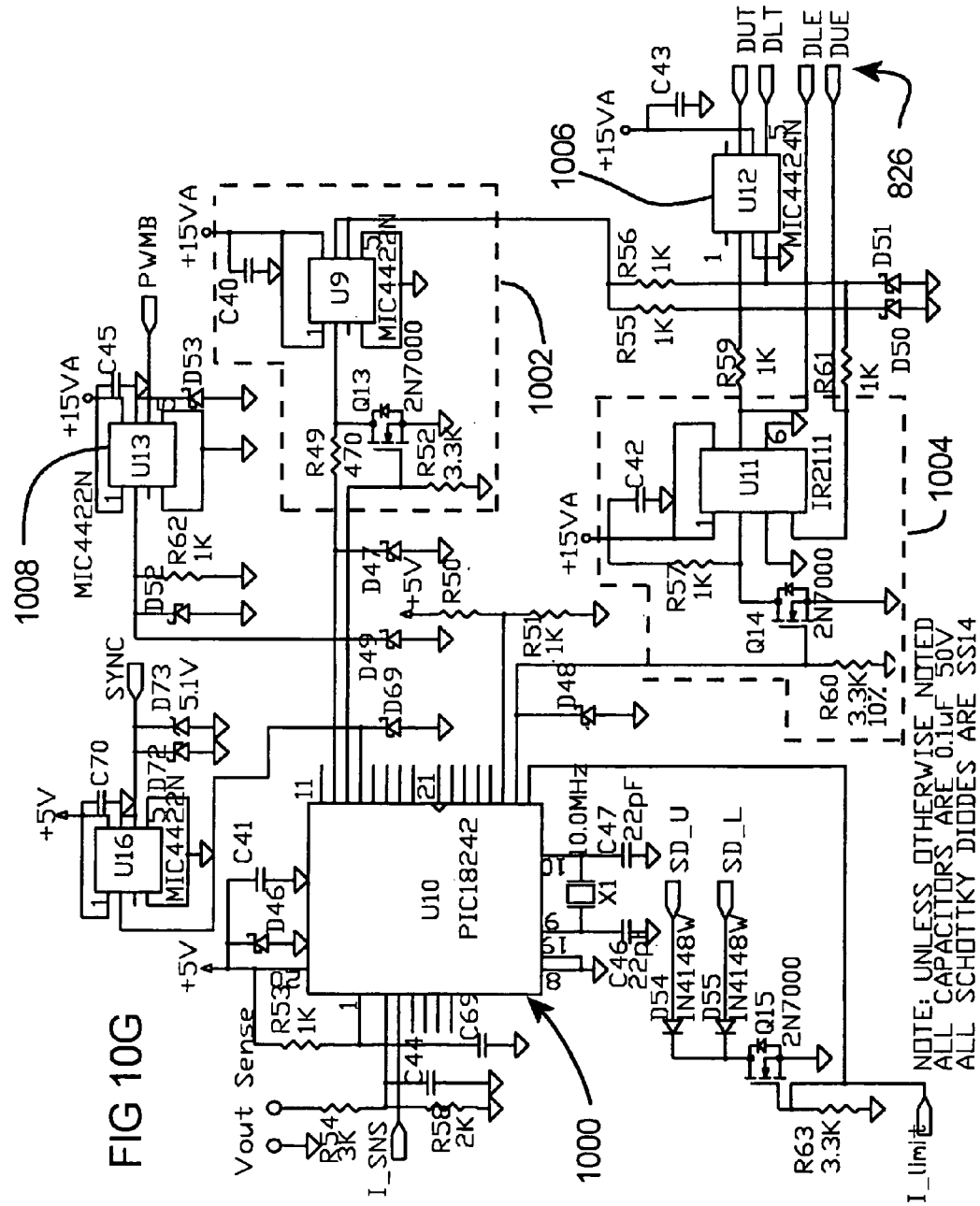

Preferred embodiments of the components of inverter 108 are shown in FIG. 10: switching circuit 802 and driver circuitry 804 in FIG. 10A; switching circuit 806 and driver circuitry 808 in FIG. 10B; switching circuit 810 and driver circuitry 812 in FIG. 10C; switching circuit 814 and driver circuitry 816 in FIG. 10D; switching loss reduction circuits 818 and 820 in FIG. 10E; filter circuitry 822 and current sensing circuitry 824 in FIG. 10F; controller 826 in FIG. 10G.

In general, an AC signal is generated by cyclically rendering conductive, on a mutually exclusive basis, a first pair of switching devices (e.g. the switches 802, 810 associated with the positive half cycle), then the second pair of switching devices (e.g. switches 806, 814 associated with the negative half cycle), for periods corresponding to one half cycle (180°) of the desired frequency, e.g. approximately 8.33 ms for a 60 Hz signal. This generates an essentially square wave shape, which is smoothed by output filter 822; the wave shape, however, often only remotely approximates a sine wave.

One conventional method of wave shaping to better approximate a sine wave is pulse width modulating the drive signals to the "primary" switches (pair of switches associated with the instantaneous half cycle). For example, referring to FIG. 9A, a cycle of a sine wave 850 includes a positive half cycle 852 (0–180°) and negative half cycle 854 (180–360°). The time period corresponding to each cycle is, in effect, subdivided into a predetermined number of nominal intervals (PWM frames) (e.g. 48 in FIG. 9, for ease of illustration, in the preferred embodiment 1000 intervals of 16.66 µS duration), preferably including a short dead time at the end of each frame. Each PWM frame corresponds to a predetermined angular portion of the waveform (resolution), e.g., approximately 7.5° in the illustrative example of FIG. 9 (in the preferred embodiment 0.36°.) The primary switches (802 (+U), 810 (+L) for positive half cycle 852, or 806 (–U), 814 (–L) for negative half cycle 854) are then turned on only for a portion of each (typically each) of the time increments. Conventionally, both the upper and lower primary switches are switched on and off simultaneously, as illustrated in FIG. 9A. In either case, the duty cycle may range from less than 1% to over 97%.

The percentage of the time increment during which the switches are turned on (the duty cycle) during an individual interval is varied as a function of the desired corresponding waveform instantaneous, relative amplitude to simulate the desired sinusoidal waveform. In general, however, the duty cycle of the primary switches is typically at a minimum value during the time period corresponding to 0°, increases gradually in successive increments until reaching full duty cycle at the time period corresponding to a phase of 90°, then decreasing (symmetrically with the first 90°) until reaching the minimum at 180°. In a simplified example of 7.5° increments (resolution), exemplary values of the duty cycle of the primary switches during various incremental time periods might be 5% for the time period corresponding to a phase of 0–7.5°, 10% for the time period corresponding to a phase of 7.5–15°, 50% for the time period corresponding to a phase of 36.6–44°, 100% for the time periods corresponding to a phase of 82.5–90° and 90–97.5°, 50% for the time period corresponding to a phase of 127.5–135°, and 5% for the time period corresponding to a phase of 172.5–180°.

As previously noted, basic wave shaping (e.g. smoothing) is provided by filter 822. In essence, the inductor and capacitor of filter 822 store magnetic and electrical energy during the period when current flows through the primary switches. However, if the inductor fails to completely discharge during the intervening dead time before the next successive pulse (that portion of the time interval during which the primary switches are turned off), distortion of the waveform may result. This is because any remnant energy left in the filter will add to the energy injected by the next pulse. The sum of these energies will not yield the intended value. Conventionally, to ensure that output filter 822 is completely discharged/reset for each time interval, a discharge path through the complementary switches is provided for at least a portion of the "dead time" between pulses. Conventionally, as illustrated in FIG. 8A, both the upper and lower complementary switches (–U, –L during the positive half cycle, and +U, +L during the negative half cycle) are switched on and off simultaneously to provide the discharge path. The complementary switches are typically turned on for a period inversely proportional to the duty cycle of the primary switches. For example, when the duty cycle of the primary switches is at maximum value during an interval, the complementary switches are turned on for a time period corresponding to the minimum duty cycle of the primary switches.

In general, the larger the number of incremental time periods into which the half cycle is divided (i.e., the higher the "resolution" of the simulation), the more closely a sinusoidal waveform is approached. However, the greater the number of times that the power switches are turned off, the greater the switching loss, and concomitant heat. One way to reduce such losses is to employ respective switching loss reduction circuits (analogous to circuit 204) with respect to each of the switches in inverter bridge 604. Use of a boost-type regulator 400 facilitates recapture of the energy collected by such circuits; the energy collected can be fed back to the input source without affecting regulation. If the voltage starts to increase, the boost regulator feedback control circuitry will compensate.

In accordance with another aspect of the present invention, conduction and switching losses in inverter may also (or alternatively) be reduced by, as illustrated in FIG. 9B: (a) maintaining one of the primary switches (preferably the high side switch) conductive during the entire corresponding half cycle, and pulse width modulating only the other (e.g. low side) primary switch; and/or (b) effecting complementary pulse width modulation (i) only of the complementary switch corresponding to the primary switch that is held on for the half cycle (e.g. the high side complementary switch). Modulating only one of the primary switches (e.g. the low side switch), and maintaining the other primary switch on for the entire half cycle, in effect, cuts the number of heat generating switching transitions of the primary switches in half as compared to conventional techniques. Likewise, providing the complementary discharge modulation through only one of the complementary switches (e.g. high side switch) similarly, in effect, cuts the number of heat generating switching transitions of the complementary switches in half as compared to conventional techniques.

In addition, the present inventors have determined that with loads above a predetermined level (e.g. in the range of 1 KW to 2 KW), it is not necessary to provide a specific discharge path between pulses in order for filter 822 to completely discharge. Accordingly, in accordance with yet another aspect of the present invention, the number of switching transitions of the complementary switches can further be reduced by effecting the complementary switch discharge path modulation only at power levels below the threshold. At power levels above the threshold, the complementary switches are maintained off for the duration of the half cycle. Thus, not only are switching transitions avoided, but the transitions of the complementary switches occur at relatively loads, so that the switching loss is at relatively low levels.

Referring again to FIG. 8, switches 802, 806, 810, and 814 are selectively rendered conductive by control signals from controller 826 applied to the associated drivers 804, 808, 812 and 814.

In the preferred embodiment, controller 826 is responsive to input signals I_SNS from current sensor 824, and Vout_I and generates control signals including:

| | |
|---|---|
| DLE | To selectively enable positive lower drive 812 during the positive half cycle for actuation in accordance with a pulse width modulated signal PWMB |
| DUE | To selectively enable negative lower drive 816 during the negative half cycle for actuation in accordance with a pulse width modulated signal PWMB. |
| DUT | To selectively enable and actuate positive upper drive 804 during the entire positive half cycle and, under low load conditions (e.g., >1 KW), in accordance with a pulse width modulated signal complementary (inverse) to signal PWMB during the negative half cycle. |
| DLT | To selectively enable and actuate negative upper drive 808 during the entire negative half cycle and, under low load conditions (e.g., >1 KW), in accordance with a pulse width modulated signal complementary (inverse) to signal PWMB during the positive half cycle. |
| PWMB | Signal for effecting pulse width modulation of the selected lower drive 810 or 814. |
| SD_U | To disable negative lower drive 816 in the event of an over current condition. |
| SD_L | To disable positive lower drive 812 in the event of an over current condition. |

Referring to FIG. 10C, a preferred embodiment of controller 826 suitably comprises a microcontroller 1000 with an internal PWM generator module, a subtracting driver 1002, a conventional a half bridge driver circuit (e.g. an international rectifier IR2111 half-bridge driver) 1004 and respective driver circuits.

As will be discussed, microcontroller 1000 generates: at pin 27 (RB6), a half cycle period signal (POS_HALF_DISABLE), effectively an inverse square wave at the desired half cycle, low during the positive cycle); at pin 12 (RC1/OS1/CCP1), selectively, when the output load is below the predetermined level (e.g., 1 KW), a pulse stream, PWMC, corresponding to the respective PWM frames (e.g. 16.66 μS time intervals) and, at pin 13 (RC2/CCP1), a PWM signal with a programmed duty cycle.

The half cycle period signal (POS_HALF_DISABLE) is utilized to develop high side enable (DLT and DUT) and low side disable signals (DLE and DUE). Half cycle period signal (POS_HALF_DISABLE) is level shifted (by transistor Q14), and applied as an input to half bridge driver circuit 1004, which generates positive half disable (DLE) and negative half disable (DUE) signals, preferably including a short delay between transitions to avoid potential shoot through in the operation of rectifier 200, for application to low side drivers 812 and 816 (FIG. 10A). The positive half disable (DLE) and negative half disable (DUE) signals are also buffered by a conventional low side MOSFET driver 1006 (suitably a Micrel MIC4424N Dual 3A-Peak low-side MOSFET driver) to derive complementary (enabling) signals DLT and DUT, for application to high side drivers 804 and 806 (FIG. 10A).

Pulse width modulated signal PWM (pin 13) is buffered by a conventional low side MOSFET driver 1008 to generate a PWM drive signal PWMB, for application to low side drivers 812 and 816 (FIG. 10A).

Pulse width modulated signal PWM (pin 13) is also applied, together with PWM frame signal PWMC (pin 12) to subtracting driver 1002. PWM frame signal PWMC is generated only when the output load is less than the predetermined threshold. Subtracting driver 1002, in effect, subtracts the PWM signal from the frame signal. Subtracting driver 1002 is thus effectively disabled during high load periods when the frame signal is not generated and generates a complementary PWM signal, PWMD, when the output load is less than the predetermined threshold. Complementary PWM signal PWMD, is applied to both inputs of driver 1006, for application as a component of high side switch enabling signals DLT and DUT. When the inputs of driver 1006 are already at a high level by virtue of the outputs from half bridge driver circuit 1004, complementary PWM signal PWMD has no effect. However, when the output would otherwise be low, the high side enable signals track complementary PWM signal PWMD.

Microcontroller 1000 suitably comprises a Microchip PIC 18242 microcontroller configured to include:

Timer 0 (TMR0) Timer 0 is configured as an 8-bit counter driven by an internal clock. The timer value is reloaded on each rollover to create an interrupt event from timer 0 at a fixed time base, e.g. 100 mS.

PWM (1) is a hardware based PulseWidthModulation (PWM) module that is controlled by a period register PR2 and a duty-cycle that is controlled by two hardware registers: CCPR1L holds the upper 8 bits of the 10 bit duty-cycle, the lowest 2 bits are held in the control register CCP1 CON bits 5 and 4. Once the control registers have been written and the PWM module is turned on, the module will run essentially independently at the given period (frequency) and duty-cycle. The interrupt event from the PWM module indicates that a new frame has begun. This means that the value in CCPR1L was loaded into the module's internal registers. The CCPR1L register is a "latch" for the actual internal duty-cycle register, storing the contents of the internal register at the instant of period rollover. If the latch is not updated before the current period expires, the current value of the latch will be re-used.

Table pointer: A 24-bit pointer for access of the code space data. This hardware pointer is used for reading the duty-cycle data that is stored in the code space as a list of constants. The pointer is composed of three registers:
TBLPTRU: "Upper" highest 8 bits of the 24-bit pointer
TBLPTRH: high 8 bits of the 24-bit pointer
TBLPTRL: lowest 8 bits of the 24 bit pointer
Reads based on the pointer return the data stored in the code space (ROM) at the address held in the 24-bit Table pointer.

File (RAM) pointer: A 12 bit pointer for access of the file (RAM) data space. This hardware pointer is used to clear RAM and to store history within the analog thread.

Analog-to-Digital converter: This hardware module reads from the selected input channel and stores an 8-bit or 10-bit result. The channel selected is controlled by the control register ADCON0 bits 5, 4 & 3.

3 Input/Output ports: Two 8-bit ports (PORTB and PORTC) for digital only and a 6-bit port (PORTA) that can be digital or analog or a mixture of both. Each bit within a port can be configured as a digital input or output. The 6-bit port (PORTA) can also be configured to receive an analog input.

In general, microcontroller 1000 is programmed to control the duty cycle of the microcontroller PWM module, to create a 60 KHz sine wave out of the inverter. Time intervals (PWM frames) of 16.66 us are established. At beginning of the frame, the PWM signal (pin 13) goes high for the applicable duty cycle, after which it goes low for the remainder of the frame. A table of duty cycle values is constructed using an external program to create a sine shaped output. The table holds 180 degrees of data. An output control bit changes state and the table is repeated (in reverse order) for the second 180 degrees. Output current is monitored to detect load conditions below a threshold value, under which conditions PWM frame signal PWMC is generated to create complementary PWM signal PWMD]. Beyond the 10 bits of data dedicated to the duty cycle, a wave shaping on/off flag is suitably embedded, allowing frame-by-frame control of the wave shaping.

Figure 11A:
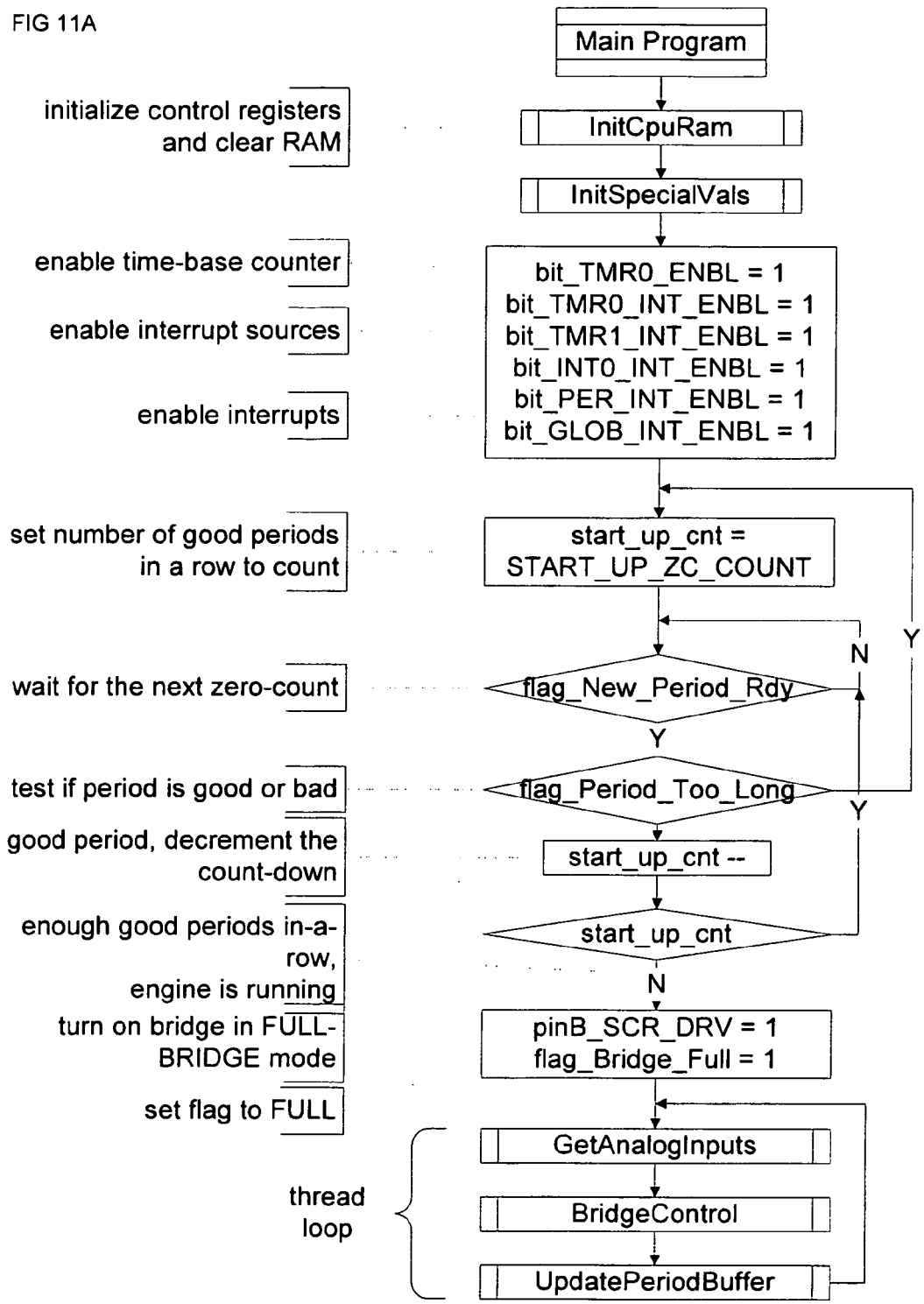
Figure 11B:
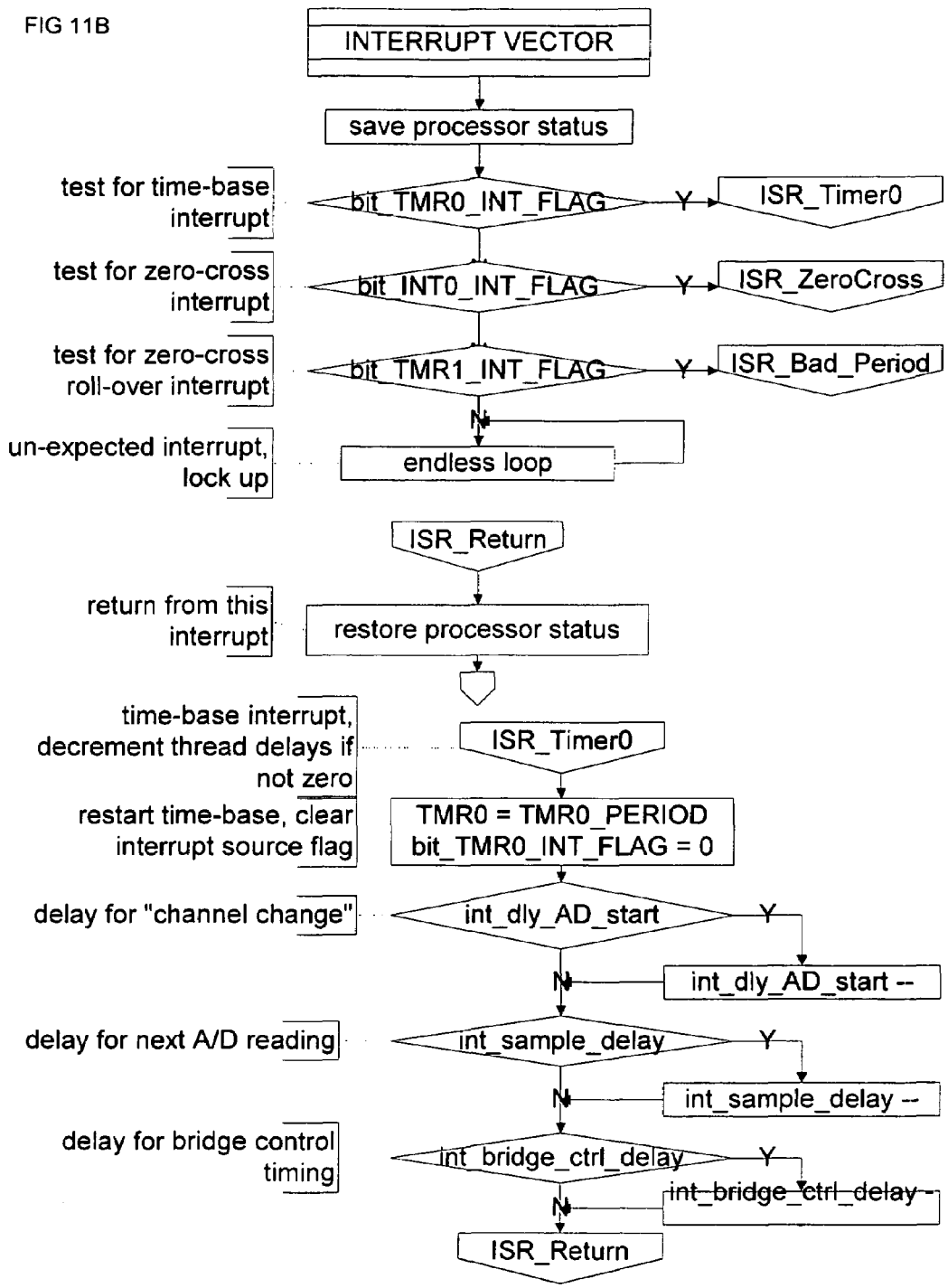
Figure 11D:
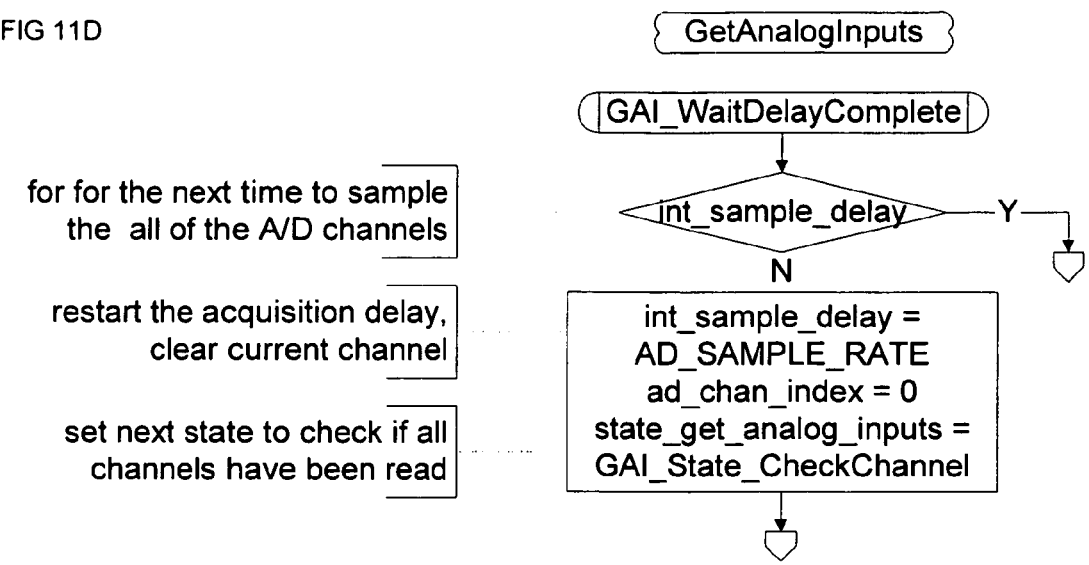
Figure 11E:
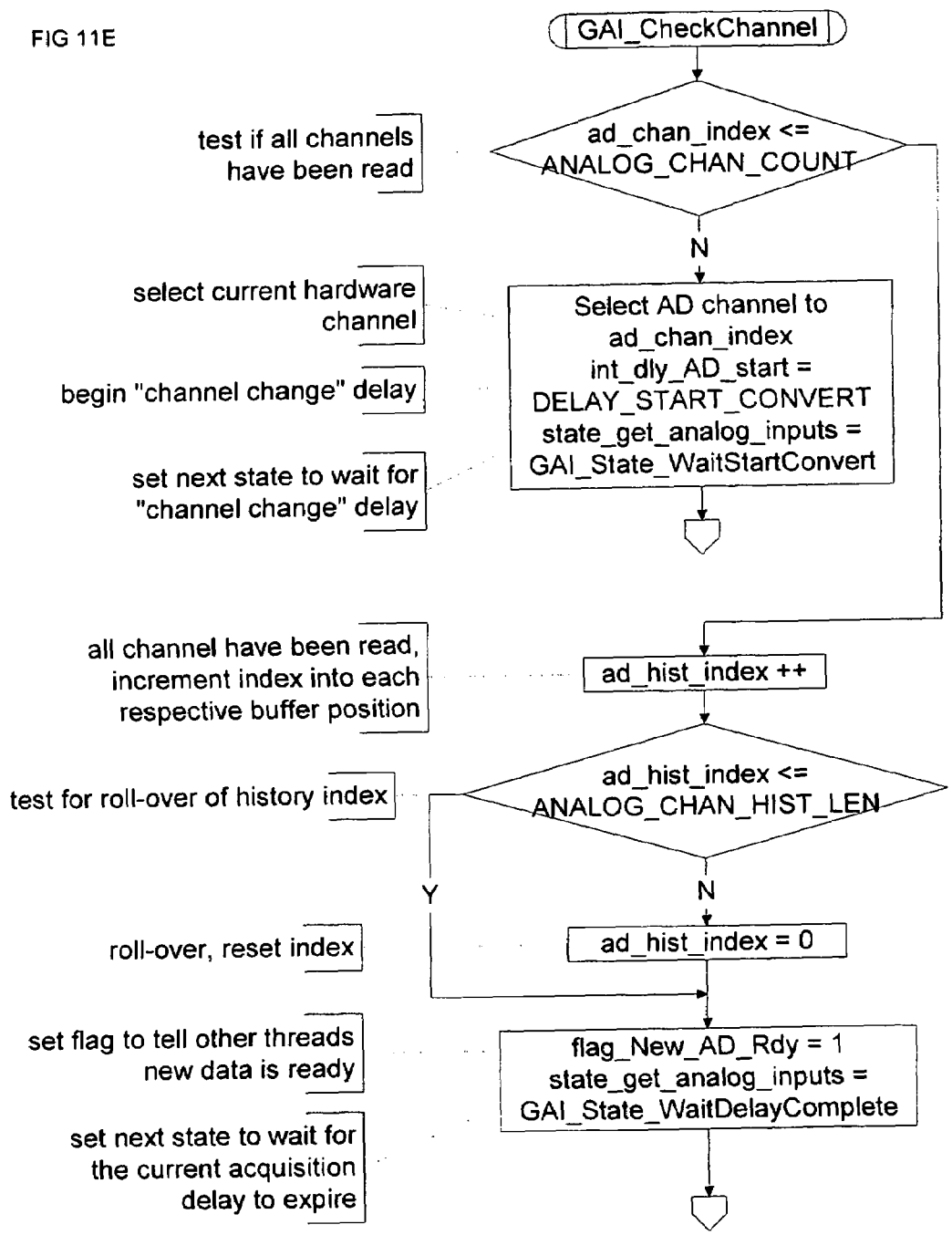
Figure 11F:
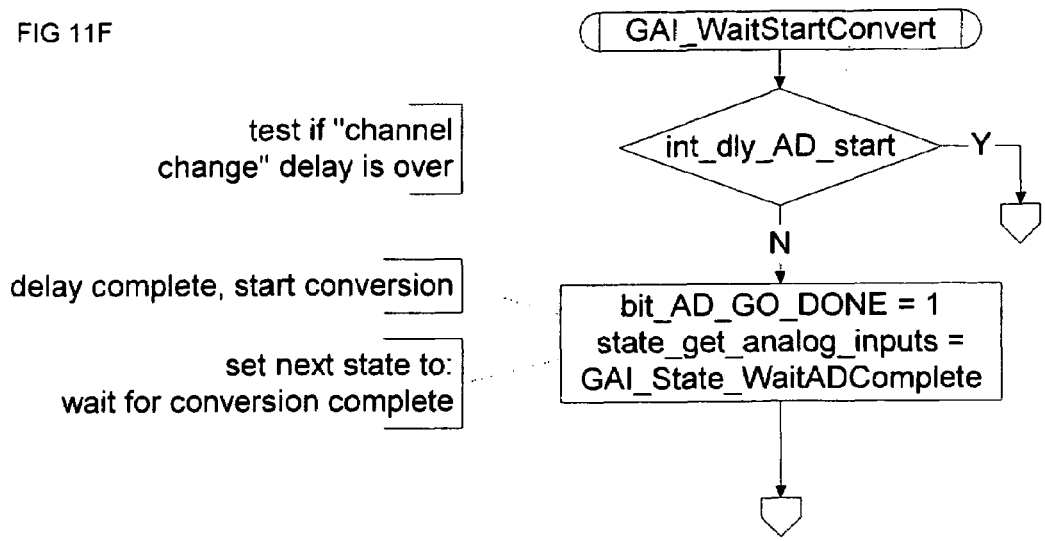
Figure 11G:
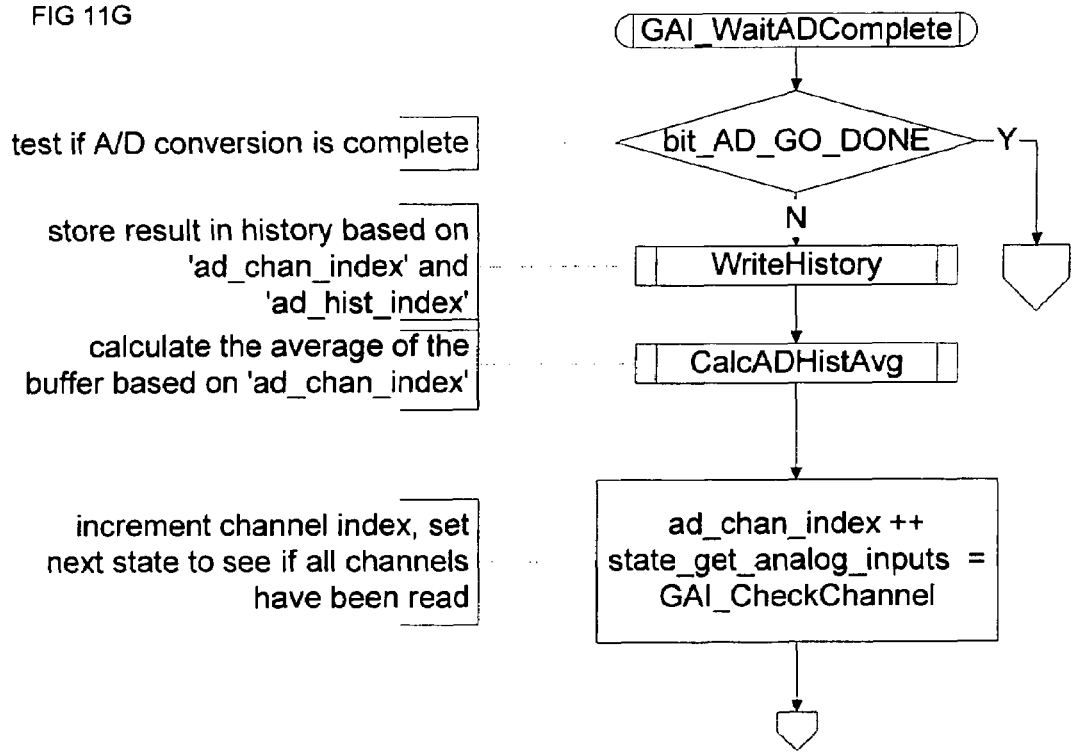
Figure 11H:
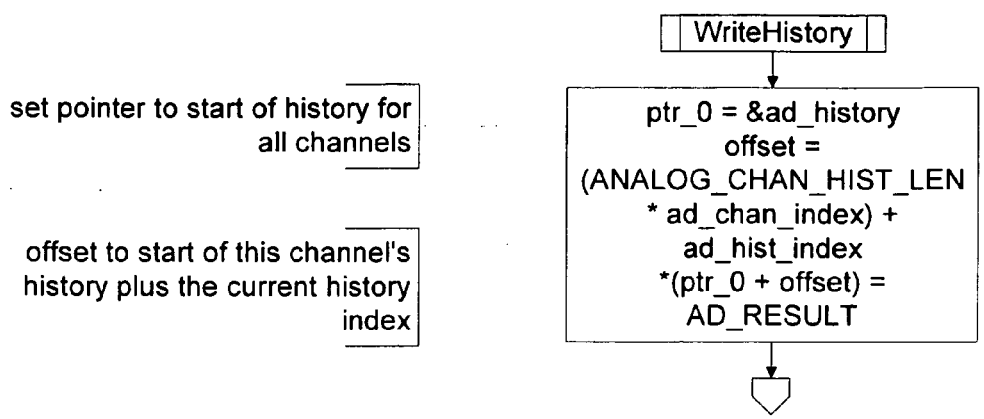
Figure 11I:
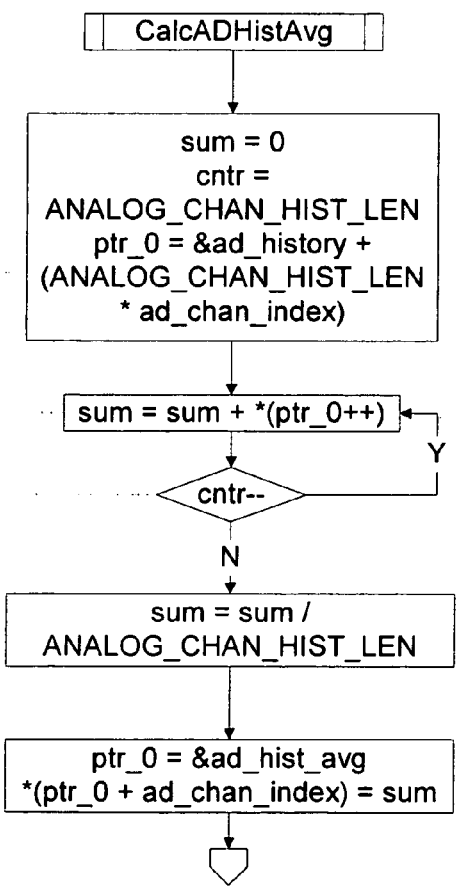
Figure 11J:
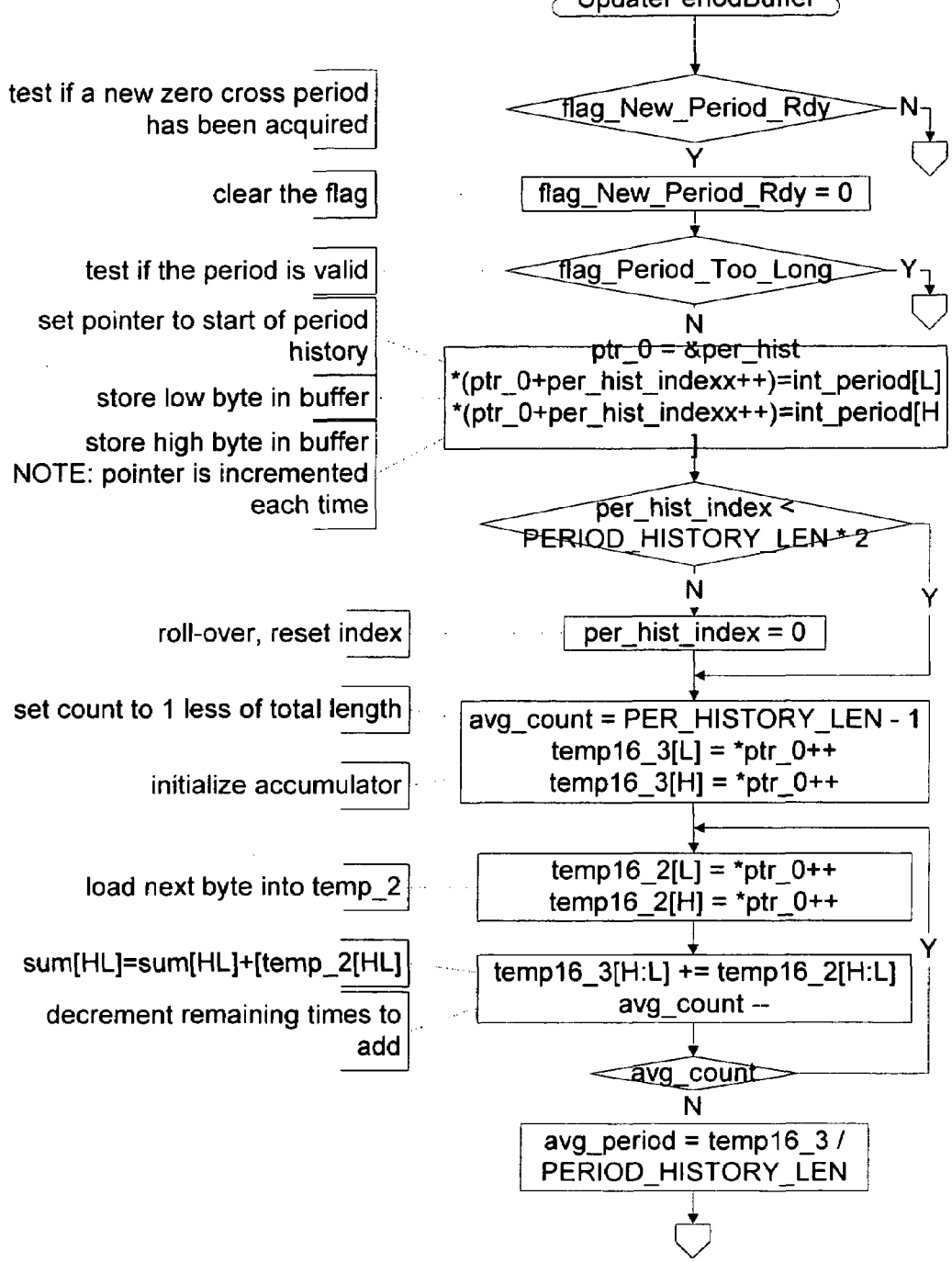
Figure 11K:
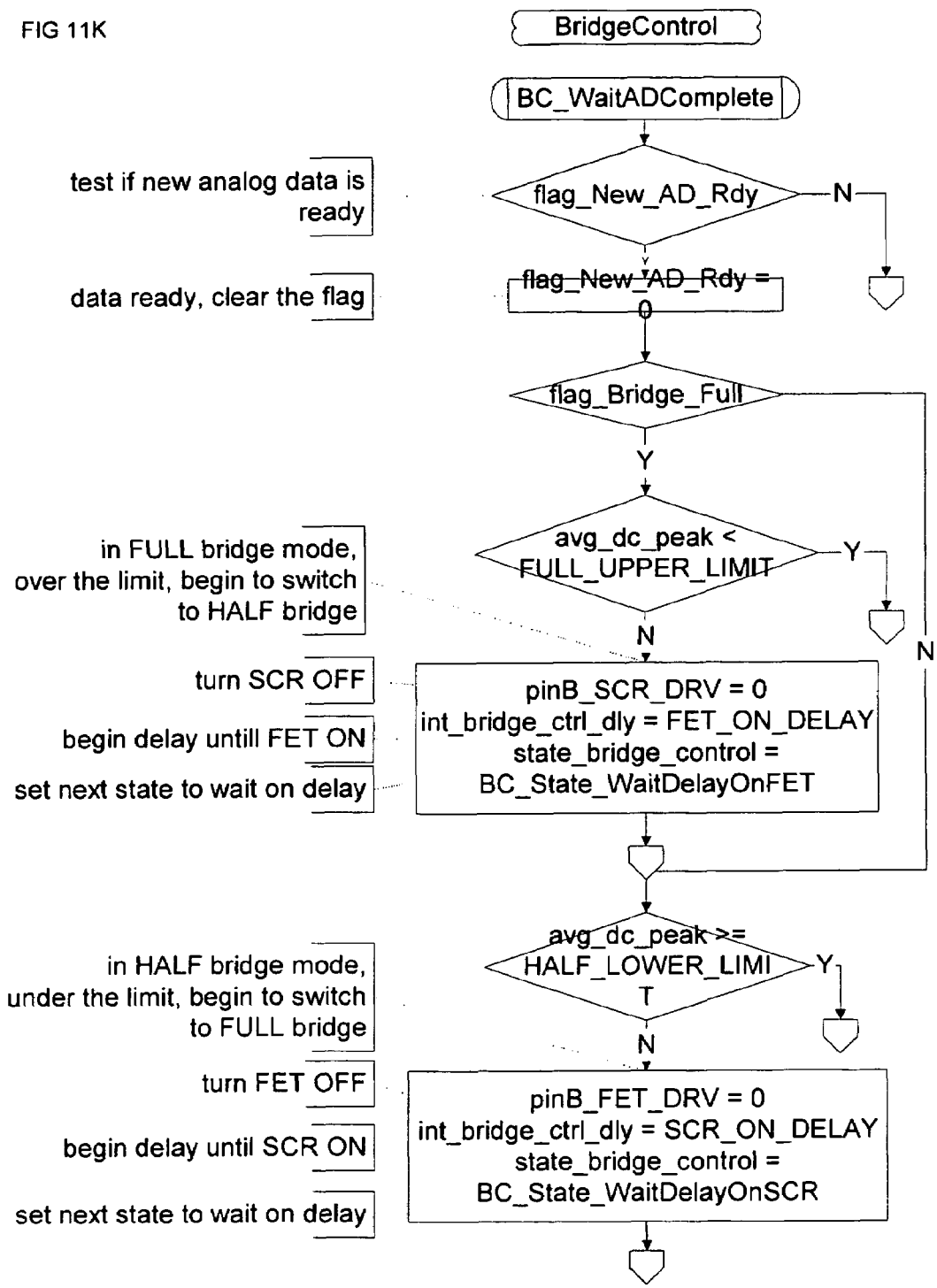
Figure 11L:
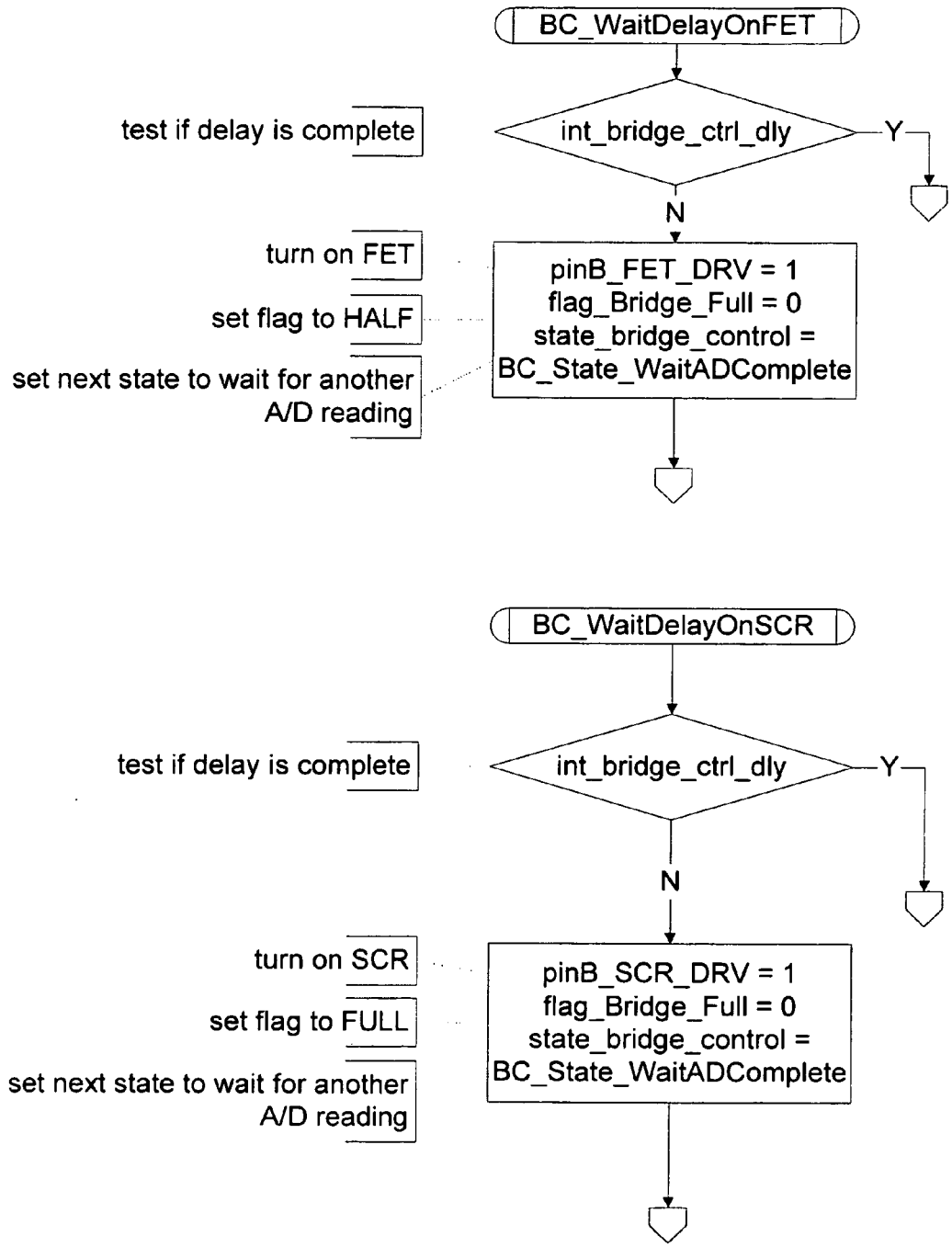
Figure 12A:
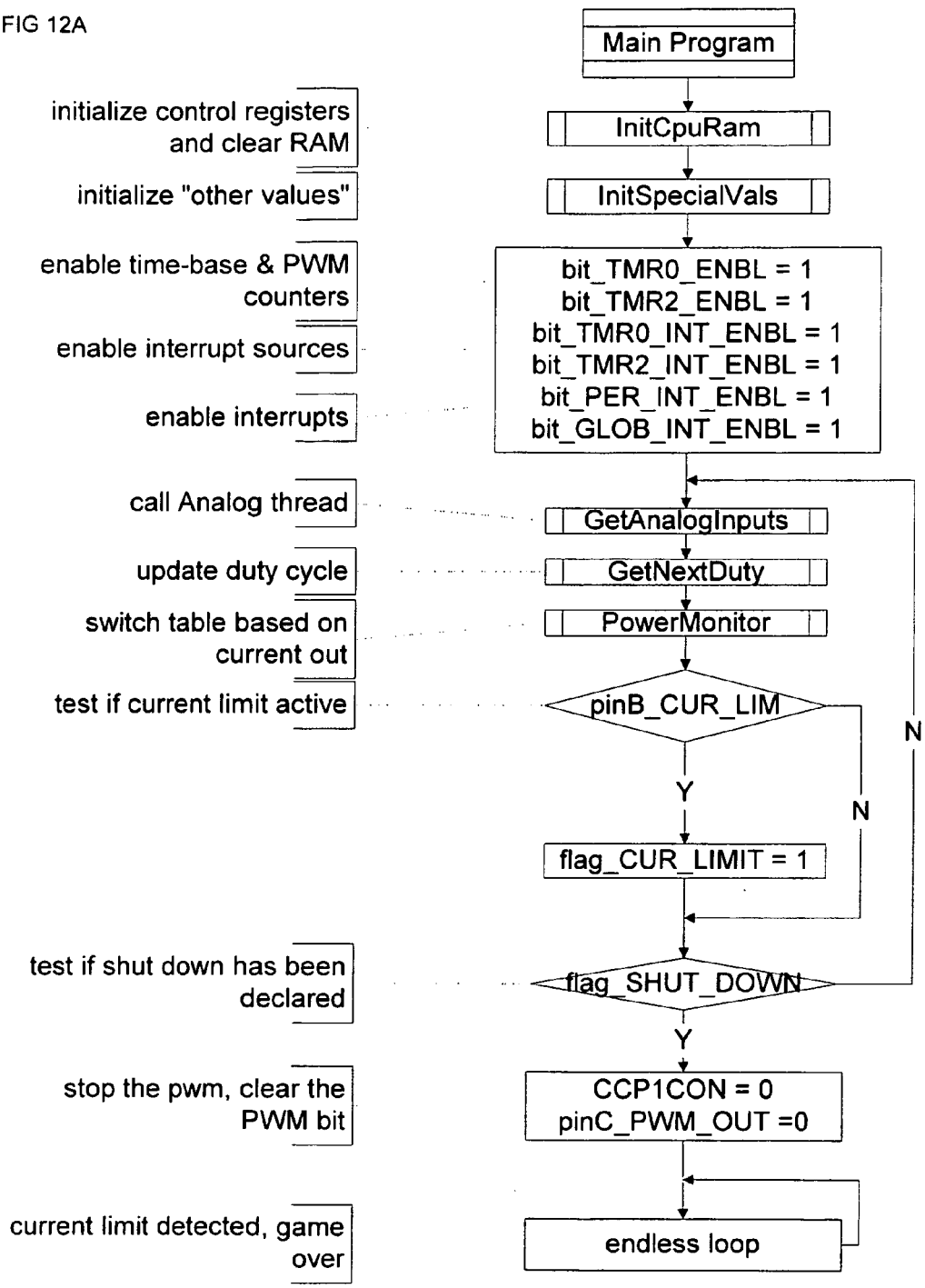
Figure 12C:
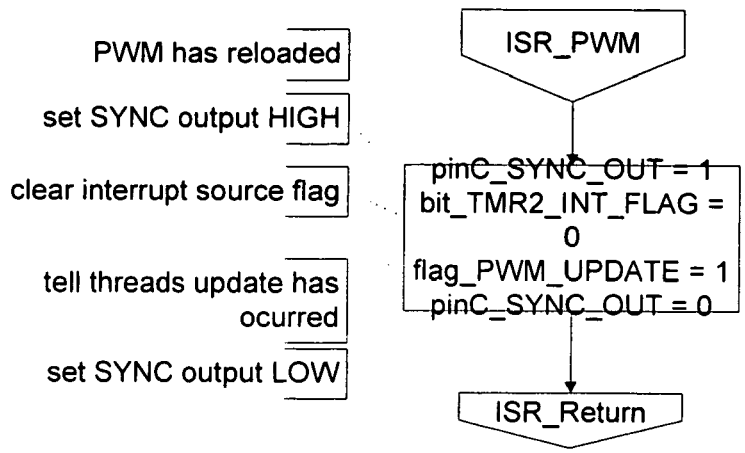
Figure 12D:
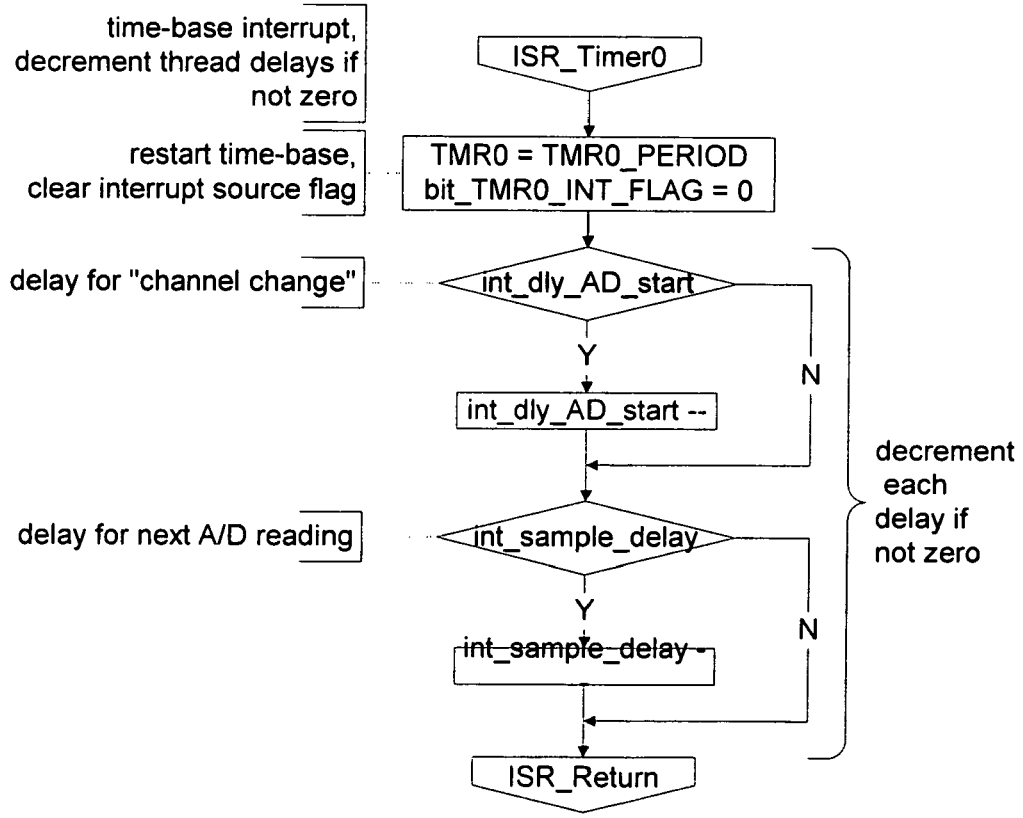
Figure 12F:
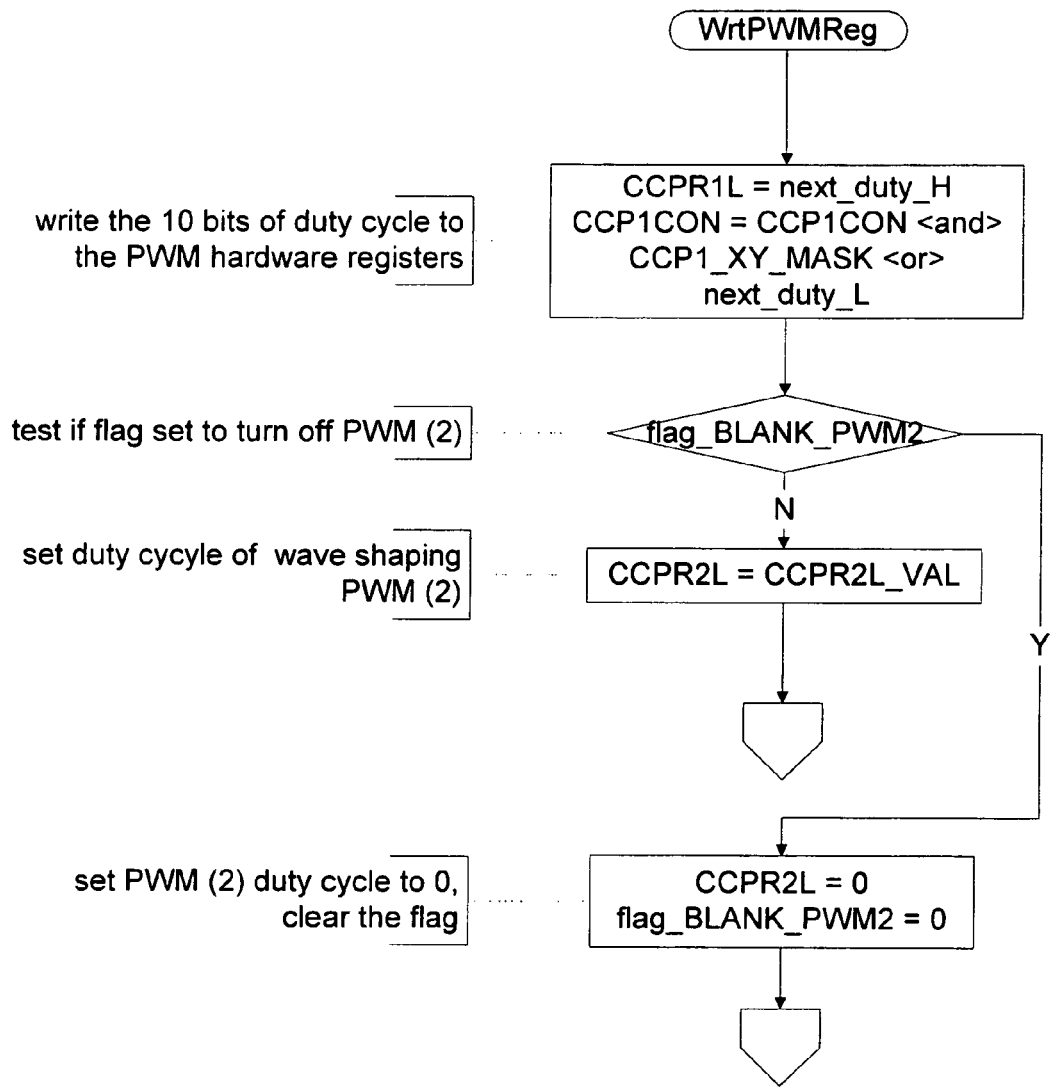
Figure 12G:
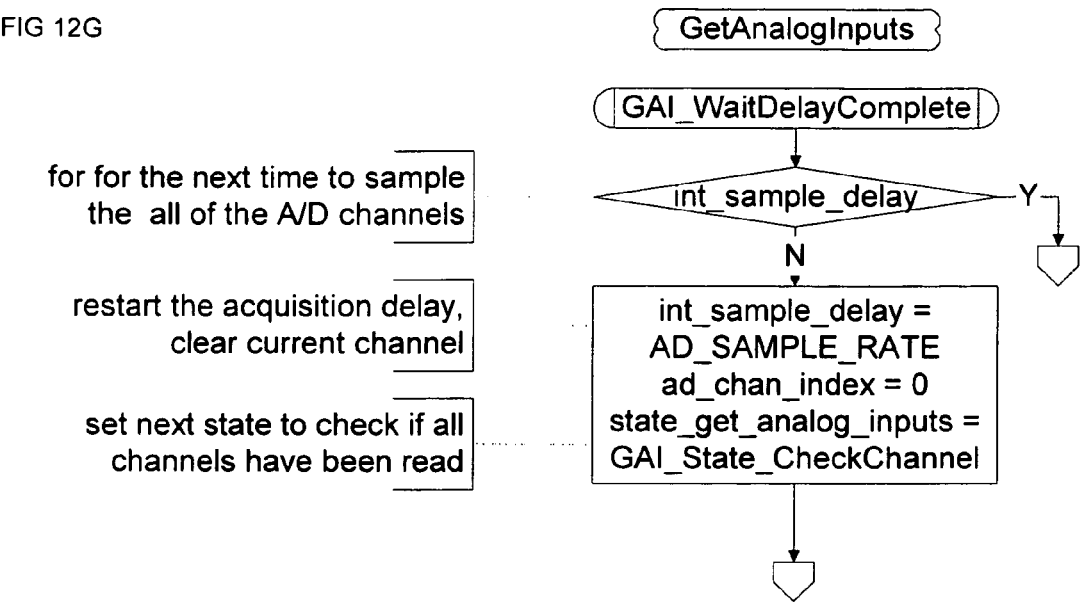
Figure 12H:
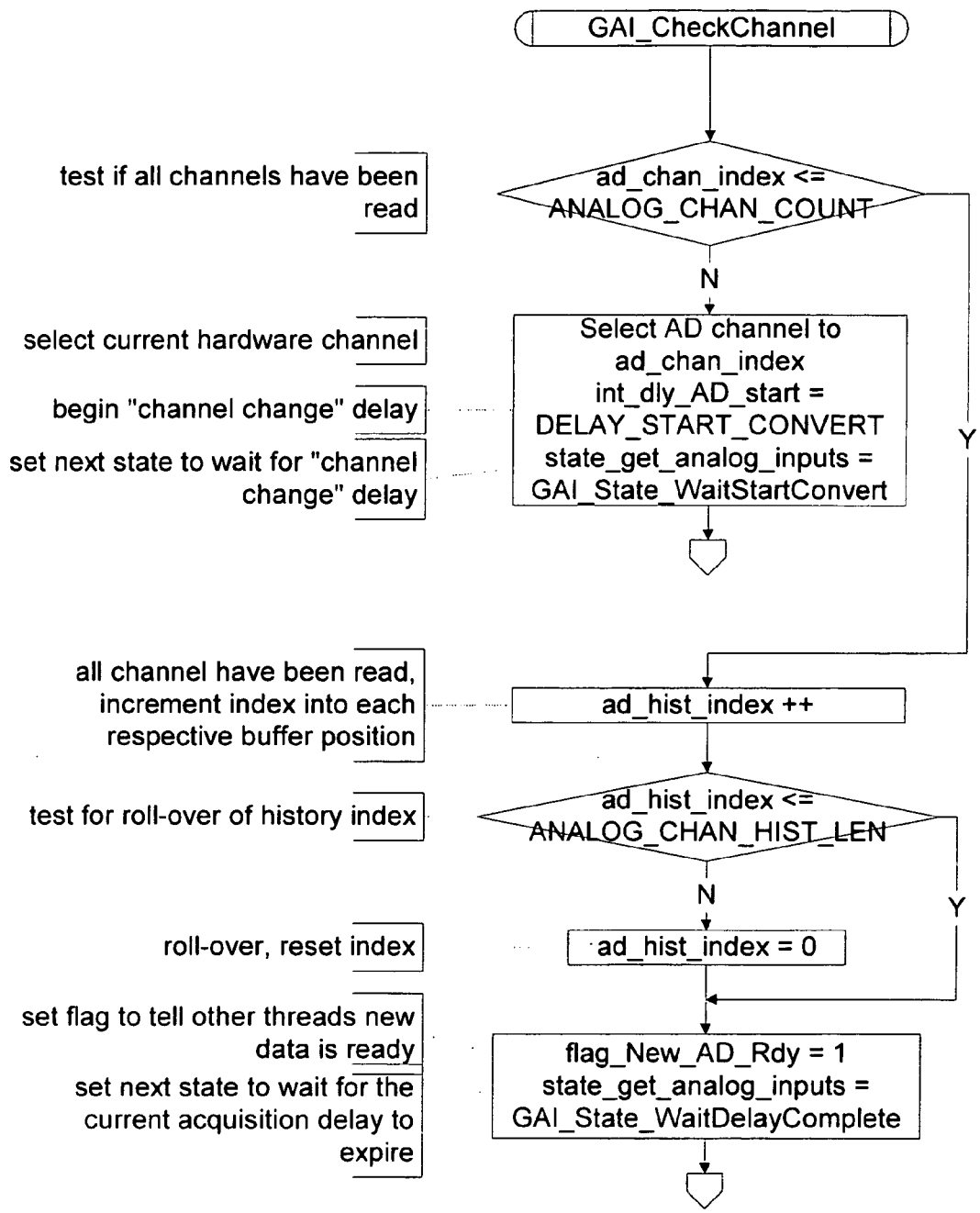
Figure 12K:
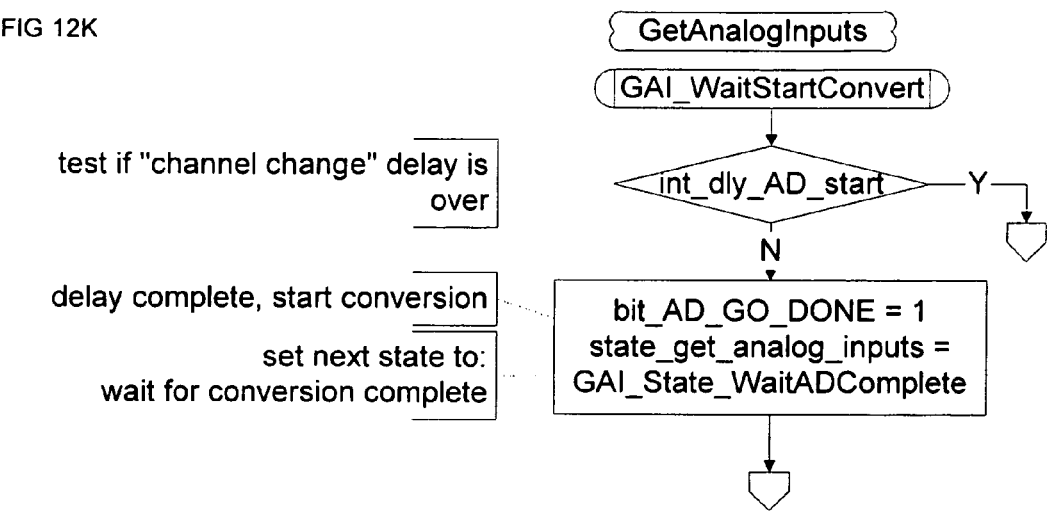
Figure 12L:
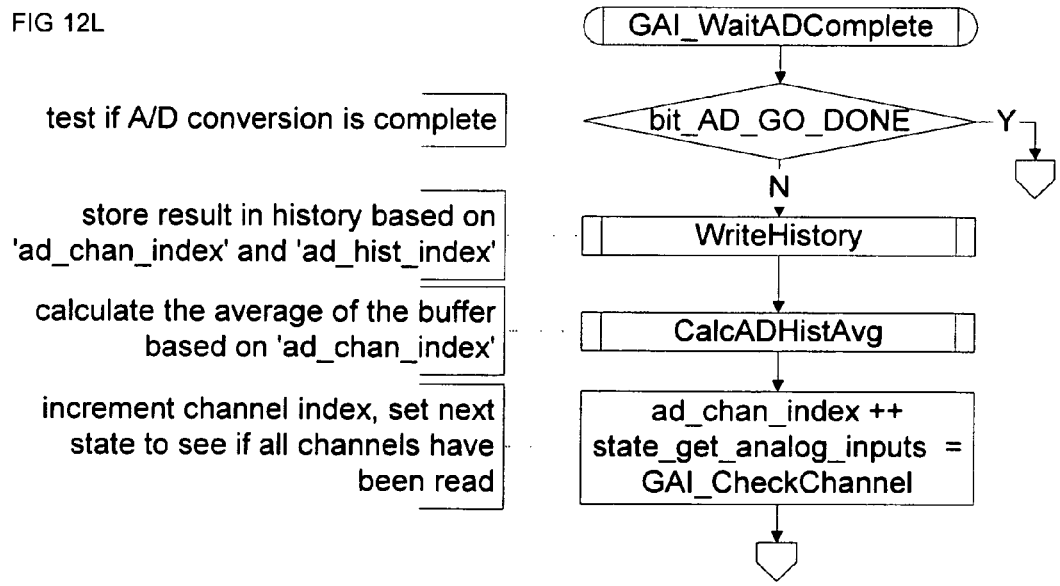
Figure 12M:
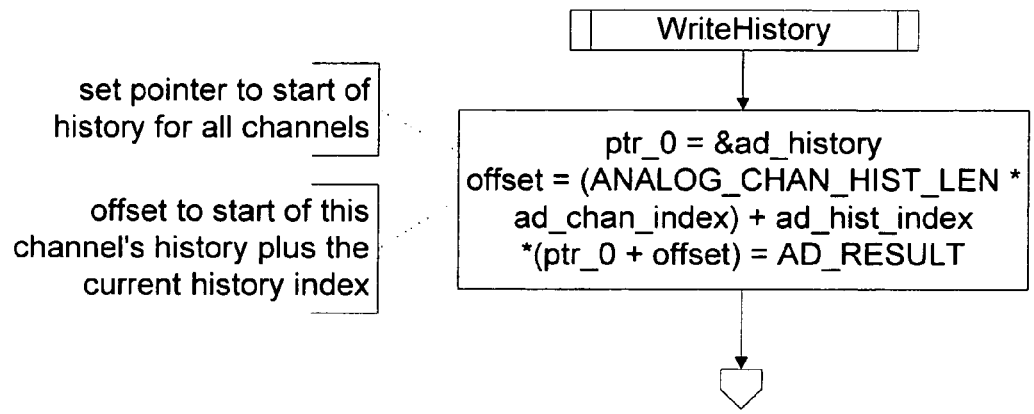
Figure 12N:
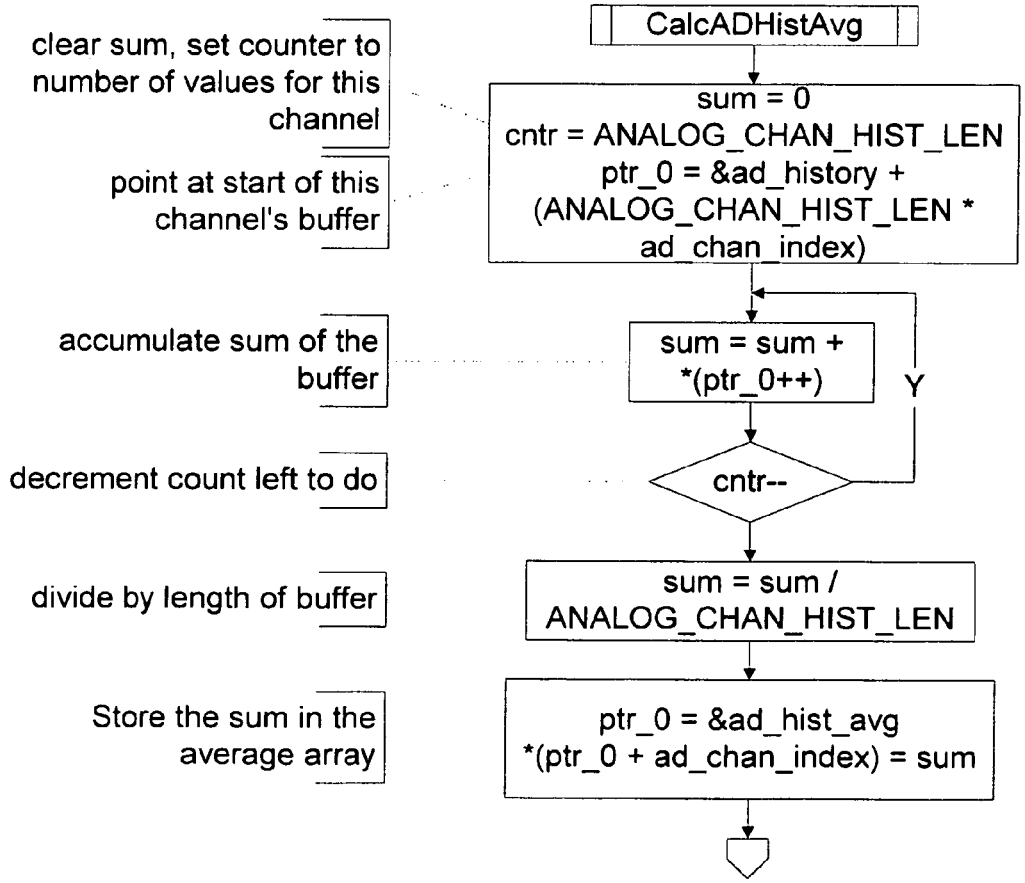
Figure 12O:
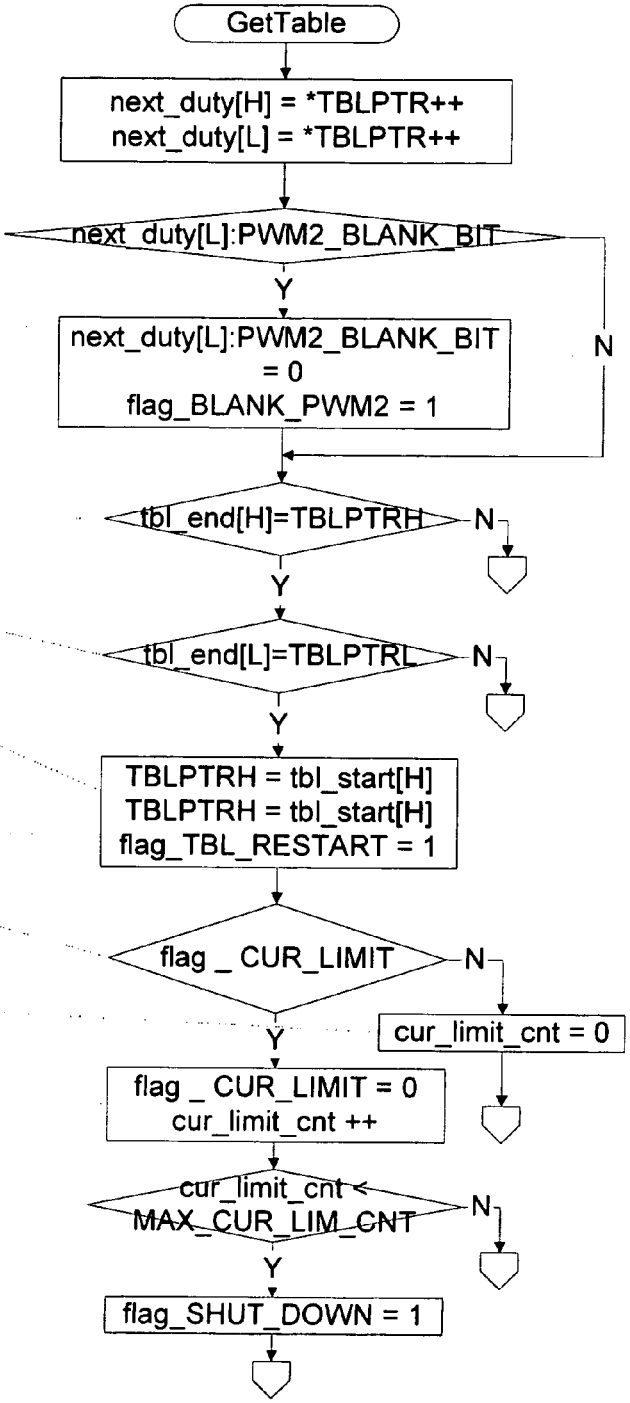
Figure 12P:
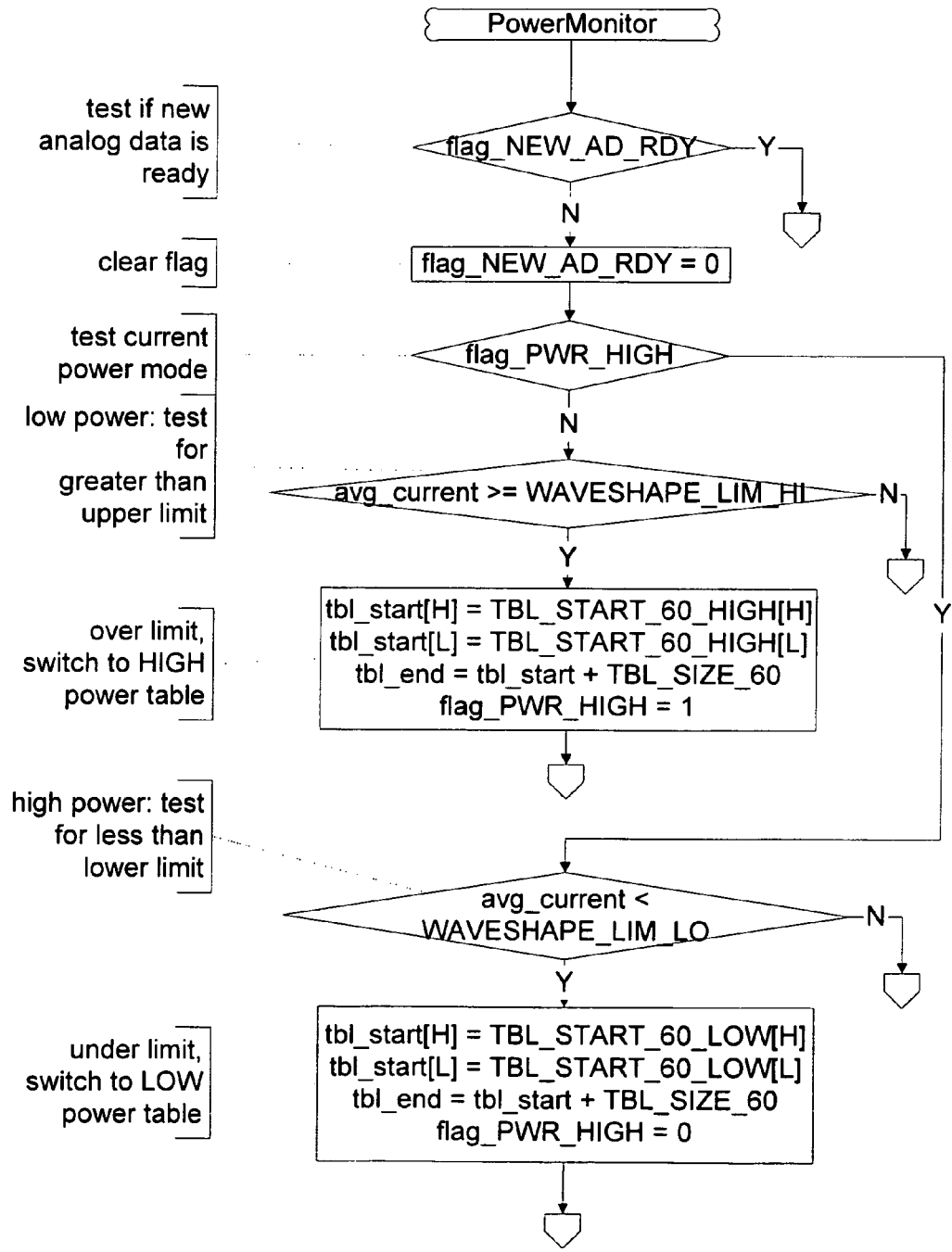
Figure 12Q:
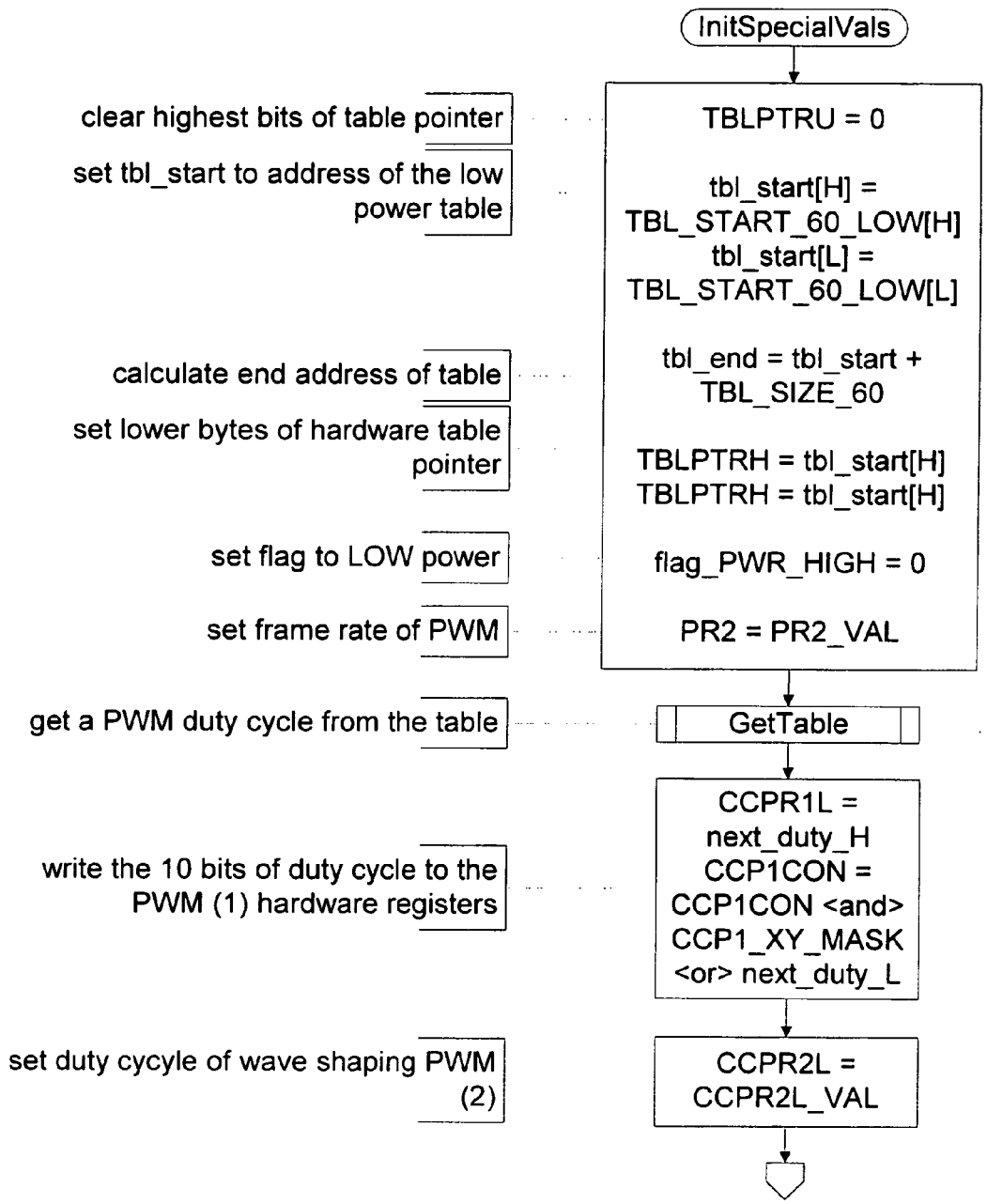

A flowchart of the program executed by controller 826 is provided in FIGS. 11A–Q. In general, the program is composed of normal initialization, start-up and "main loop" sequences. Within the main loop, three calls are made:

GetNextDuty: Checks for the flag indicating that the duty-cycle has re-started. If set, perform steps required to have the next duty-cycle from the table ready for the hardware register to use. As previously noted, if this function is not completed before the PWM frame expires, the old duty cycle will be re-used. Therefore, this function is given the highest priority, once triggered, it is executed without regard to any other tasks in the system.

GetAnalogInputs: acquires analog inputs (Vout_I, I_SNS), stores each result in a buffer and calculate the average of each buffer. This routine is suitably given a low priority and is structured as a "thread". Upon completion a flag is set indicating that the analog channels have been read, buffered and the average of each buffer calculated.

PowerMonitor: Monitor the load current from the inverter. This function checks the load current and determines which table [?] to use for the next half-cycle. The output load threshold is suitably not a single value; a small amount of hysterisis may be included to filter out jitter when the load current remains very close to the threshold. This function is triggered by the flag indicating that the analog channels have been read, buffered and average of each buffer calculated.

In addition, several "support" functions are employed:

InitCpuRam: Initializes control registers and clears all used RAM

InitSpecialVals: Sets up variables or registers specific to this program

GetTable: Reads from the duty-cycle table and exports embedded flags. This routine also detects the end of the table. If end of the table is detected, the TBLPTR is reloaded and a flag is set to indicate the condition WritePWMReg: Writes the duty-cycle from the table into the hardware registers.

WriteHistory: Used by the analog thread to store an analog result in the proper position within the analog history array.

CalcADHistAvg: Used by the analog thread to calculate the average of a section of the analog history array used for a single channel.

DC-DC converters 106

As previously noted, DC-DC converters 106 derive the desired level output voltage(s) V1, e.g. 12, 24, or 42 volts DC, from the relatively high voltage output (e.g., 180V) of rectification and regulation system 102 (e.g. regulator 400). DC-DC converters 106 can be implemented using any suitable topology, such as, for example, half bridge, full bridge in the switch mode, push pull, fly back, forward converter, or back boost converter. A preferred embodiment of a DC-DC converter 106 is implemented utilizing a full bridge pulse width modulated, stepped down, topology.

Referring to FIG. 6 such a DC-DC converter 106 suitably comprises: a filter capacitor 602; a conventional inverter H-bridge of power switches, e.g. FETs, 604, responsive to a conventional pulse width modulation (PWM) controller 606 (e.g. a LinFinity SG1842 Current-Mode PWM Controller); a conventional step down transformer 610; a conventional diode bridge rectifier 612 and a storage capacitor 614. In general, the relatively high level (e.g. 180 volts) DC input signal (VRO from regulator 400) is converted into a pulse width modulated signal by inverter 604. Transformer 610 steps down the voltage of the PWM signal to a predetermined level. Rectifier 612 then rectifies the signal into DC, and charges storage capacitor 614. The duty cycle of the PWM signal is controlled by controller 606 in accordance with the output V1, thus regulating the output signal to the desired value. Respective switching loss reduction circuits 608 (analogous to circuit 204) are preferably provided for the switches in inverter bridge 604.

Figure 7A:
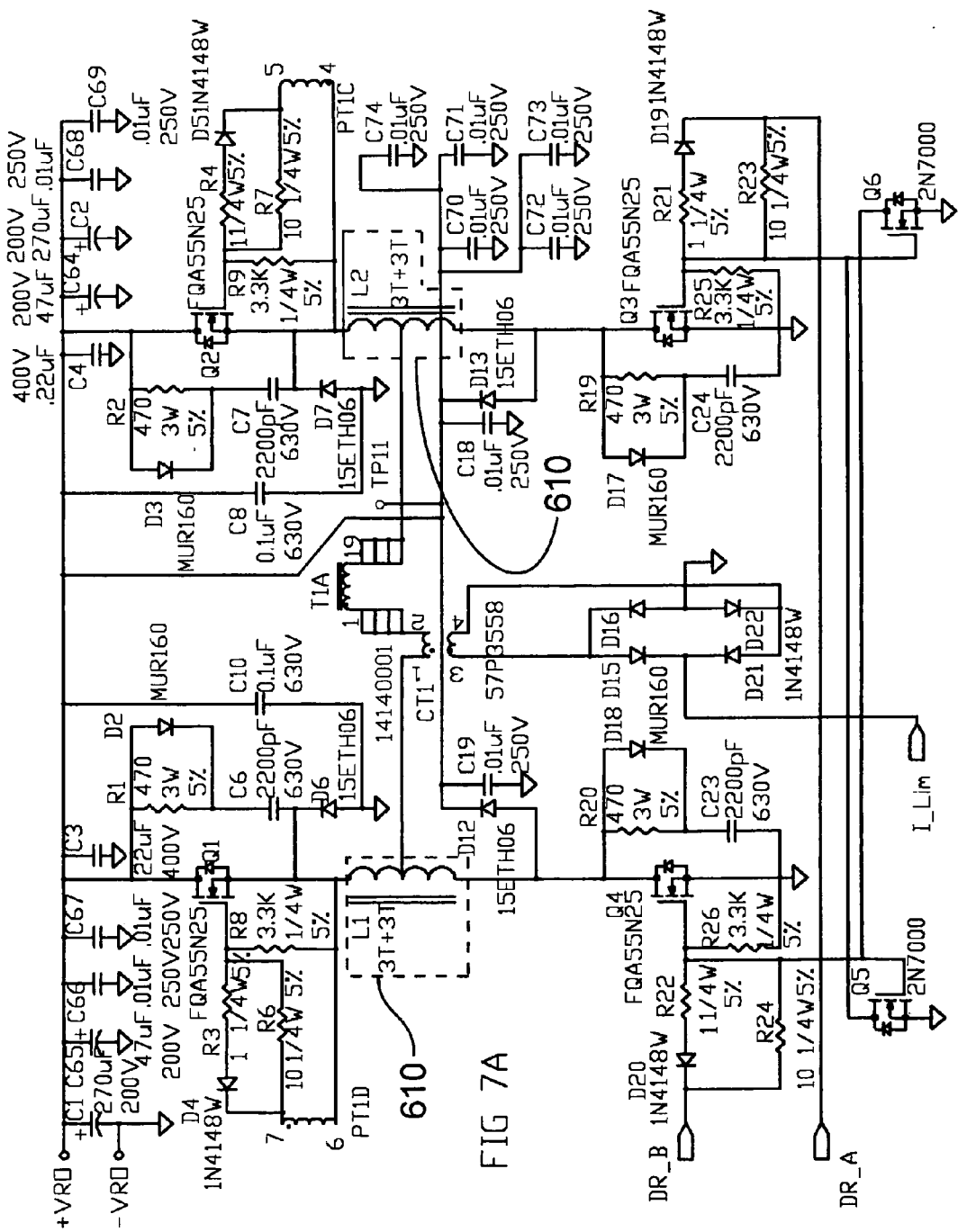
FIGS. 7A–7E (collectively referred to as FIG. 7) are schematic diagrams of the respective components of preferred embodiments of the DC-DC converter of FIG. 6.
Figure 7B:
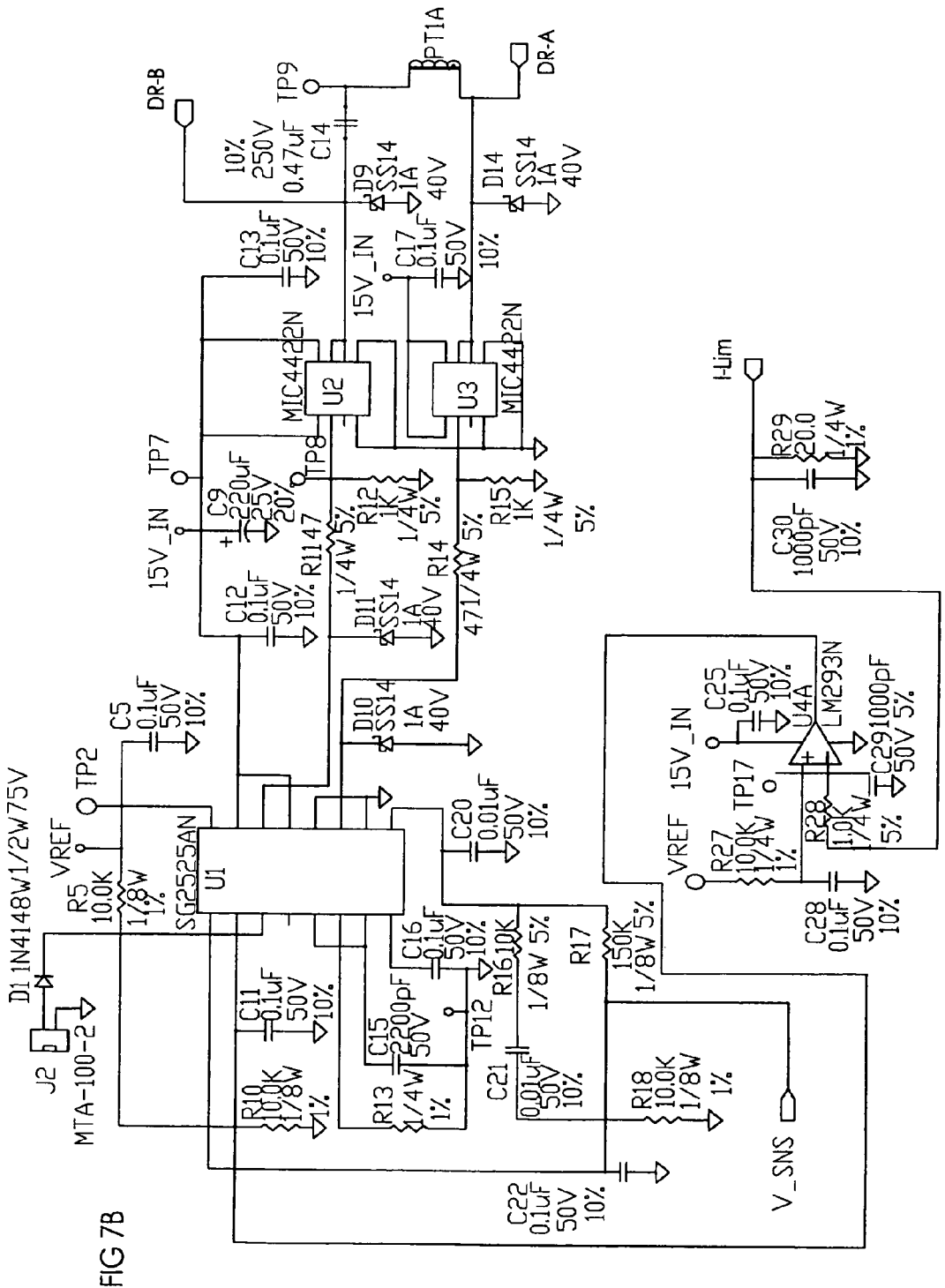
Figure 7C:
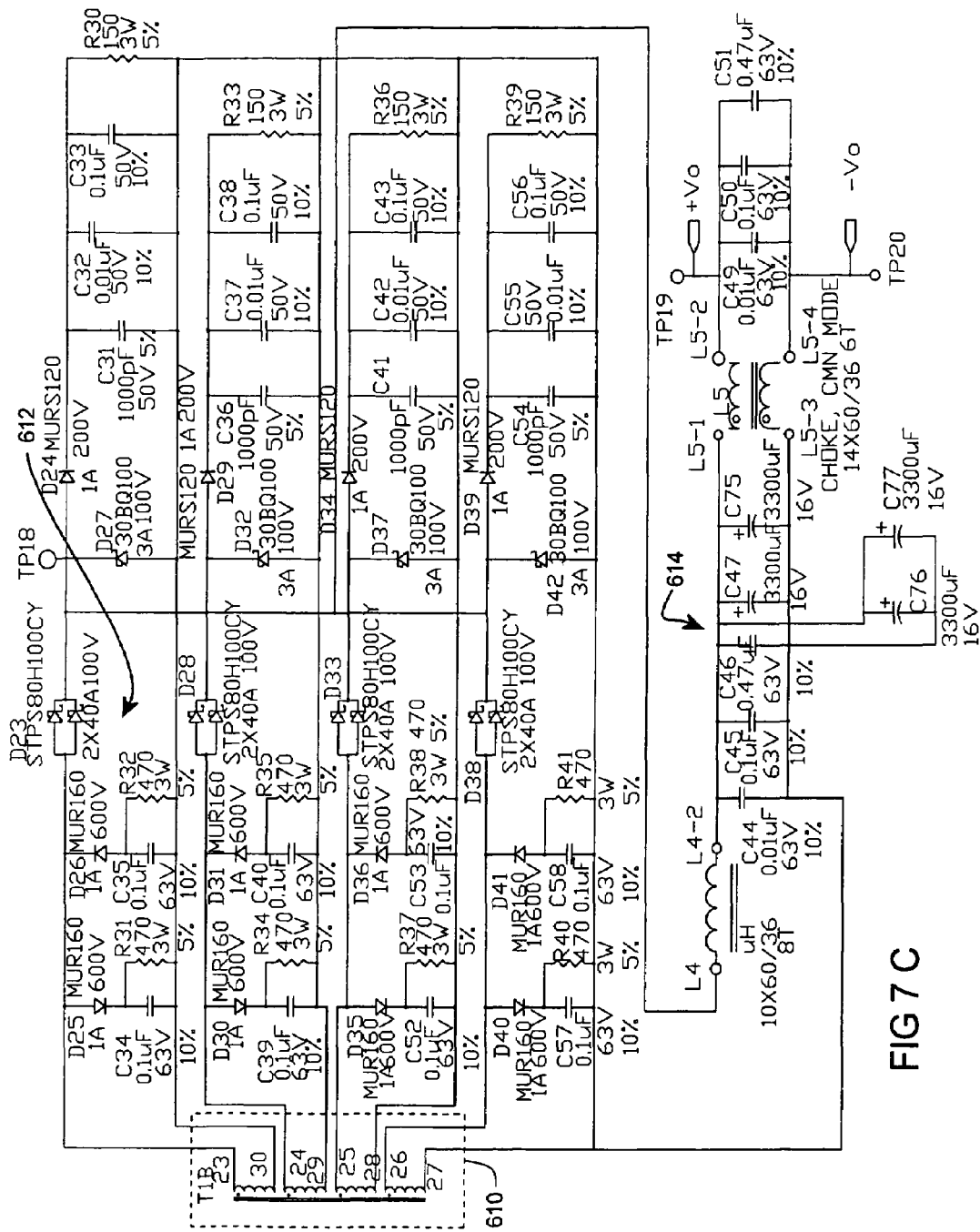
Figure 7D:
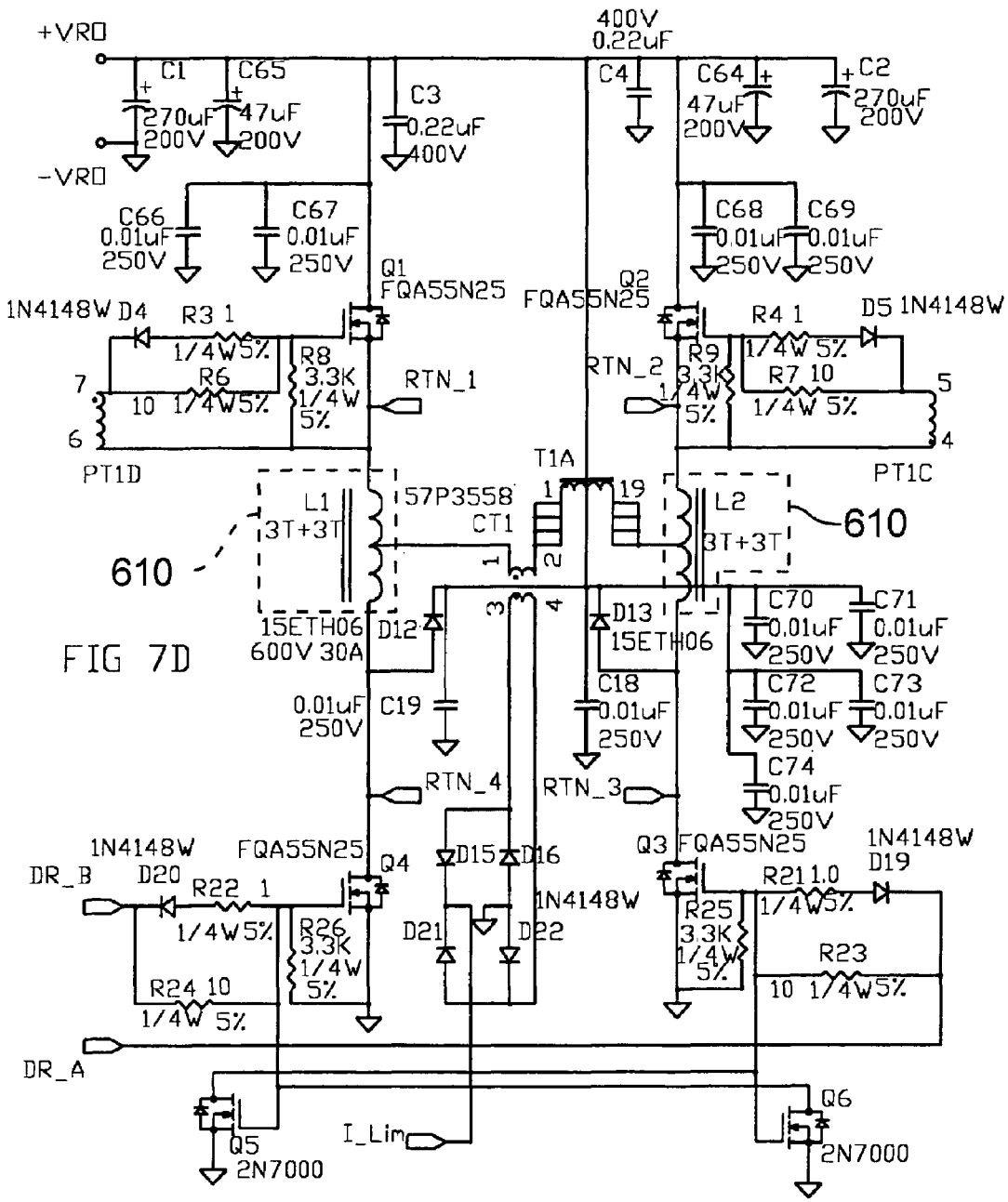
Figure 7E:
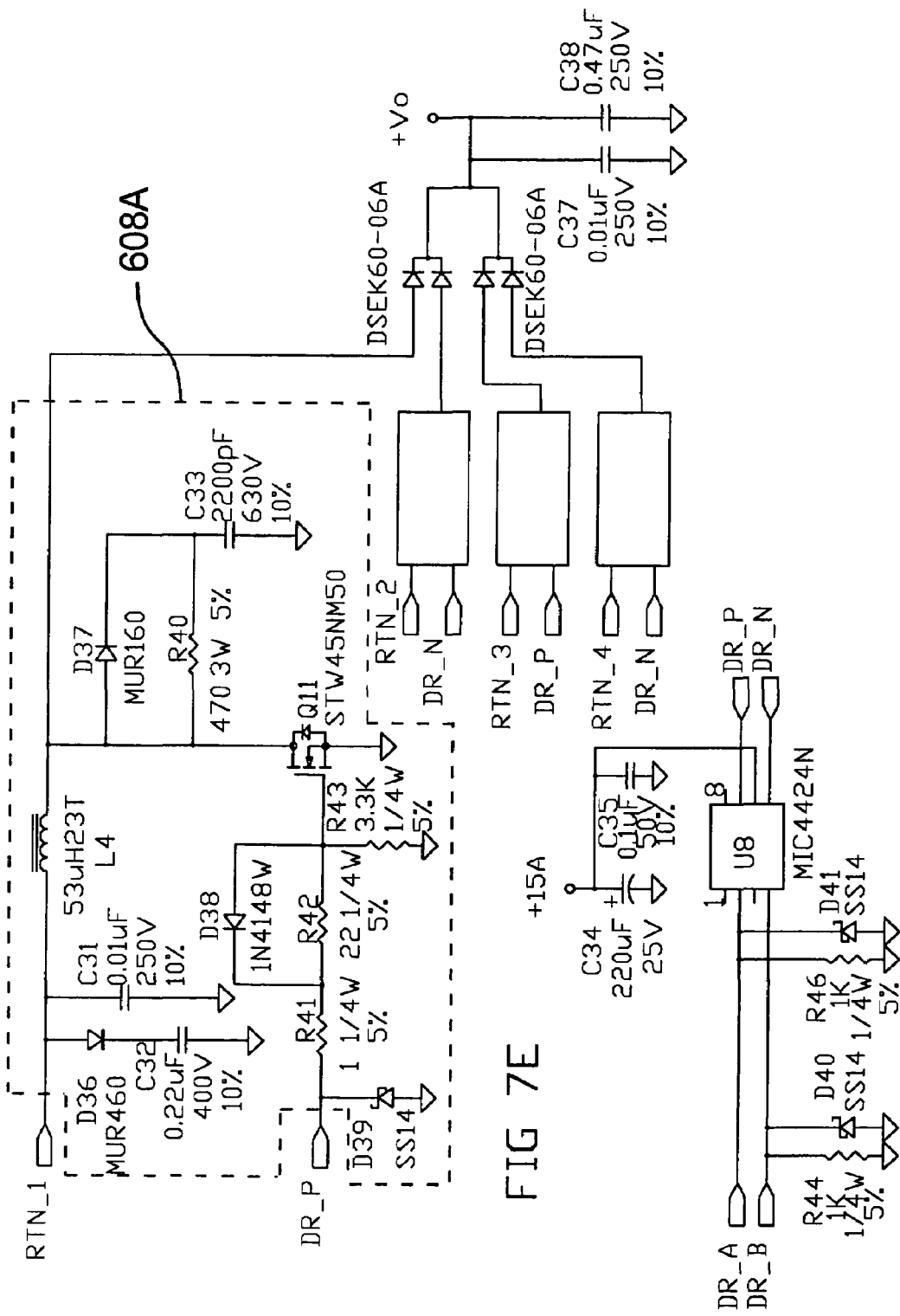

Preferred embodiments of the components of DC-DC converters 106 are shown in FIG. 7: power switches 604 (without an energy return) and portions of transformer 610 in FIG. 7A; controller 606 in FIG. 7B; and rectifier 612, portions of transformer 610 and storage capacitor 614 in FIG. 7C; an alternative configuration of power switches 604, adapted for cooperation with switching loss reduction circuits 608 is shown in FIG. 7D; and switching loss reduction circuits 608 is shown in FIG. 7E.

Although the present invention has been described in conjunction with various exemplary embodiments, the invention is not limited to the specific forms shown, and it is contemplated that other embodiments of the present invention may be created without departing from the spirit of the invention. Variations in components, materials, values, structure and other aspects of the design and arrangement may be made in accordance with the present invention as expressed in the following claims.

What is claimed is:

1. A system responsive to an alternating current input signal of relatively high maximum level varying voltage, for generating a regulated DC output signal having a predetermined output voltage, the system comprising:

a rectifier for generating, from the input signal, a rectified DC signal having a predetermined initial maximum voltage, said initial maximum voltage being a high voltage relative to said predetermined output voltage;

a regulator for generating, from the rectified DC signal, a regulated DC signal at a predetermined intermediate voltage, the predetermined intermediate voltage being a high voltage relative to said predetermined output voltage; and at least one DC to DC converter for generating, from the regulated higher voltage DC signal, the regulated DC output signal having said predetermined output voltage, the DC to DC converter including at least one switching element that tends to be subject to turn off losses, and further includes a capacitor disposed to limit the rate of change of voltage across the switching element during turn off, and a circuit for selectively discharging the capacitor to the output of the regulator, such that the capacitor is substantially fully discharged by the beginning of the next successive turn-off period, the circuit for selectively discharging the capacitor comprising an inductor, a second switching device, and a diode, the second switching device being connected in series with the inductor across the capacitor, with the diode disposed to provide a directional current path between the inductor and the output of the rectifier.

2. The system of claim 1 wherein the regulator comprises a boost regulator circuit.

3. A system responsive to an alternating current input signal of relatively high maximum level varying voltage, for generating a regulated DC output signal having a predetermined output voltage, the system comprising:
- a rectifier for generating, from the input signal, a rectified DC signal having a predetermined initial maximum voltage, said initial maximum voltage being a high voltage relative to said predetermined output voltage;
- a regulator for generating, from the rectified DC signal, a regulated DC signal at a predetermined intermediate voltage, the predetermined intermediate voltage being a high voltage relative to said predetermined output voltage; and
- at least one DC to DC converter for generating, from the regulated higher voltage DC signal, the regulated DC output signal having said predetermined output voltage,
- wherein at least one of the rectifier and regulator includes at least one power switching element that tends to be subject to turn off losses, and further includes first and second diodes, a capacitor, an inductor, and a switching device, with the first diode and capacitor connected across the power switching element, the switching device connected in series with the inductor across the capacitor, and the second diode disposed to provide a directional current path between the inductor and a predetermined discharge point.

4. The system of claim 3 wherein power switch is in the rectifier and the predetermined discharge point is the output of the rectifier.

5. The system of claim 3 wherein the predetermined discharge point is the output of the regulator.

6. The system of claim 3 wherein the rectifier comprises a multi-mode circuit which alternatively operates in full wave rectification or half wave rectification modes, in accordance with the instantaneous voltage of the input signal, and, when in the half cycle mode, alternatively operates in full duty cycle or pulse width modulated modes in accordance with the voltage of the rectified DC signal.

7. The system of claim 3 adapted for use in an automotive vehicle, the system further including a permanent magnet alternator for generating the alternating current input signal.

8. A system responsive to an alternating current input signal of relatively high maximum level varying voltage, for generating a regulated DC output signal having a predetermined output voltage, the system comprising:
- a rectifier for generating, from the input signal, a rectified DC signal having a predetermined initial maximum voltage, said initial maximum voltage being a high voltage relative to said predetermined output voltage;
- a regulator for generating, from the rectified DC signal, a regulated DC signal at a predetermined intermediate voltage, the predetermined intermediate voltage being a high voltage relative to said predetermined output voltage; and
- at least one DC to DC converter for generating, from the regulated higher voltage DC signal, the regulated DC output signal having said predetermined output voltage;
- the rectifier comprising a multi-mode circuit which alternatively operates in full wave rectification or half wave rectification modes, in accordance with the instantaneous voltage of the input signal,
- switching from full wave rectification to half wave rectification when the input signal voltage reaches said initial maximum voltage; and
- switching from half wave rectification to full wave rectification when the input signal voltage drops below a predetermined lower threshold value, the predetermined lower threshold value being less than said initial maximum voltage by a predetermined difference; and
- when in the half wave rectification mode, alternatively operates in full duty cycle or pulse width modulated modes in accordance with the voltage of the rectified DC signal, switching to pulse width modulated mode when the voltage of the rectified DC signal would otherwise exceed said initial maximum voltage.

9. The system of claim 8 wherein the multi-mode circuit dithers between full wave and half wave rectification under conditions where full wave rectification generates output levels in excess of said initial maximum voltage, but half wave rectification does not provide output levels at least equal to the predetermined lower threshold value.

10. The system of claim 8 adapted for use in an automotive vehicle, the system further including a permanent magnet alternator for generating the alternating current input signal.

11. A system responsive to an alternating current input signal of relatively high maximum level varying voltage, for generating a regulated DC output signal having a predetermined output voltage, the system comprising:
- a rectifier for generating, from the input signal, a rectified DC signal having a predetermined initial maximum voltage, said initial maximum voltage being a high voltage relative to said predetermined output voltage;
- a regulator for generating, from the rectified DC signal, a regulated DC signal at a predetermined intermediate voltage, the predetermined intermediate voltage being a high voltage relative to said predetermined output voltage; and
- at least one DC to DC converter for generating, from the regulated higher voltage DC signal, the regulated DC output signal having said predetermined output voltage;
- the rectifier comprising a multi-mode circuit which alternatively operates in full wave rectification or half wave rectification modes, in accordance with the instantaneous voltage of the input signal, and, when in the half cycle mode, alternatively operates in full duty cycle or pulse width modulated modes in accordance with the voltage of the rectified DC signal;
- the multi-mode circuit:
- switching from full wave rectification to half wave rectification when the input signal voltage reaches said initial maximum voltage;
- switching from half wave rectification to full wave rectification when the input signal voltage drops below a predetermined lower threshold value, the predetermined lower threshold value being less than said initial maximum voltage by a predetermined difference;
- dithering between full wave and half wave rectification under conditions where full wave rectification generates output levels in excess of said initial maximum voltage, but half wave rectification does not provide output levels at least equal to the predetermined lower threshold value; and
- when in the half wave rectification mode switching to pulse width modulated mode when the voltage of the rectified DC signal would otherwise exceed said initial maximum voltage.

12. A system responsive to an alternating current input signal of relatively high maximum level varying voltage, for generating a regulated DC output signal having a predetermined output voltage, the system comprising:

a rectifier for generating, from the input signal, a rectified DC signal having a predetermined initial maximum voltage, said initial maximum voltage being a high voltage relative to said predetermined output voltage; the rectifier comprising a rectifier bridge circuit for, responsive to control signals applied thereto, selectively effecting full wave rectification of the input signal;

a half bridge conversion circuit cooperating with the rectifier bridge circuit, for, responsive to control signals applied thereto, selectively effecting half wave rectification of the input signal;

a pulse width modulator for, responsive to indicia of the output signal voltage, selectively controlling the duty cycle of the half wave rectified signal, and a control circuit, responsive to indicia of the input signal, for generating said control signals to the rectifier bridge circuit and half bridge conversion circuit;

a regulator for generating, from the rectified DC signal, a regulated DC signal at a predetermined intermediate voltage, the predetermined intermediate voltage being a high voltage relative to said predetermined output voltage; and at least one DC to DC converter for generating, from the regulated higher voltage DC signal, the regulated DC output signal having said predetermined output voltage.

13. The system of claim 12 wherein the control circuit generates control signals to the rectifier bridge circuit and half bridge conversion circuit to switch from full wave rectification to half wave rectification when the input signal voltage reaches said initial maximum voltage and switch from half wave rectification to full wave rectification when the input signal voltage drops below said initial maximum voltage by a predetermined amount.

14. The system of claim 13 wherein the control circuit generates control signals to the rectifier bridge circuit and half bridge conversion circuit such that the multi-mode rectifier circuit dithers between full wave and half wave rectification under conditions where full wave rectification generates output levels in excess of said maximum threshold voltage, but half wave rectification does not provide output levels at least equal to the predetermined lower threshold value.

15. The system of claim 12 wherein at least one of the rectifier and regulator includes at least one switching element that tends to be subject to turn off losses, and further includes a capacitor disposed to limit the rate of change of voltage across the switching element during turn off, and a circuit for selectively discharging the capacitor to a predetermined discharge point, such that the capacitor is substantially fully discharged by the beginning of the next successive turn-off of the switching element.

16. The system of claim 12 wherein at least one of the rectifier and regulator includes at least one power switching element that tends to be subject to turn off losses, and further includes first and second diodes, a capacitor, an inductor, and a switching device, with the first diode and capacitor connected across the power switching element, the switching device connected in series with the inductor across the capacitor, and operating in synchronism with the power switching element, and the second diode disposed to provide a directional current path between the inductor and a predetermined discharge point.

17. The system of claim 16 wherein power switch is in the rectifier and the predetermined discharge point is the output of the rectifier.

18. The system of claim 12 further including an inverter, responsive to said regulated DC output signal, for generating an AC output signal having a predetermined frequency and wave shape.

19. The system of claim 18 wherein the inverter includes at least one switching element that tends to be subject to turn off losses, and further includes a capacitor disposed to limit the rate of change of voltage across the switching element during turn off, and a circuit for selectively discharging the capacitor to a predetermined discharge point, such that the capacitor is substantially fully discharged by the beginning of the next successive turn-off of the switching element.

20. The system of claim 19 wherein the predetermined discharge point is the output of the regulator.

21. The system of claim 19 wherein the inverter comprises:

a filter circuit, from which a sinusoidal AC output signal is made available to external loads;

a first pair of switches, associated with half cycles of the AC output signal having a first polarity, connected to selectively establish a current flow through the filter in a direction corresponding to said first polarity;

a second pair of switches, associated with half cycles of the AC output signal having a second polarity, connected to selectively establish a current flow through the filter in a direction corresponding to said second polarity;

each pair comprising first and second switching devices, the switches being responsive to control signals applied thereto;

a controller for generating the control signals to the switches to, cyclically, during successive periods of time corresponding to successive half cycles of the AC output signal render conductive the first switch of the pair of switches associated with the polarity of the corresponding half cycle for substantially the entirety of such period of time; and selectively render conductive the second switch of the pair of switches associated with the polarity of the corresponding half cycle in accordance with a predetermined pulse width modulation pattern corresponding to the predetermined wave shape.

22. The system of claim 21 wherein at least one switch includes a switching element that tends to be subject to turn off losses, and further includes a capacitor disposed to limit the rate of change of voltage across the switching element during turn off, and a circuit for selectively discharging the capacitor to a predetermined discharge point, such that the capacitor is substantially fully discharged by the beginning of the next successive turn-off of the switching element.

23. The system of claim 22 wherein said second switches include at least one power switching element that tends to be subject to turn off losses, and further include first and second diodes, a capacitor, an inductor, and a switching device, with the first diode and capacitor connected across the power switching element, the switching device connected in series with the inductor across the capacitor, and operating in synchronism with the power switching element, and the second diode disposed to provide a directional current path between the inductor and a predetermined discharge point.

24. The system of claim 23 wherein the predetermined discharge point is the output of the regulator.

25. The system of claim 21 wherein the controller includes a sensor circuit for generating to indicia of the load on the inverter, and generates during the successive periods of time, further control signals to the first switch of the pair of switches associated with the polarity opposite to the polarity of the corresponding half cycle to render such switch conductive in a mutually exclusive basis with the second switch of the pair of switches associated with the polarity of the corresponding half cycle when the load is below a predetermined value, and render such switch non-conductive for substantially the entirety of such period of time when the load is above a predetermined value.

26. The system of claim 21 wherein said regulated DC output signal is provided to the inverter on positive and common rails, and the first switches of the pairs of switches are connected between the positive rail and the filter, and the second switches of the pairs of switches are connected between the filter and the common rail.

27. The system of claim 21 wherein said second switches include at least one power switching element that tends to be subject to turn off losses, and further include first and second diodes, a capacitor, an inductor, and a switching device, with the first diode and capacitor connected across the power switching element, the switching device connected in series with the inductor across the capacitor, and operating in synchronism with the power switching element, and the second diode disposed to provide a directional current path between the inductor and a predetermined discharge point.

28. The system of claim 26 wherein the predetermined discharge point is the positive rail.

29. The system of claim 12 adapted for use in an automotive vehicle, the system further including a permanent magnet alternator for generating the alternating current input signal.

30. The system of claim 12 wherein the regulator comprises a boost regulator circuit.

\* \* \* \* \*